United States Patent
Kakehata et al.

(10) Patent No.: US 10,026,966 B2
(45) Date of Patent: Jul. 17, 2018

(54) NEGATIVE ELECTRODE FOR LITHIUM SECONDARY BATTERY, LITHIUM SECONDARY BATTERY, AND MANUFACTURING METHODS THEREOF

(71) Applicant: SEMICONDUCTOR ENERGY LABORATORY CO., LTD., Atsugi-shi, Kanagawa-ken (JP)

(72) Inventors: Tetsuya Kakehata, Kanagawa (JP); Ryota Tajima, Kanagawa (JP); Teppei Oguni, Kanagawa (JP); Takeshi Osada, Kanagawa (JP); Shunpei Yamazaki, Tokyo (JP); Shunsuke Adachi, Kanagawa (JP); Takuya Hirohashi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 507 days.

(21) Appl. No.: 13/691,929

(22) Filed: Dec. 3, 2012

(65) Prior Publication Data

US 2013/0149605 A1    Jun. 13, 2013

(30) Foreign Application Priority Data

Dec. 7, 2011   (JP) ................... 2011-268084
Apr. 10, 2012  (JP) ................... 2012-089347
Oct. 5, 2012   (JP) ................... 2012-222748

(51) Int. Cl.
*H01M 4/70*   (2006.01)
*H01M 4/04*   (2006.01)
(Continued)

(52) U.S. Cl.
CPC ............ *H01M 4/70* (2013.01); *H01M 4/045* (2013.01); *H01M 4/0457* (2013.01);
(Continued)

(58) Field of Classification Search
None
See application file for complete search history.

(56) References Cited

U.S. PATENT DOCUMENTS 7,179,561 B2   2/2007   Niu et al.
7,745,047 B2   6/2010   Zhamu et al.
(Continued)

FOREIGN PATENT DOCUMENTS

CN   101826632 A   9/2010
CN   101849302 A   9/2010
(Continued)

OTHER PUBLICATIONS

Zhou.X et al., "Graphene modified LiFePO4 cathode materials for high power lithium ion batteries ,", J. Mater. Chem. (Journal of Materials Chemistry), 2011, vol. 21, pp. 3353-3358.

(Continued)

*Primary Examiner* — Yoshitoshi Takeuchi
(74) *Attorney, Agent, or Firm* — Nixon Peabody LLP; Jeffrey L. Costellia

(57) ABSTRACT

A lithium secondary battery which has high charge-discharge capacity, can be charged and discharged at high speed, and has little deterioration in battery characteristics due to charge and discharge is provided. A negative electrode includes a current collector and a negative electrode active material layer. The current collector includes a plurality of protrusion portions extending in a substantially perpendicular direction and a base portion connected to the plurality of protrusion portions. The protrusion portions and the base portion are formed using the same material containing titanium. A top surface of the base portion and at least a side surface of the protrusion portion are covered with (Continued)

the negative electrode active material layer. The negative electrode active material layer may be covered with graphene.

13 Claims, 42 Drawing Sheets

(51) Int. Cl.
| | |
|---|---|
| H01M 4/66 | (2006.01) |
| H01M 4/134 | (2010.01) |
| H01M 4/1395 | (2010.01) |
| H01M 4/36 | (2006.01) |
| H01M 4/62 | (2006.01) |
| B82Y 30/00 | (2011.01) |
| H01M 10/052 | (2010.01) |
| H01M 4/02 | (2006.01) |

(52) U.S. Cl.
CPC ......... *H01M 4/0471* (2013.01); *H01M 4/134* (2013.01); *H01M 4/1395* (2013.01); *H01M 4/366* (2013.01); *H01M 4/62* (2013.01); *H01M 4/661* (2013.01); *H01M 4/662* (2013.01); *B82Y 30/00* (2013.01); *H01M 4/625* (2013.01); *H01M 10/052* (2013.01); *H01M 2004/027* (2013.01)

(56) References Cited

U.S. PATENT DOCUMENTS

| | | | |
|---|---|---|---|
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,257,866 B2 | 9/2012 | Loveness et al. | |
| 8,278,011 B2 | 10/2012 | Zhu et al. | |
| 8,450,012 B2 | 5/2013 | Cui et al. | |
| 8,556,996 B2 | 10/2013 | Loveness et al. | |
| 8,927,156 B2 | 1/2015 | Yamazaki et al. | |
| 9,172,088 B2 | 10/2015 | Loveness et al. | |
| 9,172,094 B2 | 10/2015 | Loveness et al. | |
| 9,231,243 B2 | 1/2016 | Cui et al. | |
| 9,246,160 B2 | 1/2016 | Kawase et al. | |
| 2008/0254296 A1 | 10/2008 | Handa et al. | |
| 2009/0104515 A1* | 4/2009 | Fujikawa et al. | 429/129 |
| 2009/0117467 A1* | 5/2009 | Zhamu et al. | 429/231.8 |
| 2010/0143798 A1 | 6/2010 | Zhamu et al. | |
| 2010/0176337 A1 | 7/2010 | Zhamu et al. | |
| 2010/0209784 A1* | 8/2010 | Yamazaki et al. | 429/338 |
| 2010/0227228 A1 | 9/2010 | Yamazaki et al. | |
| 2010/0248034 A1 | 9/2010 | Oki et al. | |
| 2010/0266898 A1 | 10/2010 | Yamamoto et al. | |
| 2010/0285358 A1 | 11/2010 | Cui et al. | |
| 2010/0330419 A1 | 12/2010 | Cui et al. | |
| 2010/0330421 A1 | 12/2010 | Cui et al. | |
| 2011/0012067 A1 | 1/2011 | Kay | |
| 2011/0020706 A1 | 1/2011 | Nesper | |
| 2011/0111303 A1 | 5/2011 | Kung et al. | |
| 2011/0121240 A1 | 5/2011 | Amine et al. | |
| 2011/0159372 A1 | 6/2011 | Zhamu et al. | |
| 2011/0229761 A1 | 9/2011 | Cui et al. | |
| 2011/0229795 A1 | 9/2011 | Niu et al. | |
| 2011/0250501 A1 | 10/2011 | Uchida et al. | |
| 2011/0294005 A1 | 12/2011 | Kuriki et al. | |
| 2012/0045692 A1 | 2/2012 | Takemura et al. | |
| 2012/0070741 A1 | 3/2012 | Liu et al. | |
| 2012/0088151 A1 | 4/2012 | Yamazaki et al. | |
| 2012/0088156 A1 | 4/2012 | Nomoto et al. | |
| 2012/0183856 A1 | 7/2012 | Cui et al. | |
| 2013/0071739 A1 | 3/2013 | Tajima et al. | |
| 2013/0071751 A1 | 3/2013 | Tajima et al. | |
| 2013/0071762 A1 | 3/2013 | Tajima et al. | |
| 2013/0084495 A1 | 4/2013 | Tajima et al. | |
| 2016/0013483 A1 | 1/2016 | Loveness et al. | |
| 2016/0104894 A1 | 4/2016 | Kawase et al. | |
| 2016/0190600 A1 | 6/2016 | Cui et al. | |

FOREIGN PATENT DOCUMENTS

| | | | | |
|---|---|---|---|---|
| CN | 101939867 A | 1/2011 | | |
| CN | 102174702 A | 9/2011 | | |
| JP | 05-159781 A | 6/1993 | | |
| JP | 2001-283834 | 10/2001 | | |
| JP | 2004-207113 A | 7/2004 | | |
| JP | 2006-265751 | 10/2006 | | |
| JP | 2009-524567 | 7/2009 | | |
| JP | 2009-176721 | 8/2009 | | |
| JP | 2010-219030 A | 9/2010 | | |
| JP | 2010-219392 A | 9/2010 | | |
| JP | 2010-262843 | * 11/2010 | ............. | H01M 4/13 |
| JP | 2011-503804 | 1/2011 | | |
| JP | 2011-517053 | 5/2011 | | |
| WO | WO-2006/062947 A2 | 6/2006 | | |
| WO | WO-2007/061945 A2 | 5/2007 | | |
| WO | WO-2009/061685 A1 | 5/2009 | | |
| WO | WO-2009/127901 A1 | 10/2009 | | |
| WO | WO-2009/144600 A2 | 12/2009 | | |
| WO | WO-2010/129910 | 11/2010 | | |
| WO | WO-2010/138617 | 12/2010 | | |
| WO | WO-2010/138619 | 12/2010 | | |
| WO | WO-2011/043026 | 4/2011 | | |
| WO | WO-2011/109477 | 9/2011 | | |
| WO | WO-2011/119614 | 9/2011 | | |
| WO | WO-2011/149958 | 12/2011 | | |
| WO | WO-2012/054767 | 4/2012 | | |

OTHER PUBLICATIONS

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

T. Oguni et al., "Well Controlled Array of Si Nanopillar With Metal Core as Negative Electrode for Lithium Ion Batteries", 222$^{nd}$ ECS Meeting Abstract, Oct. 7, 2012, pp. 869.

Taiwanese Office Action (Application No. 101144295) dated May 5, 2016.

Chinese Office Action (Application No. 201210556275.4) dated Feb. 29, 2016.

* cited by examiner

110

111

112

113

114

115

116

117

118

NEGATIVE ELECTRODE FOR LITHIUM SECONDARY BATTERY, LITHIUM SECONDARY BATTERY, AND MANUFACTURING METHODS THEREOF

BACKGROUND OF THE INVENTION

1. Field of the Invention

The present invention relates to a negative electrode for a lithium secondary battery, a lithium secondary battery, and manufacturing methods thereof.

2. Description of the Related Art

In recent years, with the advance of environmental technology, development of power generation devices (e.g., solar power generation devices) which pose less burden on the environment than conventional power generation methods has been actively conducted. Concurrently with the development of power generation technology, development of power storage devices such as lithium secondary batteries, lithium-ion capacitors, and air cells has also been underway.

In particular, demand for lithium secondary batteries have rapidly grown with the development of the semiconductor industry, as in the cases of electrical appliances such as mobile phones, smartphones, portable information terminals such as laptop computers, portable music players, digital cameras, medical equipment, and next-generation clean energy vehicles such as hybrid electric vehicles (HEV), electric vehicles (EV), and plug-in hybrid electric vehicles (PHEV), and the lithium secondary batteries are essential for today's information society as a chargeable energy supply source. Especially in the case of applications for electric vehicles or home electrical appliances such as refrigerators, batteries with higher capacity and higher output are desirable.

A negative electrode used in such a lithium secondary battery (hereinafter "negative electrode for a lithium secondary battery") is manufactured in such a manner that a layer containing an active material (hereinafter "active material layer") is formed on one surface of a current collector. Graphite (black lead) which is capable of intercalation and deintercalation of ions serving as carriers (hereinafter "carrier ions") is a conventional material used as a negative electrode active material. In other words, a negative electrode has been manufactured in such a manner that graphite which is a negative electrode active material, carbon black as a conductive additive, and a resin as a binder are mixed to form slurry, the slurry is applied over a current collector, and the current collector is dried.

In contrast, in the case of using silicon or silicon doped with phosphorus as a negative electrode active material, carrier ions about four times as much as those in the case of using carbon can be inserted, and the theoretical capacity of a silicon negative electrode is 4200 mAh/g, which is significantly higher than a theoretical capacity of carbon (black lead) negative electrode of 372 mAh/g. Thus, silicon is an optimal material for increasing capacity of a power storage device, and lithium secondary batteries using silicon as a negative electrode active material have been actively developed today in order to increase the capacity.

However, as the number of carrier ions to be inserted increases, a change in the volume of an active material in accordance with insertion and extraction of carrier ions in charge-discharge cycles increases, resulting in lower adhesion between a current collector and silicon and deterioration of battery characteristics due to charge and discharge. Further, in some cases, a serious problem is caused in that silicon is deformed and broken to be separated or pulverized, so that a function as a battery cannot be maintained.

In Patent Document 1, for example, as a negative electrode active material, a layer formed using microcrystalline silicon or amorphous silicon is formed in a columnar shape or in a powder form over a current collector formed using a copper foil or the like with a rough surface, and a layer formed using a carbon material such as black lead which has lower electric conductivity than silicon is provided over the layer formed using silicon. This makes it possible to collect current through the layer formed using a carbon material such as black lead even if the layer formed using silicon is separated; thus, deterioration of battery characteristics is reduced.

Reference

[Patent Document 1] Japanese Published Patent Application No. 2001-283834

SUMMARY OF THE INVENTION

However, in Patent Document 1, when the negative electrode active material layer has either a columnar shape or a powder form and charge and discharge are repeated more than 10 cycles, which is described in the document, expansion and contraction of the volume cannot be avoided as long as carrier ions are intercalated into and deintercalated from the negative electrode active material. Thus, deformation and breakage of the negative electrode active material cannot be prevented, and reliability of a battery is difficult to maintain.

In particular, in the case where silicon which is a negative electrode active material is used as a columnar structure body, the columnar structure body might be fallen from the current collector because of repeated charge and discharge, and significant reductions in charge-discharge capacity and discharge speed might be caused because of an increase in the number of cycles. This results from the fact that a portion where the current collector is in contact with the columnar structure body is limited to a bottom surface of the columnar structure body as well as expansion and contraction of the entire columnar structure. In Patent Document 1, in view of the above, current is collected in the layer formed using black lead on the assumption that silicon which is an active material is separated from the current collector. Thus, the structure has a problem in ensuring reliability in terms of cycle characteristics.

Further, in the case where a layer formed using silicon provided over a current collector is covered with a layer formed using black lead, the thickness of the layer formed using black lead becomes large, for example, submicron to micron, which results in a reduction in the amount of carrier ions transferred between an electrolyte and the layer formed using silicon. Meanwhile, when an active material layer containing silicon powder is covered with thickly formed black lead, the amount of silicon contained in the active material layer is reduced because of the thick black lead. Consequently, the amount of reaction between silicon and carrier ions is reduced, which causes a reduction in charge-discharge capacity and makes it difficult to perform high-speed charge and discharge of a secondary battery.

Further, since only the bottom portion of the columnar structure body of the active material which is described in Patent Document 1 is firmly attached to the rough surface of the current collector, the adhesion strength between the current collector and the active material is extremely low.

Thus, the columnar structure body is easily separated from the current collector because of expansion and contraction of silicon.

In view of the above, according to one embodiment of the present invention, a negative electrode for a lithium secondary battery which has high charge-discharge capacity, can be charged and discharged at high speed, has little deterioration of battery characteristics due to charge and discharge, and has high reliability, a lithium secondary battery using the negative electrode, and manufacturing methods thereof are provided.

One embodiment of the present invention is a negative electrode for a lithium secondary battery which includes a current collector and a negative electrode active material layer. The current collector includes a plurality of protrusion portions extending in a substantially perpendicular direction and a base portion connected to the plurality of protrusion portions. The protrusion portions and the base portion are formed using the same material containing titanium. Top surfaces and side surfaces of the protrusion portions and a top surface of the base portion are covered with the negative electrode active material layer.

Another embodiment of the present invention is a negative electrode for a lithium secondary battery which includes a current collector and a negative electrode active material layer. The current collector includes a plurality of protrusion portions extending in a substantially perpendicular direction and a base portion connected to the plurality of protrusion portions. The protrusion portions and the base portion are formed using the same material containing titanium. Top surfaces and side surfaces of the protrusion portions and a top surface of the base portion are covered with the negative electrode active material layer. The negative electrode active material layer is covered with graphene.

In the negative electrode current collector, the base portion is much thicker than the protrusion portions and functions as an electrode terminal. Meanwhile, the plurality of protrusion portions are formed on the surface of the base portion, have a function to increase the surface area of the negative electrode current collector, and also function as cores of the negative electrode active material layer. The plurality of protrusion portions extend in a direction substantially perpendicular to the surface of the base portion. In this specification, the term "substantially" is used to mean a slight deviation from the perpendicular direction due to an error in leveling in a manufacturing process of the negative electrode current collector, step variation in a manufacturing process of the protrusion portions, deformation due to repeated charge and discharge, and the like is acceptable although the angle between the surface of the base portion and a center axis of the protrusion portion in the longitudinal direction is preferably 90°. Specifically, the angle between the surface of the base portion and the center axis of the protrusion portion in the longitudinal direction is 90°±10°, preferably 90°±5°. Note that the direction in which the plurality of protrusion portions extend from the base portion is referred to as the longitudinal direction.

Titanium is particularly preferable as a material for the negative electrode current collector. Titanium has higher strength than steel, has mass which is less than or equal to half of that of steel, and is very light. In addition, titanium has strength about twice as high as that of aluminum and is less likely to have metal fatigue than other metals. Thus, titanium allows light battery to be achieved and can function as a core of a negative electrode active material layer, which has resistance to repeated stress; thus, deterioration or breakage due to expansion and contraction of silicon can be suppressed. Moreover, titanium is very suitable to be processed by dry etching and enables a protrusion portion with a high aspect ratio to be formed on a surface of the current collector.

The negative electrode active material can be amorphous silicon, microcrystalline silicon, polycrystalline silicon, or a combination thereof. An impurity imparting conductivity, such as phosphorus or boron, may be added to such silicon.

The negative electrode active material layer is favorably covered with graphene. Graphene refers to a sheet of one atomic layer of carbon molecules having $sp^2$ bonds. Graphene includes single-layer graphene and multilayer graphene. In addition, graphene may contain oxygen at 2 atomic % or more and 11 atomic % or less, preferably at 3 atomic % or more and 10 atomic % or less.

Another embodiment of the present invention is a manufacturing method of a negative electrode for a lithium secondary battery, which includes the steps of forming a photoresist pattern over a current collector material containing titanium, forming a current collector including a base portion and a plurality of protrusion portions by etching the current collector material using the photoresist pattern as a mask, and forming a negative electrode active material layer on top surfaces and side surfaces of the protrusion portions and a top surface of the base portion.

Another embodiment of the present invention is a manufacturing method of a negative electrode for a lithium secondary battery, which includes the steps of forming a protective layer over a current collector material containing titanium, forming a photoresist pattern over the protective layer, etching the protective layer using the photoresist pattern as a mask, forming a current collector including a base portion and a plurality of protrusion portions by etching the current collector material using the etched protective layer as a mask, and forming a negative electrode active material layer on top surfaces and side surfaces of the protrusion portions and a top surface of the base portion.

Another embodiment of the present invention is a manufacturing method of a negative electrode for a lithium secondary battery, which includes the steps of forming a conductive layer over a current collector material including a base portion and a plurality of protrusion portions to form a current collector including the base portion and the plurality of protrusion portions, and forming a negative electrode active material layer on top surfaces and side surfaces of the protrusion portions and a top surface of the base portion.

Another embodiment of the present invention is a manufacturing method of a negative electrode for a lithium secondary battery, in which graphene is formed over such a negative electrode active material layer. The graphene can be formed by reducing graphene oxide which is electrodeposited over the negative electrode active material layer by an electrophoresis method. The reduction is favorably performed by heating at 150° C. or higher in vacuum or an inert gas atmosphere. Alternatively, the reduction may be performed in such a manner that potential at which a reduction reaction of graphene oxide occurs is supplied to a current collector including the negative electrode active material layer in an electrolyte solution in which the current collector and a counter electrode are immersed. In this case, the potential supplied to the current collector is preferably higher than the oxidation-reduction potential of lithium by greater than or equal to 1.6 V and less than or equal to 2.4 V.

The negative electrode current collector includes the base portion and the plurality of protrusion portions protruding from the base portion. The plurality of protrusions extend in a substantially perpendicular direction; thus, the density of protrusions in the negative electrode can be increased and the surface area can be increased. Thus, a lithium secondary battery with high charge-discharge capacity can be manufactured.

Spaces are provided between the plurality of protrusion portions. Further, graphene covers the negative electrode active material layer; thus, even when an active material expands because of charge, contact between the protrusions can be reduced and even when the active material is separated, the active material can be prevented from being fallen off. In particular, when the protrusion portions are formed using titanium, the protrusion portions function as cores of the negative electrode active material layer, which have high mechanical strength; thus, cycle deterioration of silicon due to expansion and contraction can be suppressed. This means that specifically, combination of the negative electrode active material layer covered with graphene and the protrusion portion formed using titanium is highly effective against cycle deterioration of the negative electrode active material layer.

The plurality of protrusions have translation symmetry and formed with high uniformity in the negative electrode, so that local reaction can be reduced in each of the positive electrode and the negative electrode, and carrier ions and the active material react with each other uniformly between the positive electrode and the negative electrode.

Consequently, in the case where the negative electrode is used for a lithium secondary battery, high-speed charge and discharge becomes possible, and breakdown and separation of the active material due to charge and discharge can be suppressed. In other words, a lithium secondary battery with further improved charge-discharge cycle characteristics and high reliability can be manufactured.

When a surface of the active material is in contact with an electrolyte in a lithium secondary battery, the electrolyte and the active material react with each other, so that a film is formed on the surface of the active material. The film is called a solid electrolyte interface (SEI) which is considered necessary for relieving reaction between the active material and the electrolyte and for stabilization. However, when the thickness of the film is increased, carrier ions are less likely to be inserted in a negative electrode, leading to problems such as a reduction in conductivity of carrier ions between the active material and the electrolyte and a waste of the electrolyte. In order to solve these problems, a negative electrode active material layer is covered with graphene, whereby an increase in the thickness of the film, a reduction in conductivity of carrier ions, and a waste of the electrolyte can be suppressed.

Silicon has lower electric conductivity than carbon, and the electric conductivity is further reduced when silicon becomes amorphous by charge and discharge. Thus, a negative electrode in which silicon is used as an active material has high resistivity. However, since a graphene has high electric conductivity, covering silicon with graphene enables electrons to transfer at higher speed in the graphene through which carrier ions pass. In addition, since graphene has a thin sheet-like shape, covering the plurality of protrusions with graphene can increase the silicon content in the active material layer and makes transfer of carrier ions easier than in graphite. As a result, the conductivity of carrier ions can be increased, reaction between silicon that is an active material and carrier ions can be increased, and carrier ions can be easily inserted in silicon. Thus, a lithium secondary battery including the negative electrode can be charged and discharged at high speed.

According to one embodiment of the present invention, a negative electrode for a lithium secondary battery which has high charge-discharge capacity, can be charged and discharged at high speed, and has little deterioration due to charge and discharge, and a lithium secondary battery using the negative electrode can be provided. The negative electrode for a lithium secondary battery includes at least a plurality of current collectors including protrusion portions and a negative electrode active material layer covering the current collectors.

According to another embodiment of the present invention, a plurality of current collectors including protrusion portions are formed using a material containing titanium which has higher strength than metals such as aluminum and copper, whereby a highly reliable negative electrode for a lithium secondary battery and a lithium secondary battery using the negative electrode can be provided.

According to another embodiment of the present invention, a negative electrode active material layer is covered with graphene to suppress separation of a negative electrode active material due to repeated expansion and contraction of the negative electrode active material, whereby a highly reliable negative electrode for a lithium secondary battery and a lithium secondary battery using the negative electrode can be provided.

DETAILED DESCRIPTION OF THE INVENTION

Embodiments will be described below with reference to the drawings. However, the embodiments can be implemented in many different modes, and it will be readily appreciated by those skilled in the art that modes and details thereof can be changed in various ways without departing from the spirit and scope of the present invention. Therefore, the present invention should not be construed as being limited to the description in the embodiments below.

[Embodiment 1]

In this embodiment, a structure of a negative electrode for a lithium secondary battery, which is unlikely to deteriorate by charge and discharge and has good charge-discharge cycle characteristics, and a manufacturing method of the negative electrode will be described with reference to FIGS. 1A and 1B, FIGS. 2A to 2C, FIGS. 3A to 3I, FIGS. 4A to 4D, FIGS. 5A to 5C, FIGS. 6A to 6D, FIGS. 7A to 7D, and FIGS. 8A to 8C.

In this specification, a secondary battery in which lithium ions are used as carrier ions is referred to as a lithium secondary battery. Examples of carrier ions which can be used instead of lithium ions include alkali-metal ions such as sodium ions and potassium ions; alkaline-earth metal ions such as calcium ions, strontium ions, and barium ions; beryllium ions; magnesium ions; and the like.

(Structure of Negative Electrode)

Figure 1A:
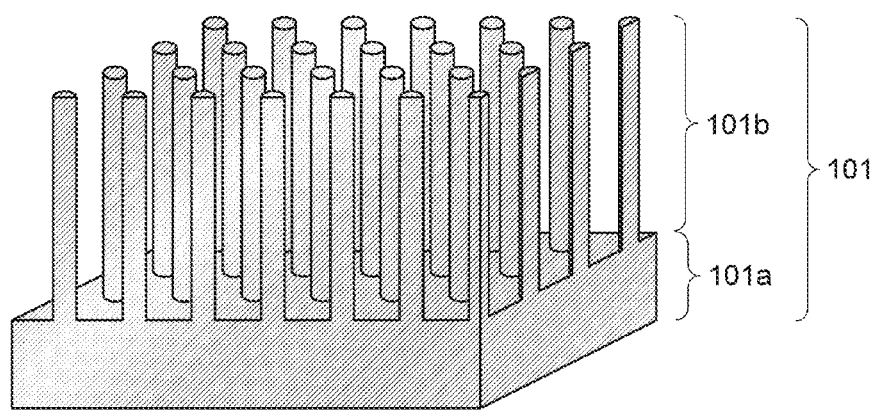
FIGS. 1A and 1B each illustrate a negative electrode.

FIG. 1A is a schematic cross-sectional view of an enlarged surface part of a negative electrode current collector. A negative electrode current collector 101 includes a plurality of protrusion portions 101b and a base portion 101a to which each of the plurality of protrusion portions is connected. Thus, the negative electrode current collector 101 apparently has a structure like a spiky frog (kenzan) used in the Japanese art of flower arrangement. Although the thin base portion 101a is illustrated in the drawing, the base portion 101a is generally much thicker than the protrusion portions 101b.

The plurality of protrusion portions 101b extend in a direction substantially perpendicular to a surface of the base portion 101a. In this specification, the word "substantially" is used to mean a slight deviation from the perpendicular direction due to an error in leveling in a manufacturing process of the negative electrode current collector, step variation in a manufacturing process of the protrusion portions 101b, deformation due to repeated charge and discharge, and the like is acceptable although the angle between the surface of the base portion 101a and a center axis of the protrusion portion 101b in the longitudinal direction is preferably 90°. Specifically, the angle between the surface of the base portion 101a and the center axis of the protrusion portion in the longitudinal direction is 90°±10°, preferably 90°±5°. Note that the direction in which the plurality of protrusion portions 101b extend from the base portion 101a is referred to as the longitudinal direction.

The negative electrode current collector 101 is formed using a material which is not alloyed with lithium in a potential region used as a current collector and has high corrosion resistance. The negative electrode current collector 101 can be formed using, for example, a material having high electric conductivity, such as a metal typified by stainless steel, gold, platinum, zinc, iron, aluminum, copper, or titanium, or an alloy thereof. Note that the negative electrode current collector 101 is preferably formed using an aluminum alloy to which an element which improves heat resistance, such as silicon, titanium, neodymium, scandium, or molybdenum, is added. Alternatively, the negative electrode current collector 101 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, and nickel.

Titanium is particularly preferable as a material for the negative electrode current collector 101. Titanium has higher strength than steel, has mass which is less than or equal to half of that of steel, and is very light. In addition, titanium has strength about twice as high as that is aluminum and is less likely to have metal fatigue than other metals. Thus, titanium allows a light battery to be achieved and can function as a core of a negative electrode active material layer, which has resistance to repeated stress, so that deterioration or breakage due to expansion and contraction of silicon can be suppressed. Moreover, titanium is very suitable for processing by dry etching and makes it possible to form a protrusion portion with a high aspect ratio on a surface of a current collector.

The negative electrode current collector 101 can have a foil-like shape, a plate-like shape (sheet-like shape), a net-like shape, a punching-metal shape, an expanded-metal shape, or the like as appropriate. In the case where a current collector material having a shape with an opening such as a net-like shape, a protrusion portion is formed on a surface of the current collector material other than the opening in a subsequent process.

Figure 1B:
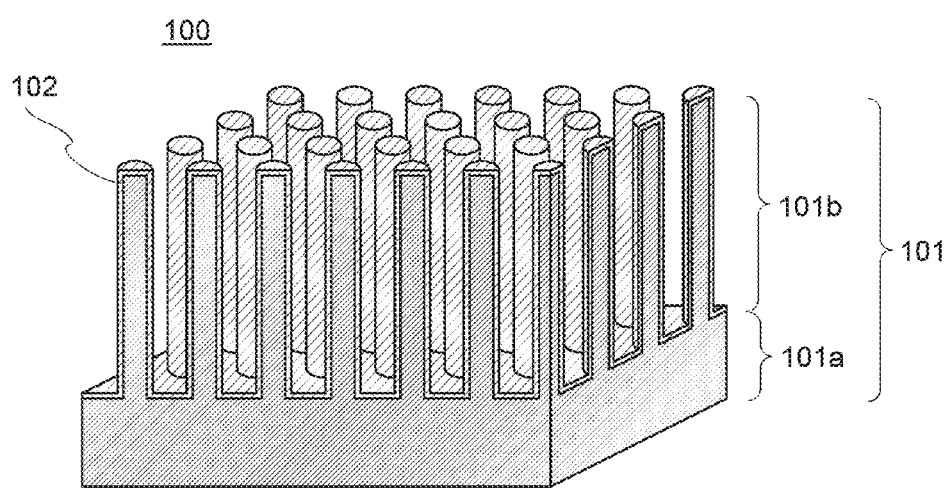

FIG. 1B is a cross-sectional view of a negative electrode 100 in which a negative electrode active material layer 102 is formed over the negative electrode current collector 101. The negative electrode active material layer 102 is provided to cover a top surface of the base portion 101a on which the protrusion portion 101b is not provided and side surfaces and top surfaces of the protrusion portions 101b, that is, an exposed surface of the negative electrode current collector 101.

Note that the term "active material" refers to a material that relates to insertion and extraction of carrier ions. An active material layer may include, in addition to the active material, one or more of a conductive additive, a binder, a graphene, and the like. Thus, the active material and the active material layer are distinguished.

The negative electrode active material layer 102 is formed using any one or more of silicon, germanium, tin, aluminum, and the like, which are capable of insertion and extraction of ions serving as carriers. Note that silicon is preferably used for the negative electrode active material layer 102 because of its high theoretical charge-discharge capacity. In the case where silicon is used as a negative electrode active material, silicon has higher theoretical insertion capacity than black lead which is currently used; thus, an increase in capacity of a lithium secondary battery or a reduction in size of a lithium secondary battery can be achieved.

In the case where silicon is used for the negative electrode active material layer 102, amorphous silicon, microcrystalline silicon, polycrystalline silicon, or a combination thereof can be used. In general, when crystallinity is higher, electric conductivity of silicon is higher; thus, silicon can be used for a battery as an electrode having high conductivity. Meanwhile, more carrier ions such as lithium ions can be inserted in the case of amorphous silicon than in the case of crystalline silicon; thus, discharge capacity can be increased.

As an example in which plural kinds of crystalline silicon are combined, a polycrystalline silicon film is formed over the protrusion portions 101b and an amorphous silicon film is formed over the polycrystalline silicon film, whereby the negative electrode active material layer 102 can have a two-layer structure of the polycrystalline silicon film and the amorphous silicon film. In this case, higher conductivity can be secured by the polycrystalline silicon film on the inner side and carrier ions can be inserted in the amorphous silicon film around the polycrystalline silicon film. Alternatively, instead of the two-layer structure, the negative electrode active material layer 102 can have a structure in which a silicon film is formed to have polycrystalline silicon on the inner side in contact with the current collector and amorphous silicon toward the outer side of the protrusion portion so that the crystallinity continuously changes. In this case, an effect similar to that of the two-layer structure can be obtained.

As another example in which plural kinds of crystalline silicon are combined, amorphous silicon can be used for the negative electrode active material layer over the protrusion portions 101b and polycrystalline silicon can be used for the negative electrode active material layer over the base portion 101a. Fewer ions are inserted in polycrystalline silicon than in amorphous silicon. Thus, the negative electrode active material layer over the protrusion portions 101b is used for the formation of high capacity, while the negative electrode active material layer over the base portion 101a, which is formed of polycrystalline silicon, can be used as a highly reliable film in which expansion is suppressed.

Alternatively, silicon to which an impurity element imparting one conductivity type, such as phosphorus or boron, is added may be used for the negative electrode active material layer 102. Silicon to which the impurity element imparting one conductivity type, such as phosphorus or boron, is added has higher electric conductivity and can increase the electric conductivity of the negative electrode accordingly.

The base portion 101a functions as a terminal of a lithium secondary battery and also as a base of the plurality of protrusion portions 101b. The base portion 101a and the plurality of protrusion portions 101b are formed using the same metal material and are physically continuous. Therefore, the protrusion portion 101b and the base portion 101a are combined to be strongly bonded to each other in a connection portion therebetween; thus, even the connection portion where stress is particularly concentrated because of expansion and contraction of the negative electrode active material layer 102 provided over the base portion 101a and the protrusion portion 101b has strength high enough to withstand the stress. Thus, the protrusion portion 101b can function as a core of the negative electrode active material layer 102.

Figure 2A:
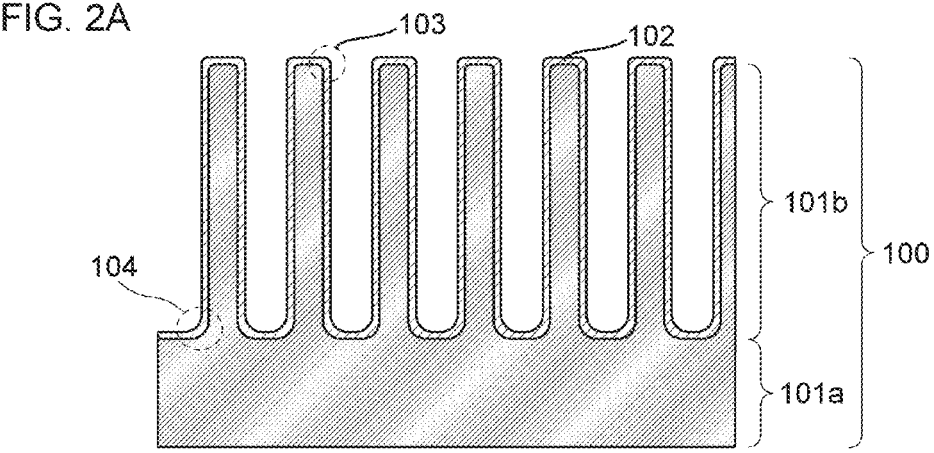
FIGS. 2A to 2C each illustrate a negative electrode.

In particular, as illustrated in FIG. 2A, the protrusion portion 101b preferably has a curvature 104 in the vicinity of the connection portion with the base portion 101a. A base of the protrusion portion is curved so that a surface of the base portion 101a and a side surface of the protrusion portion 101b form a smooth curve without a corner, whereby stress is prevented from being concentrated on one point, and a protrusion which has a strong structure can be obtained.

Moreover, as illustrated in FIG. 2A, a boundary between the side surface and a top surface of the protrusion portion 101b is made to have a curve 103, whereby stress concentration on an edge portion can be reduced and mechanical strength against pressure applied from the above the negative electrode can be obtained.

The plurality of protrusion portions 101b protrude from the base portion 101a in the negative electrode current collector; thus, the surface area of the negative electrode active material layer which covers the current collector is larger than that in the case of a plate-like current collector. Further, the plurality of protrusion portions extend in the same direction and the protrusion portions protrude in the direction perpendicular to the base portion, so that the density of the protrusions in the negative electrode can be increased and the surface area can be increased.

Further, spaces are provided between the plurality of protrusions, whereby contact between active materials covering the protrusions can be reduced even when the active materials are expanded by insertion of lithium ions.

The plurality of protrusion portions have translation symmetry and formed with high uniformity in the negative electrode, so that local reaction can be reduced in each of a positive electrode and the negative electrode, and carrier ions and the active material can react with each other uniformly between the positive electrode and the negative electrode. Thus, in the case where the negative electrode 100 is used for a lithium secondary battery, high-speed charge and discharge becomes possible and breakdown and separation of the active material due to charge and discharge can be suppressed, whereby a lithium secondary battery with improved cycle characteristics can be manufactured.

Furthermore, when the shapes of the protrusions are substantially the same, local charge and discharge can be reduced and the weight of the active material can be controlled. In addition, when the heights of the protrusions are substantially the same, load can be prevented from being applied locally in a manufacturing process of a battery, which results in an increase in the yield. Thus, specifications of the battery can be well controlled.

Figure 2B:
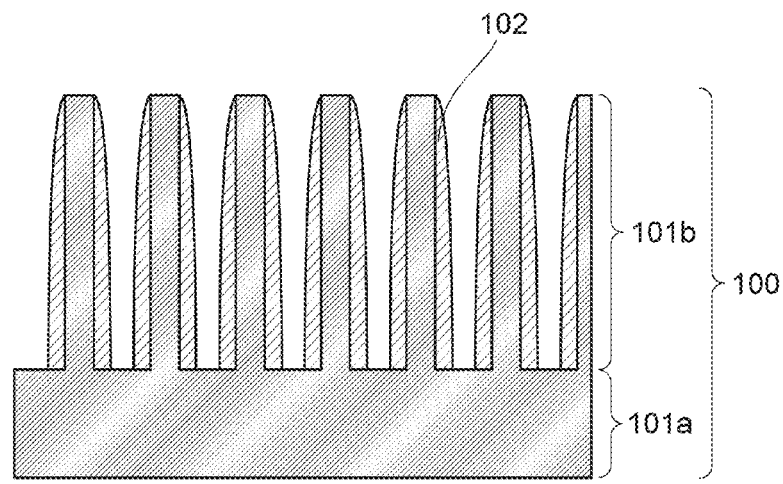
Figure 2C:
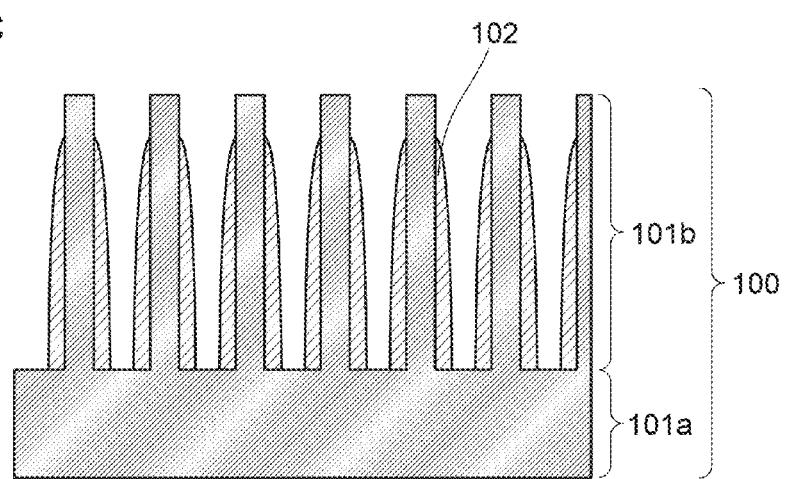

Note that as illustrated in FIGS. 2B and 2C, a structure in which the negative electrode active material layer 102 is formed on only the side surfaces of the protrusion portions 101b and is not formed on the top surfaces of the protrusion portions 101b and the top surface of the base portion 101a can be employed. In addition, although not illustrated, a structure in which the negative electrode active material layer 102 is formed on only the side surfaces and top surfaces of the protrusion portions 101b can be employed. Although, in these cases, there is a disadvantage of a reduction in discharge capacity due to a reduction in the surface area of the negative electrode active material layer, expansion of the negative electrode active material formed on the side surfaces of the protrusion portions 101b is not suppressed at bases of the protrusion portions; thus, generation of cracks or deformation and breakage can be reduced. As a result, reliability of a lithium secondary battery can be improved. Further, in the case where the top surfaces of the protrusion portions 101b are exposed, flatness of the top surfaces of the protrusions, which might be lost when covered with the negative electrode active material layer, can be maintained.

In the case where the negative electrode active material layer 102 is provided on only the side surfaces of the protrusion portions 101b, the negative electrode active material layer 102 can be provided on the entire side surfaces of the protrusion portions 101b as illustrated in FIG. 2B, or parts of the side surfaces of the protrusion portions 101b can be exposed as illustrated in FIG. 2C. In the former case, the surface area of the negative electrode active material layer can be larger than that in the latter case, which results in an increase in discharge capacity. In contrast, in the latter case, for example, upper parts of the side surfaces of the protrusion portions 101b are exposed, so that spaces which allow upward expansion of the negative electrode active material layer 102 at the time of insertion of carrier ions can be provided.

Figure 3A:
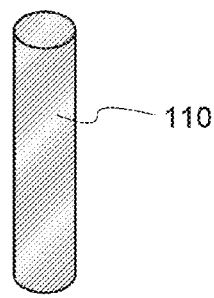
FIGS. 3A to 3I each illustrate a shape of a protrusion portion of a negative electrode current collector.
Figure 3B:
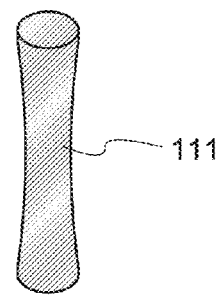
Figure 3C:
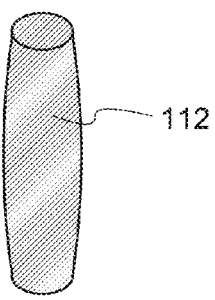
Figure 3D:
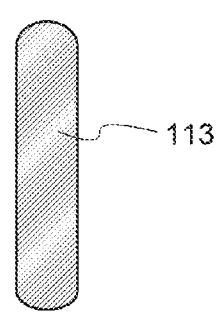
Figure 3E:
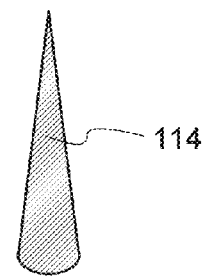
Figure 3F:
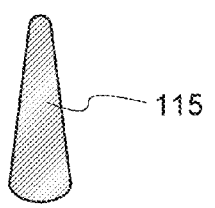
Figure 3G:
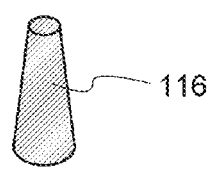
Figure 3H:
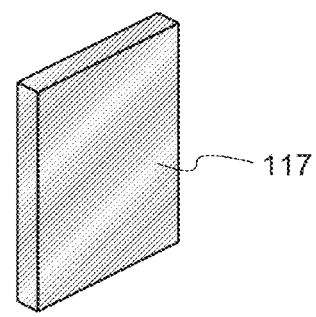
Figure 3I:
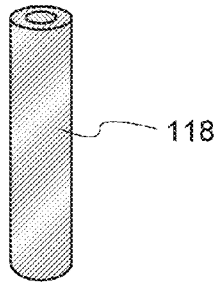

Shapes of the protrusion portion 101b described in this embodiment are described with reference to FIGS. 3A to 3I. A columnar protrusion 110 illustrated in FIG. 3A can be used as the protrusion portion 101b. The shape of a cross section which is parallel to the base portion is circular in the columnar protrusion 110, so that stress is applied isotropically from all directions; thus, a uniform negative electrode can be obtained. FIGS. 3B and 3C similarly illustrate columnar protrusions: a protrusion 111 in which the column is depressed inward and a protrusion 112 in which the column expands outward. These shapes are more capable of controlling stress applied to the protrusions than the simple columnar protrusion illustrated in FIG. 3A; thus, the mechanical strength can be increased by an appropriate structure design. A protrusion 113 illustrated in FIG. 3D has a structure in which a top surface of the columnar illustrated in FIG. 3A is curved. In the protrusion 113, stress applied to an edge portion of the top surface can be reduced more than in the columnar protrusion 110 illustrated in FIG. 3A, and coverage with a negative electrode active material layer formed over the protrusion 113 can be improved more than in the columnar protrusion 110 illustrated in FIG. 3A. FIG. 3E illustrates a conical protrusion 114. FIG. 3F illustrates a conical protrusion 115 which has a rounded end. FIG. 3G illustrates a conical protrusion 116 with a flat end. As in the protrusions 114, 115, and 116, the conical shape particularly enables the connection area with a base portion of a negative electrode current collector and resistance to stress to be increased. FIG. 3H illustrates a plate-like protrusion 117. FIG. 3I illustrates a pipe-like protrusion 118. In the pipe-like protrusion with a cavity inside, a negative electrode active material can be provided also in the cavity, so that the discharge capacity of the negative electrode can be increased.

It is preferable that the above-described protrusions have the curvature 104 in the vicinity of the connection portion with the base portion 101a as illustrated in FIG. 2A. A base of the protrusion portion is curved so that a surface of the base portion 101a and a side surface of the protrusion portion 101b are a smooth curved surface without a corner, whereby stress is prevented from being concentrated on one point and a protrusion which has a strong structure can be obtained.

The above-described shapes of the protrusion portion 101b are examples and the protrusion portion 101b described in this embodiment is not limited to the protrusions 110 to 118. The protrusion portion 101b may have a combination of these shapes or a modified form of any of these shapes. A plurality of protrusions may be selected from the protrusions 110 to 118 as the plurality of protrusion portions 101b.

In particular, the protrusions 110, 111, 112, 116, 117, and 118 each have a flat surface at the end and can support a spacer described later with the flat surface in the case where the spacer is provided over the protrusions, and thus are suitable for a separator-less structure. Note that in FIG. 1A, the columnar protrusion 110 is used as the protrusion portion 101b.

In the protrusion with a flat end, the shape of the flat surface is not limited to circular shapes as in the protrusions 110, 111, 112, and 116, a plate-like shape as in the protrusion 117, and a pipe-like shape as in the protrusion 118, and may be any shape by which a flat surface can be formed, such as an elliptical shape and a polygonal shape.

A shape of a top surface of the negative electrode current collector described in this embodiment is described with reference to FIGS. 4A to 4D.

Figure 4A:
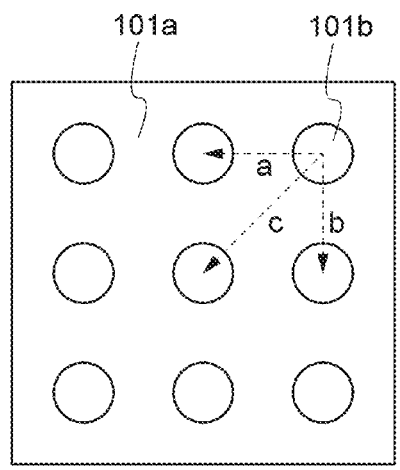
FIGS. 4A to 4D each illustrate a negative electrode current collector.
Figure 4B:
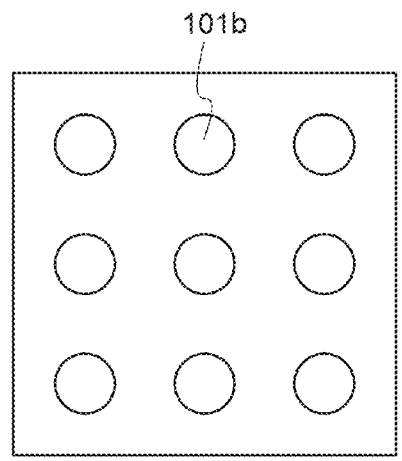

FIG. 4A is a top view illustrating the base portion 101a and the plurality of protrusion portions 101b protruding from the base portion 101a. The plurality of protrusion portions 101b with circular top surfaces are arranged. FIG. 4B is a top view after movement of FIG. 4A in the direction a. In FIGS. 4A and 4B, the plurality of protrusion portions 101b are located at the same positions. Here, the plurality of protrusion portions 101b in FIG. 4A move in the direction a; however, the same result as FIG. 4B can be obtained after movement in the direction b or c. In other words, in a plane coordinates where the cross sections of the protrusions are arranged, the plurality of protrusion portions 101b illustrated in FIG. 4A have translation symmetry in which the positions of the protrusions are symmetric in translational operation.

Figure 4C:
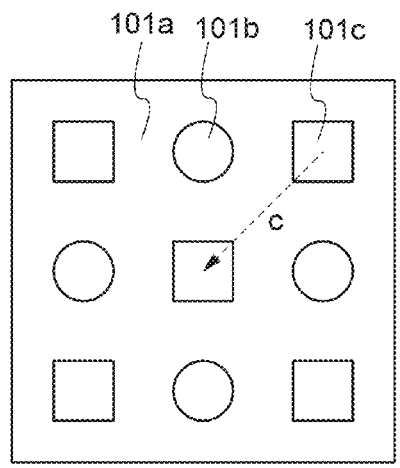
Figure 4D:
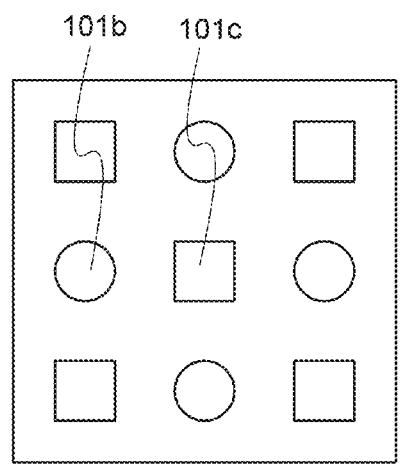

FIG. 4C is a top view illustrating the base portion 101a and the plurality of protrusion portions 101b protruding from the base portion 101a. The protrusion portions 101b with circular top surfaces and protrusion portions 101c with square top surfaces are alternately arranged. FIG. 4D is a top view after movement of the protrusion portions 101b and 101c in the direction c. In the top views of FIGS. 4C and 4D, the protrusion portions 101b and 101c are located at the same positions. In other words, the plurality of protrusion portions 101b and 101c illustrated in FIG. 4C have translation symmetry.

By providing the plurality of protrusions such that they have translation symmetry, variation in electron conductivity among the plurality of protrusions can be reduced. Accordingly, local reaction in the positive electrode and the negative electrode can be reduced, reaction between carrier ions and the active material can occur uniformly, and diffusion overvoltage (concentration overvoltage) can be prevented, so that the reliability of battery characteristics can be increased.

The width (diameter) of each of the plurality of protrusion portions 101b in the cross section is greater than or equal to 50 nm and less than or equal to 5 µm. The height of each of the plurality of protrusion portions 101b is greater than or equal to 1 µm and less than or equal to 100 µm. Thus, the aspect ratio of each of the plurality of protrusion portions 101b is greater than or equal to 0.2 and less than or equal to 2000.

The height of the protrusion portion 101b here means the length of a perpendicular line drawn from the top (or top surface) of the protrusion portion 101b to the surface of the base portion 101a in the cross-sectional shape in the longitudinal direction of the protrusion portion. Note that the boundary between the base portion 101a and the protrusion portion 101b is not always clear because the base portion 101a and the protrusion portion 101b are formed using the same current collector material as described later. For this reason, a plane in the current collector, which is located on the same level as the top surface of the base portion 101a in a contact portion between the base portion 101a and the protrusion portion 101b of the current collector is defined as the boundary between the base portion and the protrusion portion. Here, the boundary between the base portion and the protrusion portion is not included in the top surface of the base portion. In the case where the top surface of the base portion is rough, the top surface of the base portion is defined by the position obtained by average surface roughness.

The space between the adjacent protrusion portions 101b is preferably greater than or equal to 3 times and less than 5 times as large as the thickness of the negative electrode active material layer 102 which is formed over the protrusion portion 101b. The reason for this is described below. When the space between the protrusion portions 101b is twice as large as the thickness of the negative electrode active material layer 102, the space is eliminated after the formation of the negative electrode active material layer 102; meanwhile, when the space is 5 times or more as large as the thickness of the negative electrode active material layer 102, the area of the exposed base portion 101a is increased, which has little effect of increasing the surface area by the formation of the protrusions.

The thickness of the negative electrode active material layer 102 is preferably greater than or equal to 50 nm and less than or equal to 5 µm. This thickness range is substantially the same as the design range of the diameter of the protrusion portion 101b. A thickness of 50 nm or more enables charge-discharge capacity to be increased, and a thickness of 5 µm or less enables breakage of the negative electrode active material layer 102 or the protrusion portion 101b to be prevented even if the negative electrode active material layer 102 is expanded because of charge and discharge.

Consequently, even if the volume of the protrusion portions 101b increases because of charge of the lithium secondary battery including the negative electrode 100, the protrusion portions 101b are not in contact with each other and can be prevented from being broken, and a reduction in the charge-discharge capacity of the lithium secondary battery can be prevented.

(Manufacturing Method 1 of Negative Electrode)

Next, a manufacturing method of the negative electrode 100 illustrated in FIG. 1B will be described with reference to FIGS. 5A to 5C.

Figure 5A:
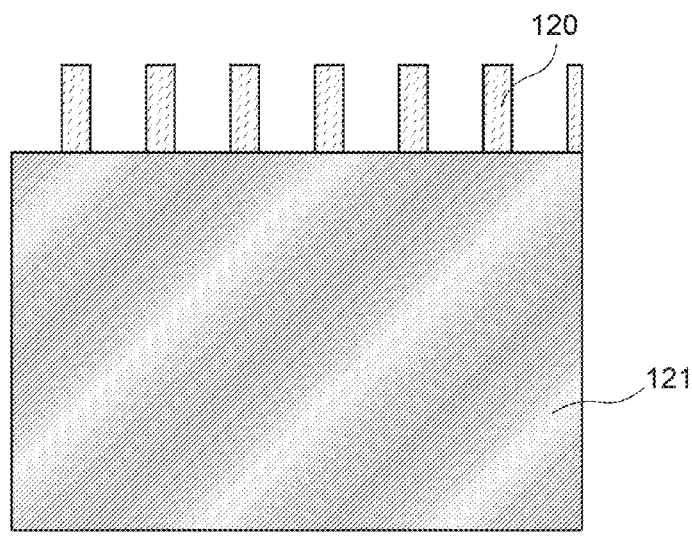
FIGS. 5A to 5C illustrate a manufacturing method of a negative electrode.

As illustrated in FIG. 5A, a photoresist pattern 120 which serves as a mask in an etching step is formed over a current collector material 121.

The current collector material 121 is formed using a material which is not alloyed with lithium in a potential region used as the current collector and has high corrosion resistance. The current collector material 121 can be formed using, for example, a material having high electric conductivity, such as a metal typified by stainless steel, gold, platinum, zinc, iron, aluminum, copper, or titanium, or an alloy thereof. Note that the current collector material 121 is preferably formed using an aluminum alloy to which an element which improves heat resistance, such as silicon, titanium, neodymium, scandium, or molybdenum, is added. Alternatively, the current collector material 121 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, and nickel.

Titanium is particularly preferable as the current collector material 121. Titanium has higher strength than steel, has mass which is less than or equal to half of that of steel, and is very light. In addition, titanium has strength about twice as high as that of aluminum and is less likely to have metal fatigue than other metals. Thus, titanium allows light battery to be achieved and can function as a core of a negative electrode active material layer, so that deterioration or breakage due to expansion and contraction of silicon can be suppressed. Moreover, titanium is very suitable for processing by dry etching and makes it possible to form a protrusion portion with a high aspect ratio on a surface of a current collector.

The current collector material 121 can have a foil-like shape, a plate-like shape (sheet-like shape), a net-like shape, a punching-metal shape, an expanded-metal shape, or the like as appropriate. In the case where a current collector material having a shape with an opening such as a net-like shape, a protrusion portion is formed on a surface of the current collector material other than the opening in a subsequent process.

The photoresist pattern 120 is exposed to light and developed in a photolithography process to be formed into a desired shape. The photoresist pattern 120 can be formed by an inkjet method, a printing method, or the like, instead of photolithography.

Figure 5B:
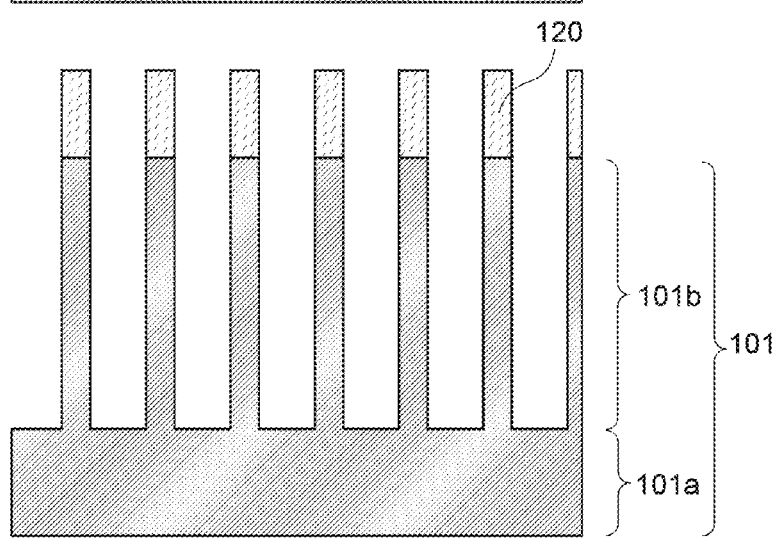
Figure 5C:
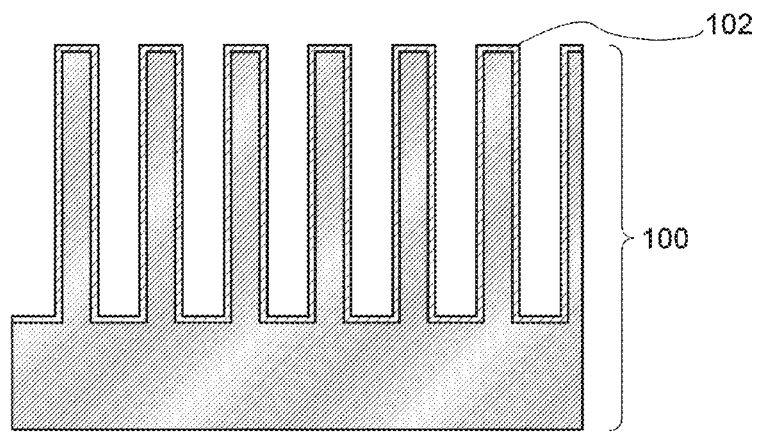

Next, the current collector material 121 is selectively etched using the photoresist pattern 120, whereby the negative electrode current collector 101 including the base portion 101a and the plurality of protrusion portions 101b is formed as illustrated in FIG. 5B. As a method of etching the current collector material, dry etching or wet etching can be used as appropriate. In particular, in the case where a protrusion portion with a high aspect ratio is formed, dry etching is preferably used.

For example, the current collector material 121 is etched using a mixed etching gas of $BCl_3$ and $Cl_2$ with an inductively coupled plasma (ICP) apparatus, whereby the negative electrode current collector 101 including the base portion 101a and the plurality of protrusion portions 101b can be formed. The flow ratio of the etching gas may be adjusted as appropriate. For example, the flow ratio of $BCl_3$ to $Cl_2$ can be set to 3:1.

The protrusion portion 101b can be formed into any shape by adjusting etching conditions such as an initial shape of the photoresist pattern, etching time, an etching gas, applied bias, pressure in a chamber, and substrate temperature as appropriate.

As described in this embodiment, the current collector material is etched using the photoresist pattern 120 as a mask, whereby a plurality of protrusion portions extending substantially perpendicularly in the longitudinal direction can be formed. In addition, a plurality of protrusion portions which have substantially the same shape and are uniform can be formed.

After the protrusion portions 101b are formed, a remaining part of the current collector material 121 serves as the base portion 101a. The surface of the base portion 101a may be flat. In the case where the surface becomes rough because of the etching step, the surface area of the negative electrode active material layer which is formed in a later step is increased, which contributes to an increase in battery capacity.

After the protrusion portions 101b are formed in the etching step, the photoresist pattern 120 used as a mask is removed in a photoresist separation step.

Next, the negative electrode active material layer is formed over the negative electrode current collector 101. It is preferable that the negative electrode active material layer 102 covers the exposed top surface of the negative electrode current collector as illustrated in FIG. 5C. In other words, the side surfaces and top surfaces of the protrusion portions 101b and the top surface of the base portion 101a where the protrusion portions 101b are not formed are covered with the negative electrode active material layer 102.

In the case where the negative electrode active material layer 102 is formed using silicon, the negative electrode active material layer 102 can be formed by a chemical vapor deposition (CVD) method typified by a plasma CVD method or a thermal CVD method, or a physical vapor deposition method typified by a sputtering method. Silicon can be single crystal silicon, polycrystalline silicon, amorphous silicon, or a combination thereof. Note that silicon may be n-type silicon to which phosphorus is added or p-type silicon to which boron is added.

After that, the negative electrode active material layer 102 is isotropically etched with an ICP apparatus or the like to remove part of the negative electrode active material layer 102, whereby the negative electrode 100 in which the negative electrode active material layer 102 is provided on only the side surfaces of the protrusion portions 101b as illustrated in FIG. 2B or 2C can be manufactured. In the case where the etching is terminated at the time when the top surfaces of the protrusion portions 101b are exposed, the negative electrode 100 in which the negative electrode active material layer remains on the entire side surfaces of the protrusion portions 101b as illustrated in FIG. 2B can be obtained. Meanwhile, in the case where etching is further performed after the top surfaces of the protrusion portions 101b are exposed, the negative electrode 100 in which parts of the protrusion portions 101b are exposed as illustrated in FIG. 2C can be obtained.

(Manufacturing Method 2 of Negative Electrode)

Next, a manufacturing method of the negative electrode 100 illustrated in FIG. 1B, which is different from Manufacturing Method 1 of Negative Electrode, will be described with reference to FIGS. 6A to 6D. This manufacturing method is different from Manufacturing Method 1 of Negative Electrode in that a protective layer is formed to be used as a hard mask for etching.

Figure 6A:
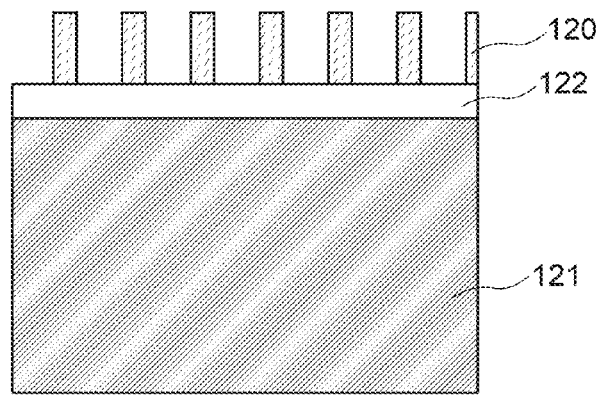
FIGS. 6A to 6D illustrate a manufacturing method of a negative electrode.
Figure 6B:
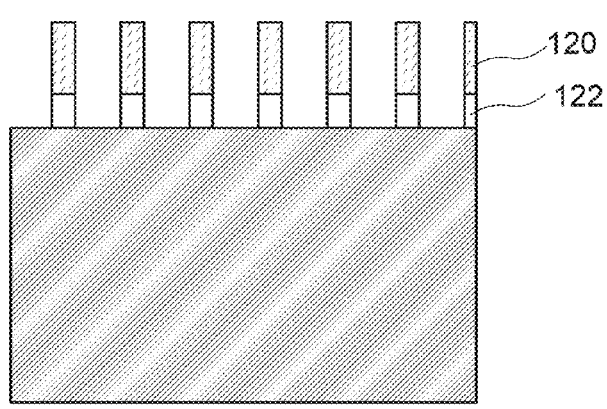

First, a protective layer 122 is formed over the current collector material 121 which is the same as that in Manufacturing Method 1 of Negative Electrode (see FIG. 6A). The protective layer 122 can be formed by a CVD method, a sputtering method, an evaporation method, a plating method, or the like. The thickness of the protective layer 122 is preferably greater than or equal to 100 nm and less than or equal to 10 µm. The protective layer 122 serves as a hard mask in an etching step, and is thus preferably formed using a material which is highly resistant to etching with a gas used for etching the current collector material 121. For example, an insulator such as a silicon nitride film, a silicon oxide film, or a silicon oxynitride film can be used for the protective layer 122. Such an insulator is used for the protective layer 122, whereby higher etching selectivity than in the case of using a photoresist can be obtained. In the case where a material which is alloyed with lithium is selected, the protective layer 122 can be used as part of the negative electrode active material layer, which contributes to an increase in capacity of a lithium secondary battery. Further, in the case where a material with high electric conductivity is selected, the protective layer 122 can serve as part of a protrusion portion of the negative electrode current collector. However, a material which reacts with lithium ions to form irreversible capacity at the first charge of a lithium secondary battery should not be selected for the protective layer 122.

Next, as illustrated in FIG. 6A, the photoresist pattern 120 is formed over the protective layer 122. Unlike in Manufacturing Method 1 of Negative Electrode, the photoresist pattern 120 is used to pattern the protective layer 122. The protective layer 122 is processed into a desired pattern using the photoresist pattern 120 as a mask (see FIG. 6B).

Figure 6C:
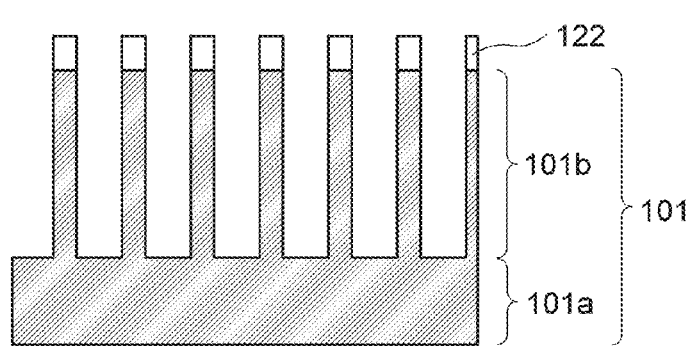

The photoresist pattern 120 is separated and removed with a chemical solution, and then the current collector material 121 is selectively etched using the protective layers 122 separated into individual patterns as masks as illustrated in FIG. 6C. By this etching step, the base portion 101a and the protrusion portions 101b in the negative electrode current collector 101 are formed.

Figure 6D:
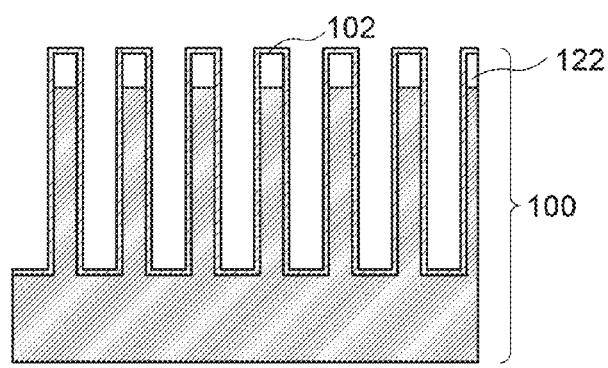

After that, as illustrated in FIG. 6D, the negative electrode active material layer 102 is formed so as to covers a surface of the base portion 101a, which is not provided with the protrusion portions, side surfaces of the protrusion portions 101b, and side surfaces and top surfaces of the protective layers 122. The negative electrode active material layer 102 can be formed in a manner similar to that described in Manufacturing Method 1 of Negative Electrode.

The above-described manufacturing method allows the negative electrode 100 including the protective layers 122 to be directly formed on the protrusion portions 101b. Note that although the photoresist pattern 120 is removed at the time between the patterning of the protective layer 122 and the etching of the current collector material 121 in this manufacturing method, the photoresist pattern 120 may be removed after the current collector material 121 is etched.

In the case where the protrusion portions 101b are made tall, that is, etching time long, if only the photoresist pattern is used as a mask, the thickness of the mask is gradually reduced to remove part of the mask, so that the surface of the current collector material 121 is exposed. This causes variation in height between the protrusion portions 101b. However, the use of the separated protective layers 122 as hard masks enables the current collector material 121 to be prevented from being exposed, so that the variation in height between the protrusion portions 101b can be reduced.

When the protective layers 122 directly on the protrusion portions 101b are formed using a conductive material, the protective layers 122 can serve as part of the current collector. In addition, when the protective layers 122 are formed using a material which is alloyed with lithium, the protective layers 122 can also serve as part of the negative electrode active material layer.

The protective layers 122 directly on the protrusion portions 101b contribute to an increase in the surface area of the negative electrode active material layer 102. In particular, in the case where the protrusion portions 101b are made tall, the etching time is long and there is a limitation on the height that can be formed. When the protective layers 122 are formed thickly in view of the above, the protrusions on the base portion 101a can be long, which results in an increase in discharge capacity of the lithium secondary battery. The ratio of the height of the protrusion portion 101b formed using the current collector material to the height (thickness) of the protective layer 122 can be adjusted arbitrarily by control of the thickness or the etching conditions. Such a free design of a ratio allows a variety of effects to be obtained. For example, the shapes of the side surfaces of the protective layer 122 and the protrusion portion 101b are not necessarily the same because the protective layer 122 and the protrusion portion 101b are formed using different materials and processed in different etching steps. By using this fact, the shape of the protrusion can be designed arbitrarily. By designing the position of a boundary between the protective layer 122 and the protrusion portion 101b, a protrusion with high mechanical strength can be formed.

(Manufacturing Method 3 of Negative Electrode)

Although the negative electrode is manufactured by using photolithography for the formation of the photoresist pattern in Manufacturing Method 1 of Negative Electrode and Manufacturing Method 2 of Negative Electrode, the negative electrode 100 illustrated in FIG. 1B is manufactured by a different method in this manufacturing method. This manufacturing method will be described with reference to FIGS. 7A to 7D. In this manufacturing method, the negative electrode current collector is manufactured by a nanoimprint method (hereinafter "nanoimprint lithography").

The nanoimprint lithography is a microfabrication technology of a wiring that was proposed in 1995 by Stephen Y. Chou, a Professor of Princeton University, et al. The nanoimprint lithography has attracted attention owing to its capability of microfabrication to a resolution of about 10 nm at low cost without using a high-cost light exposure apparatus. There are thermal nanoimprint lithography and photo nanoimprint lithography in the nanoimprint lithography. A thermoplastic solid resin is used in the thermal nanoimprint lithography; a photocurable liquid resin is used in the photo nanoimprint lithography.

Figure 7A:
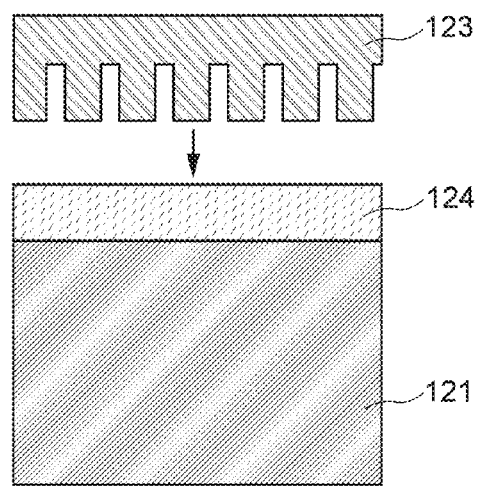
FIGS. 7A to 7D illustrate a manufacturing method of a negative electrode.

As illustrated in FIG. 7A, a resin 124 is applied over the current collector material 121 which is the same as that in Manufacturing Method 1 of Negative Electrode. As the resin 124, a thermoplastic resin is used in the case of the thermal nanoimprint lithography, while a photocurable resin which is cured by ultraviolet rays is used in the case of the photo nanoimprint lithography. As the thermoplastic resin, for example, polymethylmethacrylate (PMMA) can be used. A mold 123 is pressed against the resin 124 formed over the current collector material 121 to process the resin 124 into a desired pattern. The mold 123 used is obtained in the following manner: a resist is applied over a thermal silicon oxide film or the like, the resist is patterned by direct writing with an electron beam, and the thermal silicon oxide film is etched using the patterned resist as a mask.

In the case of the thermal nanoimprint lithography, a thermoplastic resin is heated to be softened before the mold 123 is pressed against the thermoplastic resin. Pressure is applied with the mold 123 in contact with the resin 124 to deform the resin 124 and cooling is performed with the pressure applied to cure the resin 124, whereby the concavity and convexity of the mold 123 are transferred to the resin 124 (see FIG. 7B).

Figure 7B:
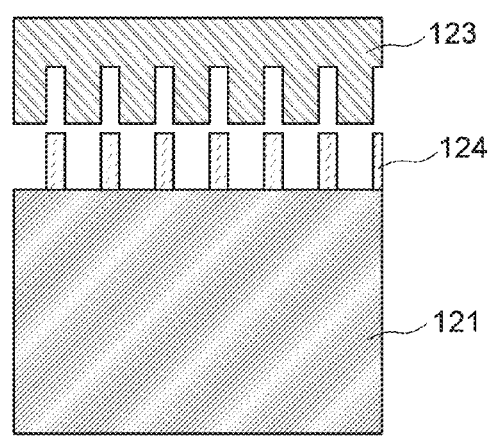

In contrast, in the case of the photo nanoimprint lithography, the mold 123 is made in contact with the resin 124 to deform the resin 124, the resin 124 in this state is irradiated with ultraviolet rays to be cured, and then the mold is detached from the resin 124, whereby the concavity and convexity of the mold 123 can be transferred to the resin 124 (see FIG. 7B).

In either the thermal nanoimprint lithography or the photo nanoimprint lithography, since the mold 123 is pressed against the resin 124, the resin 124 remains under the mold 123 in some cases, and in such a case a film remains at the bottom of a depressed portion of the resin 124 which has been modified and processed. For this reason, a surface of the resin 124 is subjected to anisotropic etching (RIE) with an oxygen gas to remove the remaining film. Through the above steps, the separated resins 124 which serve as masks in an etching step are formed.

Figure 7C:
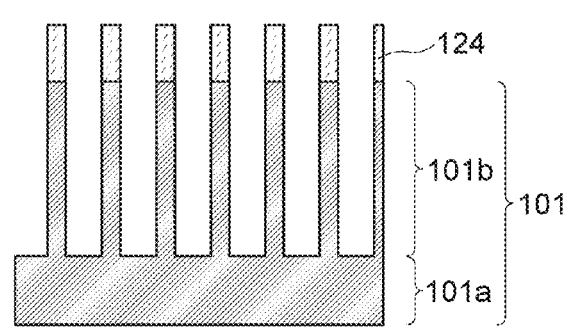
Figure 7D:
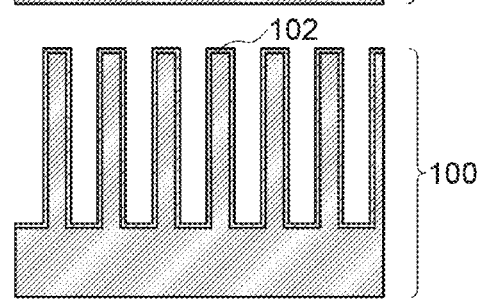

After that, in a manner similar to that in Manufacturing Method 1 of Negative Electrode, the current collector material 121 is etched using the resins 124 as masks to form the plurality of protrusion portions 101b and the base portion 101a (see FIG. 7C). Furthermore, the negative electrode active material layer 102 is formed to cover the negative electrode current collector 101 (see FIG. 7D).

Through the above steps, the negative electrode current collector 101 with a microstructure can be manufactured without using photolithography. In particular, in this manufacturing method, an expensive light exposure apparatus and an expensive photomask are not used; thus, the negative electrode 100 can be manufactured at low cost. Moreover, a sheet-like material can be used as the current collector material 121 and a roll-to-roll method can be employed; thus, this manufacturing method is suitable for mass production of negative electrodes.

(Manufacturing Method 4 of Negative Electrode)

In this manufacturing method, the negative electrode 100 illustrated in FIG. 1B is manufactured by a method different from those in Manufacturing Methods 1 to 3 of Negative Electrodes. This manufacturing method will be described with reference to FIGS. 8A to 8C. In this manufacturing method, protrusion portions are formed on a surface of a current collector material, and then the protrusion portions are covered with a conductive layer formed using a conductive material different from the current collector material, whereby a negative electrode current collector is manufactured.

Figure 8A:
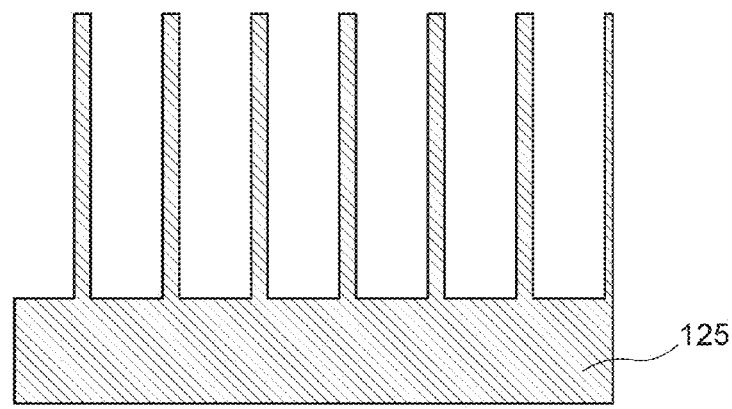
FIGS. 8A to 8C illustrate a manufacturing method of a negative electrode.

First, as illustrated in FIG. 8A, protrusion portions are formed using a current collector material 125 by any of the methods described in Manufacturing Methods 1 to 3 of Negative Electrodes, and the like. Alternatively, the protrusion portions may be formed by pressing. The protrusion portions are covered with a conductive layer after this step, and thus need to have a diameter in view of the thickness of the conductive layer with which the protrusion portions are covered.

This manufacturing method is advantageous in that even a material which is difficult to function as a core of a negative electrode active material layer can be selected as the current collector material 125 because the protrusion portions are covered with the conductive layer. For example, copper or aluminum has high electric conductivity and is suitable for being processed. Thus, copper or aluminum allows the protrusion portions to be formed by pressing. However, copper or aluminum has high ductility and thus does not have structural strength high enough to function as a core of the negative electrode active material layer. Moreover, since a passivation film which is an insulator is formed on a surface of aluminum, electrode reaction does not occur even when an active material is made to be in direct contact with the aluminum surface. For this reason, a conductive layer 126 is separately formed over the current collector material, so that the above problems can be solved.

Further, even if a material which can function as a core of a negative electrode active material layer is used as the current collector material 125, by covering the protrusion portions with a conductive layer formed using a hard material, mechanical strength can be further increased.

Figure 8B:
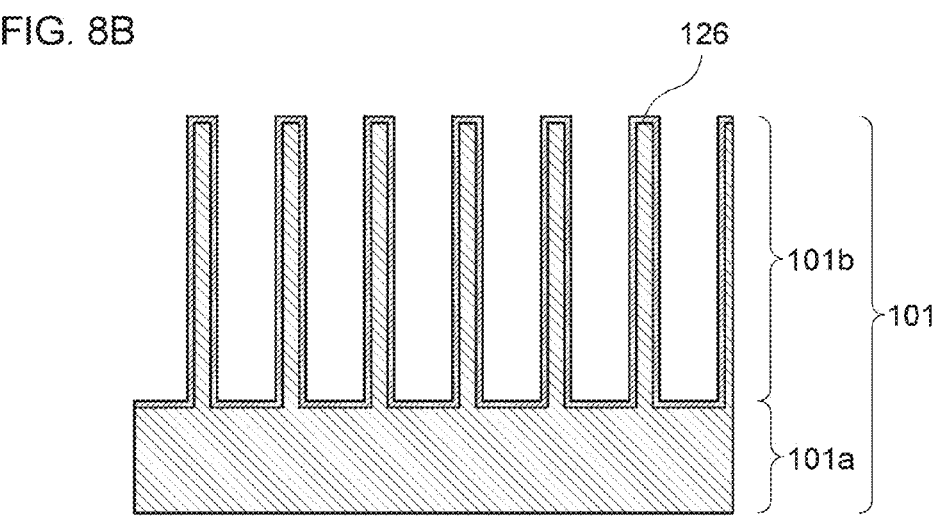

As illustrated in FIG. 8B, the conductive layer 126 is formed to cover the surface of the current collector material where the protrusion portions are formed. In this manner, the negative electrode current collector 101 including the base portion 101a and the protrusion portions 101b is formed.

A conductive material which is not alloyed with lithium can be used for the conductive layer 126. For example, a metal typified by stainless steel, gold, platinum, silver, zinc, iron, aluminum, copper, titanium, or nickel, or an alloy thereof can be used.

The conductive layer 126 can be formed by a sputtering method, an evaporation method, a metal organic chemical vapor deposition (MOCVD) method, or the like.

Figure 8C:
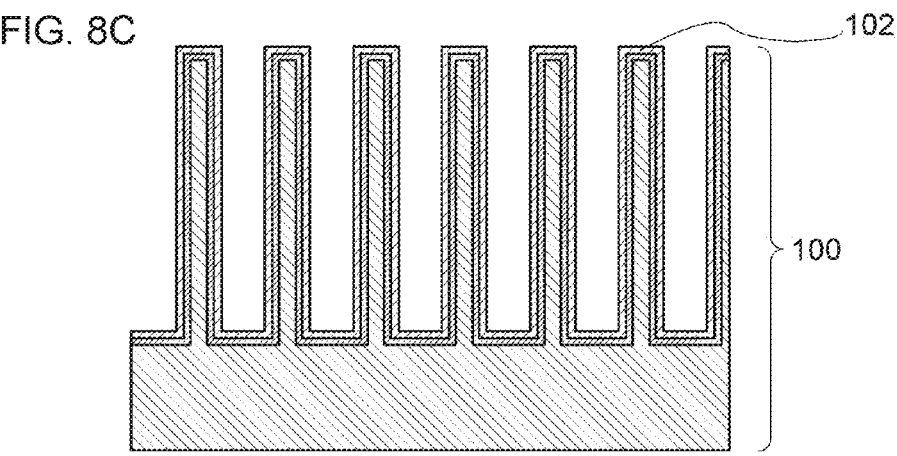

Then, as illustrated in FIG. 8C, the negative electrode active material layer 102 is formed over the conductive layer 126 by any of the methods given above. Through the above steps, the negative electrode 100 is manufactured.

In this manufacturing method, for example, the conductive layer which is formed using titanium by a sputtering method is formed over the current collector material including copper, whereby the protrusion portions with high strength can be formed. Thus, the protrusion portions can sufficiently function as cores even when the silicon negative electrode active material expands and contracts because of insertion and extraction of lithium; thus, the reliability of the negative electrode can be improved.

This embodiment can be implemented in combination with any of the other embodiments as appropriate.
[Embodiment 2]

In this embodiment, a mode in which graphene is provided over the negative electrode active material layer of the negative electrode described in Embodiment 1 will be described with reference to FIGS. 9A to 9C.
(Structure of Negative Electrode Using Graphene)

Graphene refers to single-layer graphene, which is one atomic layer of a sheet of carbon molecules having $sp^2$ bonds. Graphene is chemically stable, has favorable electric characteristics, and thus has been expected to be applied to channel regions of transistors, vias, wirings, and the like included in semiconductor devices; therefore, in recent years, graphene has actively been researched and developed. In this embodiment, such graphene is used for the negative electrode described in Embodiment 1.

Figure 9A:
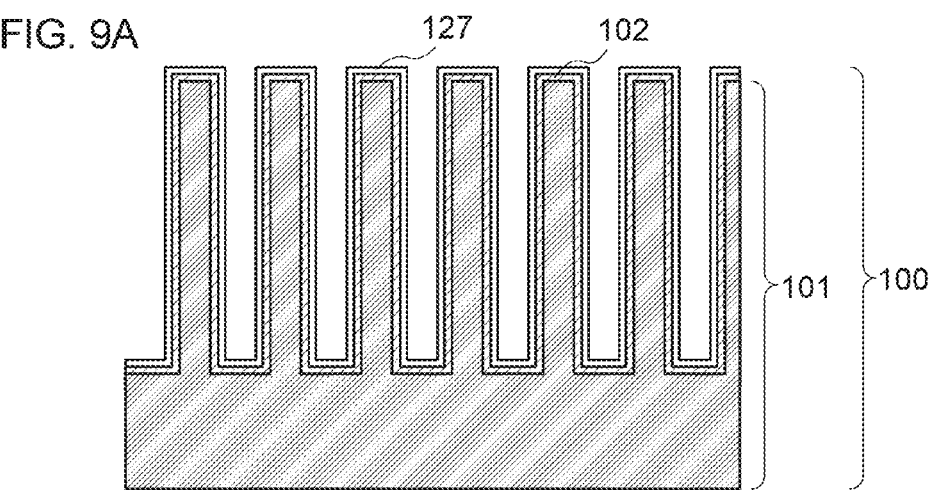
FIGS. 9A to 9C each illustrate a negative electrode.

FIG. 9A illustrates an example in which graphene 127 is applied to the negative electrode 100 which is formed by a method shown in Manufacturing Method 1 of Negative Electrode or Manufacturing Method 3 of Negative Electrode in Embodiment 1, or the like. The graphene 127 is formed so as to cover the negative electrode active material layer 102 which is formed over the base portion and the protrusion portions of the negative electrode current collector 101. The surface of the negative electrode active material layer 102 may be entirely or partly covered with the graphene 127. For example, only the negative electrode active material layer 102 on the sidewalls of the protrusion portions may be covered with the graphene 127. The graphene, which is a sheet of carbon molecules, covers the negative electrode active material layer 102 without a space or with spaces in places in a spot-like manner.

Figure 9B:
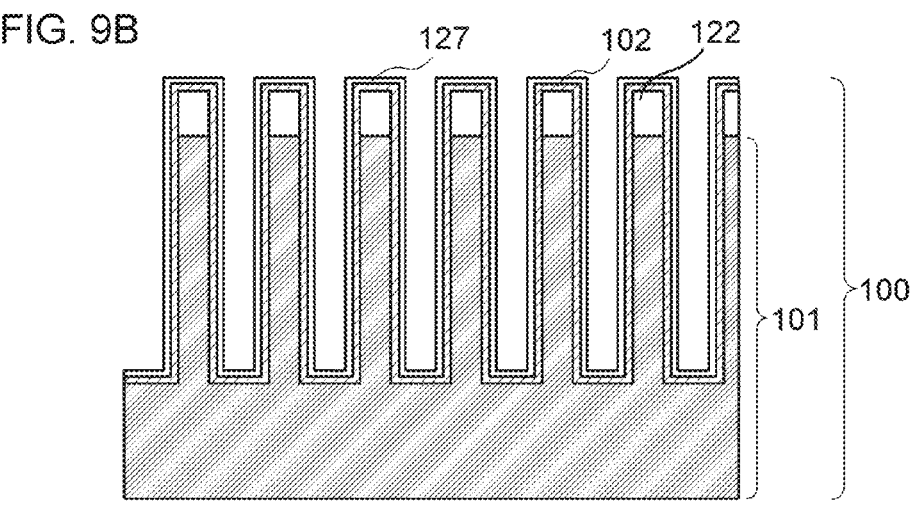

FIG. 9B illustrates an example in which the graphene 127 is applied to the negative electrode 100 which is formed by a method shown in Manufacturing Method 2 of Negative Electrode in Embodiment 1, or the like. FIG. 9B is the same as FIG. 9A, except that the protective layer 122 is provided at the end of the protrusion portion.

Figure 9C:
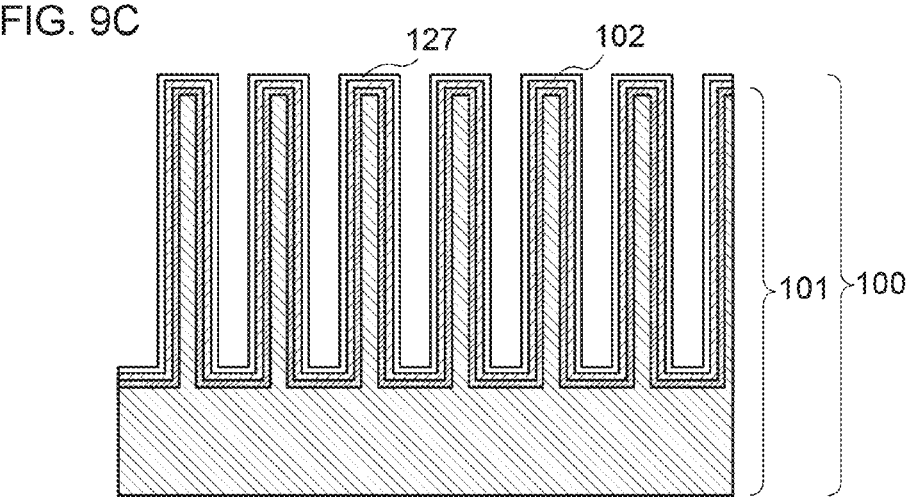

FIG. 9C illustrates an example in which the graphene 127 is applied to the negative electrode 100 which is formed by a method shown in Manufacturing Method 4 of Negative Electrode in Embodiment 1. FIG. 9C is the same as FIG. 9A, except that the protrusion portion includes a current collector material and a conductive layer.

The graphene 127 functions as a conductive additive. The graphene 127 functions as an active material in some cases.

The graphene 127 includes a single-layer graphene and a multilayer graphene in its category. The graphene 127 has a sheet-like shape with a length of several micrometers.

The single-layer graphene refers to a sheet of carbon molecules having $sp^2$ bonds with a thickness of one atomic layer and is very thin. In addition, six-membered rings each composed of carbon atoms are connected in the planar direction, and poly-membered rings each formed when a carbon-carbon bond in part of a six-membered ring is broken, such as a seven-membered ring, an eight-membered ring, a nine-membered ring, and a ten-membered ring, are partly formed.

A poly-membered ring is composed of a carbon atom and an oxygen atom in some cases. Further, an oxygen atom is bonded to one of carbon atoms in a poly-membered ring composed of the carbon atoms in some cases. The above poly-membered ring is formed when a carbon-carbon bond in part of a six-membered ring is broken and an oxygen atom is bonded to a carbon atom whose bond is broken. Therefore, an opening serving as a path through which ions can transfer is included in the bond between the carbon atom and the oxygen atom. That is, as the proportion of oxygen atoms included in a graphene is higher, the proportion of openings each functioning as a path through which ions can transfer is increased.

Note that in the case where the graphene 127 contains oxygen, the proportion of the oxygen is greater than or equal to 2 atomic % and less than or equal to 11 atomic %, preferably greater than or equal to 3 atomic % and less than or equal to 10 atomic % of the total. As the proportion of oxygen is lower, the conductivity of the graphene can be increased. As the proportion of oxygen becomes higher, more openings serving as paths of ions can be formed in the graphene.

When the graphene 127 is multilayer graphene, the graphene 127 includes plural sheets of single-layer graphene, typically, 2 to 100 sheets of single-layer graphene and is thus very thin. Since the single-layer graphene contains oxygen, the interlayer distance between the sheets of graphene is greater than 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between the sheets of single-layer graphene is 0.34 nm. Since the interlayer distance between the sheets of the graphene 127 is longer than that in general graphite, ions can easily transfer in a direction parallel to a surface of the single-layer graphene. In addition, the graphene 127 contains oxygen and includes single-layer graphene or multilayer graphene in which a poly-membered ring is formed and thus includes openings in places. Thus, in the case where the graphene 127 is multilayer graphene, ions can transfer in the direction parallel to a surface of the single-layer graphene, i.e., through a space between the sheets of single-layer graphene, and in the direction perpendicular to a surface of the graphene, i.e., through an opening formed in each single-layer graphene.

Since the negative electrode active material layer 102 covers the plurality of protrusion portions 101b protruding from the base portion 101a, the surface area of the negative electrode active material layer 102 is larger than that of a plate-like (thin-film) negative electrode active material layer. Further, the plurality of protrusion portions 101b extend in the same longitudinal direction and the protrusion portions 101b protrude in the direction perpendicular to the base portion 101a, so that the density of the protrusions in the negative electrode can be increased and the surface area can be increased. Spaces are provided between the plurality of protrusion portions. Further, the graphene is provided over the negative electrode active material layer. Thus, even when the negative electrode active material expands in charging, contact between the protrusions can be reduced. Moreover, even when the negative electrode active material is separated, the negative electrode active material can be prevented from being broken owing to the graphene. The plurality of protrusion portions have translation symmetry and formed with high uniformity in the negative electrode, so that local reaction can be reduced in each of the positive electrode and the negative electrode, and carrier ions and the active material react with each other uniformly between the positive electrode and the negative electrode. Thus, in the case where the negative electrode 100 is used for a lithium secondary battery, high-speed charge and discharge becomes possible and breakdown and separation of the active material due to charge and discharge can be suppressed, whereby a lithium secondary battery with improved cycle characteristics can be manufactured. Furthermore, when the shapes of the protrusions can be substantially the same, local charge/discharge can be reduced, and the weight of the active material can be controlled. In addition, when the heights of the protrusions are substantially the same, load can be prevented from being applied locally in the manufacturing process of the battery, which can increase the yield. Accordingly, specifications of the battery can be well controlled.

When a surface of the negative electrode active material layer 102 is in contact with an electrolyte solution in a lithium secondary battery, the electrolyte solution and the active material react with each other, so that a film is formed on the surface of the active material. The film is called an SEI film which is considered necessary for relieving reaction between the active material and the electrolyte solution and for stabilization. However, when the thickness of the film is increased, carrier ions are less likely to be inserted in a negative electrode active material, leading to problems such as a reduction in conductivity of carrier ions between the negative electrode active material and the electrolyte solution and a waste of the electrolyte solution.

In this embodiment, the negative electrode active material layer 102 is covered with the graphene 127. This enables an increase in the thickness of the film, a reduction in conductivity of carrier ions, and a waste of the electrolyte solution to be suppressed.

Graphene has high conductivity; therefore, covering silicon which has lower conductivity than graphene with graphene enables transfer of electrons in graphene at sufficiently high speed. In addition, since graphene has a thin sheet-like shape, providing graphene over the plurality of protrusions can increase the content of active material in the active material layer and makes transfer of carrier ions easier than in graphite. As a result, the conductivity of carrier ions can be increased, reaction between silicon that is an active material and carrier ions can be increased, and carrier ions can be easily inserted in the negative electrode active material. Thus, a lithium secondary battery including the negative electrode can perform charge and discharge at high speed.

Note that a silicon oxide layer may be provided between the negative electrode active material layer 102 and the graphene 127. By providing the silicon oxide layer over the negative electrode active material layer 102, ions which are carriers are inserted in silicon oxide in charging of the lithium secondary battery. As a result, a silicate compound, for example, alkali metal silicate such as $Li_4SiO_4$, $Na_4SiO_4$, or $K_4SiO_4$, alkaline earth metal silicate such as $Ca_2SiO_4$, $Sr_2SiO_4$, or $Ba_2SiO_4$, $Be_2SiO_4$, or $Mg_2SiO_4$ is formed. Such a silicate compound serves as a path through which carrier ions transfer. By providing the silicon oxide layer, expansion of the negative electrode active material layer 102 can be suppressed. Accordingly, breakdown of the negative electrode active material layer 102 can be suppressed while the charge-discharge capacity is maintained. In discharging after charging, not all metal ions serving as carrier ions are extracted from the silicate compound formed in the silicon oxide layer and part of the metal ions remain, so that the silicon oxide layer is a mixture layer of silicon oxide and the silicate compound.

The thickness of the silicon oxide layer is preferably greater than or equal to 2 nm and less than or equal to 10 nm. With the thickness of the silicon oxide layer being greater than or equal to 2 nm, expansion of the negative electrode active material layer 102 due to charge/discharge can be relieved. In addition, with the thickness of the silicon oxide layer being less than or equal to 10 nm, carrier ions can transfer easily, which can prevent a reduction in discharge capacity. By providing the silicon oxide layer over the negative electrode active material layer 102, expansion and contraction of the negative electrode active material layer 102 in charge/discharge can be relieved, so that the negative electrode active material layer 102 can be prevented from being broken.

(Manufacturing Method 1 of Negative Electrode Using Graphene)

Next, a manufacturing method of the negative electrode 100 will be described with reference to FIGS. 9A to 9C. As illustrated in FIGS. 9A to 9C, the negative electrode 100 can be formed in such a manner that the surface of the negative electrode current collector 101 including the base portion and the plurality of protrusion portions is covered with the negative electrode active material layer 102 and then the graphene 127 is formed over the negative electrode active material layer 102, as described in Embodiment 1. Here, the structure of FIG. 9A corresponds to that of FIG. 5C or FIG.

7D, the structure of FIG. 9B corresponds to that of FIG. 6D, and the structure of FIG. 9C corresponds to that of FIG. 8C.

As a method for forming the graphene 127, there are a gas phase method and a liquid phase method. In the gas phase method, after, as a nucleus, nickel, iron, gold, copper, or an alloy containing such a metal is formed over the negative electrode active material layer 102, graphene is grown from the nucleus in an atmosphere containing hydrocarbon such as methane or acetylene. In the liquid phase method, graphene oxide is provided on the surface of the negative electrode active material layer 102 using a dispersion liquid containing graphene oxide, and then, the graphene oxide is reduced to form graphene.

The dispersion liquid containing graphene oxide can be obtained by a method in which graphene oxide is dispersed in a solvent, a method in which after graphite is oxidized in a solvent, graphite oxide is separated into graphene oxide to form a dispersion liquid containing graphene oxide, and the like. In this embodiment, the graphene 127 is formed over the negative electrode active material layer 102 by using the dispersion liquid containing graphene oxide which is formed by, after graphite is oxidized, separating graphite oxide into graphene oxide.

In this manufacturing method, graphene oxide is formed by an oxidation method called a Hummers method. A Hummers method is as follows: a sulfuric acid solution of potassium permanganate or the like is mixed into graphite powder to cause oxidation reaction; thus, a mixed solution containing graphite oxide is formed. Graphite oxide contains a functional group such as an epoxy group, a carbonyl group, a carboxyl group, or a hydroxyl group due to oxidation of carbon in graphite. Accordingly, the interlayer distance between adjacent sheets of graphene of plural sheets of graphene in graphite oxide is longer than the interlayer distance of graphite. Then, ultrasonic vibration is transferred to the mixed solution containing graphite oxide, so that the graphite oxide whose interlayer distance is long can be cleaved to separate graphene oxide and to form a dispersion liquid containing graphene oxide. Note that a method for forming graphene oxide other than a Hummers method can be used as appropriate.

Graphene oxide includes an epoxy group, a carbonyl group, a carboxyl group, a hydroxyl group, or the like. Such a substituent has high polarity, so that graphene oxides are likely to disperse in a liquid having a polarity. In particular, since hydrogen is ionized in a liquid having a polarity, graphene oxide including a carbonyl group is ionized and different graphene oxides are more likely to disperse. Accordingly, graphene oxides disperse uniformly in a liquid having a polarity.

As a method of soaking the negative electrode active material layer 102 in the dispersion liquid containing graphene oxide to provide graphene oxide over the negative electrode active material layer 102, a coating method, a spin coating method, a dipping method, a spray method, an electrophoresis method, or the like may be employed. Alternatively, these methods may be combined as appropriate. The electrophoresis method will be described in detail in Manufacturing Method 2 of Negative Electrode Using Graphene.

In a method for reducing graphene oxide provided over the negative electrode active material layer 102, heating is performed at higher than or equal to 150° C., preferably higher than or equal to 300° C. and lower than or equal to the temperature at which the negative electrode active material layer 102 can withstand, in a vacuum, the air, an atmosphere of an inert gas (nitrogen, a rare gas, or the like), or the like. By being heated at a higher temperature and for a longer time, graphene oxide is reduced to a higher extent so that graphene with high purity (i.e., with a low concentration of elements other than carbon) can be obtained. The temperature for heating has to be determined in consideration of reactivity between the graphene oxide and the object. Note that graphene oxide is known to be reduced at 150° C. In addition, there is also a method in which graphene oxide is soaked in a reducing solution to be reduced.

Further, when heat treatment is performed at a higher temperature and for a longer time, more defects are repaired and the conductivity is improved. From the measurements performed by the inventors, for example, the graphene oxide over a glass substrate is heated and reduced to be graphene, so that resistivity of the graphene is approximately 240 M$\Omega$cm at a heating temperature of 100° C. (for an hour), approximately 4 k$\Omega$cm at a heating temperature of 200° C. (for an hour), and approximately 2.8 $\Omega$cm at a heating temperature of 300° C. (for an hour). Note that each resistivity is an average value of eight samples measured by the van der Pauw method.

Since graphite is treated with a sulfuric acid solution of potassium permanganate according to the Hummers method, a functional group such as a sulfone group is also bonded to the graphene oxide, and the extraction (decomposition) of the functional group is performed at a temperature higher than or equal to 200° C. and lower than or equal to 300° C., preferably higher than or equal to 200° C. and lower than or equal to 250° C. Thus, in a method for reducing graphite oxide by heating, reduction treatment of graphene oxide is preferably performed at a temperature higher than or equal to 200° C.

Depending on the temperature of reduction treatment, the conductivity of the graphene changes as described above; the same can also apply to its flexibility, strength, and the like. The temperature of the reduction treatment may be determined in accordance with the required conductivity, flexibility, strength, and the like.

Through the above reduction treatment, the formed graphene oxide becomes graphene. At this time, adjacent sheets of graphene are bonded to each other to form a larger net-like or sheet-like network. Further, through the reduction treatment, openings are formed in the graphene due to the extraction of oxygen. Furthermore, the graphene overlap with each other in parallel to a surface of the substrate. As a result, the graphene in which carrier ions can transfer between sheets and in openings is formed.

By this manufacturing method of a negative electrode, the negative electrode 100 illustrated in FIGS. 9A to 9C can be formed.

(Manufacturing Method 2 of Negative Electrode Using Graphene)

Next, a method for forming graphene over the negative electrode active material layer 102, which is different from the method shown in Manufacturing Method 1 of Negative Electrode Using Graphene, will be described. In this manufacturing method, graphene is formed by an electrophoresis method.

First, in a manner similar to that of the method shown in Manufacturing Method 1 of Negative Electrode Using Graphene, a graphite oxide solution in which graphite oxide obtained by oxidizing graphite is dispersed is prepared. The graphite oxide is formed by a Hummers method. Then, ultrasonic vibration is transferred to the prepared graphite oxide solution, so that the graphite oxide whose interlayer distance is long can be cleaved to give the solution in which the graphene oxide is dispersed (a graphene oxide solution), and the solvent is removed, whereby the graphene oxide is obtained.

Next, the graphene oxide is dispersed in a solvent such as water or N-methylpyrrolidone (NMP), so that the graphene oxide solution is obtained. The solvent is preferably a polar solvent. The concentration of the graphene oxide is favorably greater than or equal to 0.1 g and less than or equal to 10 g per liter. In a solution having polarity, different graphene oxides are not easily aggregated because oxygen contained in the functional group is negatively charged. Further, a solution in which commercial graphene oxide is dispersed in a solvent or a commercial graphene oxide solution may be used. The length of one side (also referred to as a flake size) of graphene oxide which is used is preferably less than or equal to 10 μm.

Next, the graphene oxide solution is applied to top surface of the negative electrode active material layer in the negative electrode described in Embodiment 1. In the case where the graphene oxide is formed over the active material which has a complicated curved surface or unevenness like the negative electrode active material formed over the plurality of protrusions, it is particularly preferable to use an electrophoresis method. Now, the case of using an electrophoresis method will be described below.

Figure 10A:
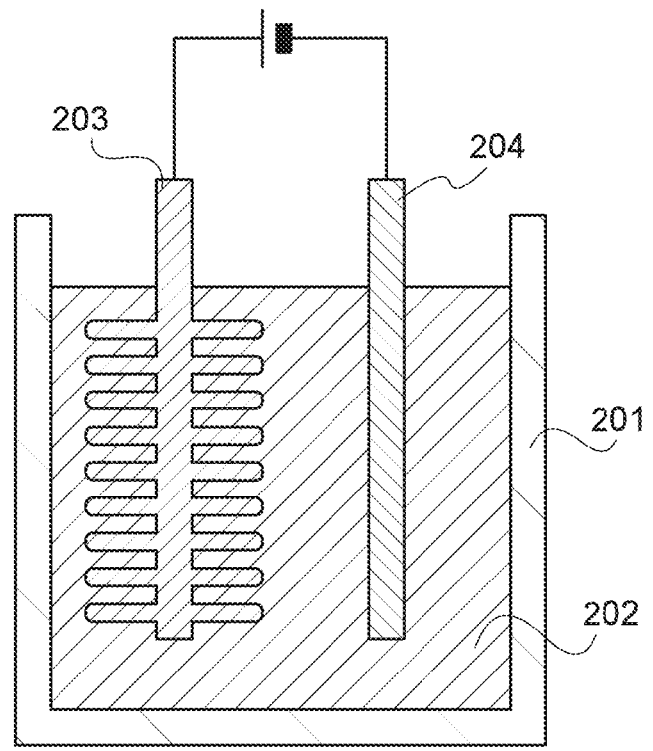
FIGS. 10A and 10B illustrate an electrophoresis method and an electrochemical reduction method, respectively.

FIG. 10A is a cross-sectional view illustrating an electrophoresis method. In a container 201, the solution in which graphene oxide is dispersed and which is obtained by the above method (hereinafter referred to as a graphene oxide solution 202) is contained. Further, a formation subject 203 is put in the graphene oxide solution 202 and is used as an anode. In addition, a conductor 204 serving as a cathode is put in the graphene oxide solution 202. Note that the formation subject 203 is the negative electrode current collector 101 and the negative electrode active material layer 102 which is formed thereon. Further, the conductor 204 may be formed using a conductive material, for example, a metal material or an alloy material.

By applying appropriate voltage between the anode and the cathode, a graphene oxide layer is formed on a surface of the formation subject 203, that is, the surface of the negative electrode active material layer 102 over the base portion 101a and the plurality of protrusion portions 101b of the negative electrode current collector 101. This is because the graphene oxide is negatively charged in the polar solvent as described above, so that by applying voltage, the graphene oxide which is negatively charged is drawn to the anode and deposited on the formation subject 203. Negative charge of the graphene oxide is derived from extraction of hydrogen ions from a substituent such as an epoxy group or a carboxyl group included in the graphene oxide, and the substituent is bonded to an object to result in neutralization. Note that the voltage which is applied is not necessarily constant. Further, by measuring the amount of charge flowing between the anode and the cathode, the thickness of the graphene oxide layer deposited on the object can be estimated.

The voltage is applied between the cathode and the anode in the range of 0.5 V to 2.0 V, preferably 0.8 V to 1.5 V. For example, when the voltage applied between the cathode and the anode is set to 1 V, an oxide film which might be generated based on the principle of anodic oxidation is not easily formed between the formation subject and the graphene oxide.

When the graphene oxide layer with a required thickness is obtained, the formation subject 203 is taken out of the graphene oxide solution 202 and dried.

In electrodeposition of graphene oxide by an electrophoresis method, a portion which is already covered with graphene oxide is scarcely stacked with additional graphene oxide. This is because the conductivity of graphene oxide is sufficiently low. On the other hand, a portion which is not covered yet with graphene oxide is preferentially stacked with graphene oxide. Therefore, the thickness of the graphene oxide formed on the surface of the formation subject 203 is practically uniform.

Time for performing electrophoresis (time for applying voltage) is preferably longer than time for covering the surface of the formation subject 203 with the graphene oxide, for example, longer than or equal to 0.5 minutes and shorter than or equal to 30 minutes, more preferably longer than or equal to 5 minutes and shorter than or equal to 20 minutes.

With the use of an electrophoresis method, ionized graphene oxide can be electrically transferred to the active material, whereby graphene oxide can be provided also in a region where the base portion is in contact with the plurality of protrusion portions (i.e., bases of the protrusion portions). Accordingly, even when the protrusion portions are high, graphene oxide can be provided uniformly over the surfaces of the base portion and the protrusion portions. However, a distance between the plurality of protrusion portions needs to be designed and the flake size of the graphene oxide needs to be selected with attention so that the graphene oxide can enter the space between the adjacent protrusion portion.

Next, reduction treatment is performed to extract part of oxygen from the sheets of the graphene oxide which has covered the negative electrode active materials. Although, as the reduction treatment, reduction treatment by heating or the like, which is described in Manufacturing Method 1 of Negative Electrode Using Graphene, may be performed, electrochemical reduction treatment will be described below.

Figure 10B:
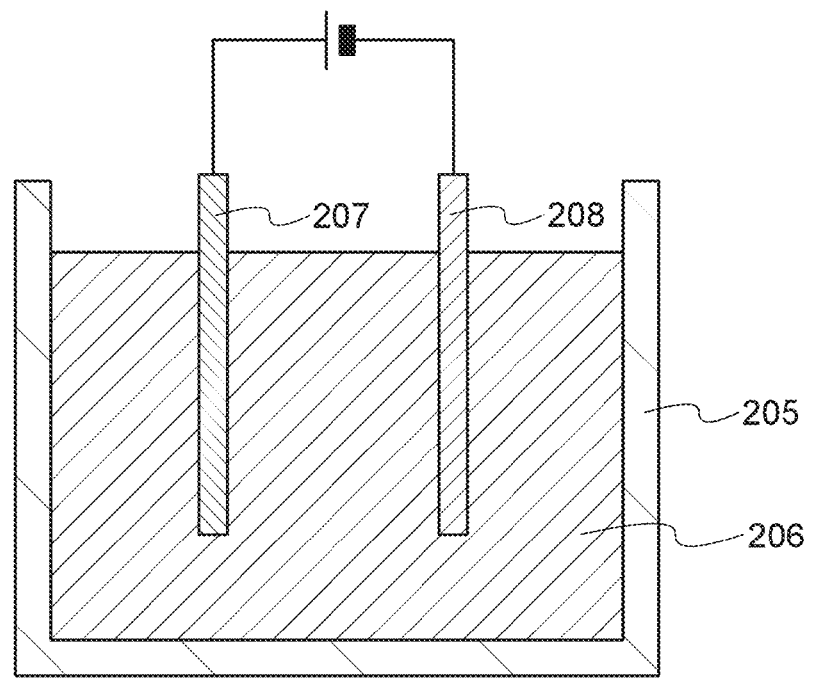

The electrochemical reduction of graphene oxide is reduction utilizing electric energy, which is different from reduction by heat treatment. As illustrated in FIG. 10B, a closed circuit is configured using, as a conductor 207, the negative electrode 100 including graphene oxide provided over the negative electrode active material layer 102, and a potential at which the reduction reaction of the graphene oxide occurs or a potential at which the graphene oxide is reduced is supplied to the conductor 207, so that the graphene oxide is reduced to form graphene. Note that in this specification, a potential at which the reduction reaction of the graphene oxide occurs or a potential at which the graphene oxide is reduced is referred to as the reduction potential.

A method for reducing the graphene oxide will be specifically described with reference to FIG. 10B. A container 205 is filled with an electrolyte solution 206, and the conductor 207 provided with the graphene oxide and a counter electrode 208 are put in the container 205 so as to be immersed in the electrolyte solution 206. Next, an electrochemical cell (open circuit) is configured using at least the counter electrode 208 and the electrolyte solution 206 besides the conductor 207 provided with the graphene oxide, which serves as a working electrode, and the reduction potential of the graphene oxide is supplied to the conductor 207 (working electrode), so that the graphene oxide is reduced to form graphene. Note that the reduction potential to be supplied is a reduction potential in the case where the potential of the counter electrode 208 is used as a reference potential or a reduction potential in the case where a reference electrode is provided in the electrochemical cell and the potential of the reference electrode is used as a reference potential. For example, when the counter electrode 208 and the reference electrode are each made of lithium metal, the reduction potential to be supplied is a reduction potential determined relative to the redox potential of the lithium metal (vs. Li/Li$^+$). Through this step, reduction current flows through the electrochemical cell (closed circuit) when the graphene oxide is reduced. Thus, to examine whether the graphene oxide is reduced, the reduction current needs to be checked sequentially; the state where the reduction current is below a certain value (where there is no peak corresponding to the reduction current) is regarded as the state where the graphene oxide is reduced (where the reduction reaction is completed).

In controlling the potential of the conductor 207, the potential of the conductor 207 may be fixed to the reduction potential of the graphene oxide or may be swept so as to include the reduction potential of the graphene oxide. Further, the sweeping may be periodically repeated like in cyclic voltammetry. Although there is no limitation on the sweep rate of the potential of the conductor 207, it is preferably higher than or equal to 0.005 mV/s. and lower than or equal to 1 mV/s. Note that the potential of the conductor 207 may be swept either from a higher potential to a lower potential or from a lower potential to a higher potential.

Although the reduction potential of the graphene oxide slightly varies depending on the structure of the graphene oxide (e.g., the presence or absence of a functional group and formation of graphene oxide salt) and the way to control the potential (e.g., the sweep rate), it is approximately 2.0 V (vs. Li/Li$^+$). Specifically, the potential of the conductor 207 may be controlled so as to fall within the range of 1.6 V to 2.4 V (vs. Li/Li$^+$).

Through the above steps, the graphene can be formed over the conductor 207. In the case where electrochemical reduction treatment is performed, a proportion of C(sp$^2$)—C(sp$^2$) double bonds is higher than that of graphene formed by heat treatment; therefore, the graphene 127 having high conductivity can be formed over the negative electrode active material layer 102.

Note that only the graphene on the top surfaces of the protrusion portions may be removed by oxygen plasma treatment in order to form a spacer which will be described later.

By this manufacturing method of a negative electrode, the negative electrode 100 illustrated in FIGS. 9A to 9C can be formed.

This embodiment can be implemented in combination with any of the other embodiments as appropriate.

[Embodiment 3]

In this embodiment, a structure and a manufacturing method of a lithium secondary battery will be described.

First, a positive electrode and a manufacturing method thereof will be described.

Figure 11A:
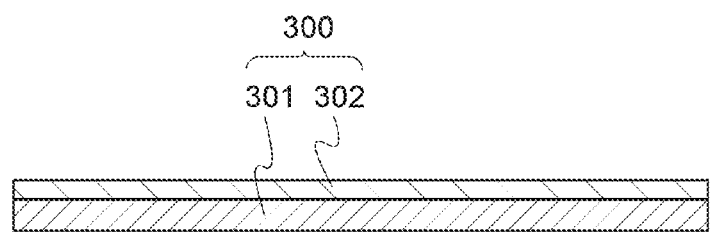
FIGS. 11A to 11C illustrate a positive electrode.

FIG. 11A is a cross-sectional view of a positive electrode 300. In the positive electrode 300, a positive electrode active material layer 302 is formed over a positive electrode current collector 301.

The positive electrode current collector 301 can be formed using a highly conductive material such as a metal typified by stainless steel, gold, platinum, zinc, iron, copper, aluminum, or titanium, or an alloy thereof. Note that the positive electrode current collector 301 can be formed using an aluminum alloy to which an element which improves heat resistance, such as silicon, titanium, neodymium, scandium, or molybdenum, is added. Alternatively, the positive electrode current collector 301 may be formed using a metal element which forms silicide by reacting with silicon. Examples of the metal element which forms silicide by reacting with silicon include zirconium, titanium, hathium, vanadium, niobium, tantalum, chromium, molybdenum, tungsten, cobalt, and nickel. The positive electrode current collector 301 can have a foil-like shape, a plate-like shape (sheet-like shape), a net-like shape, a punching-metal shape, an expanded-metal shape, or the like as appropriate.

The positive electrode active material layer 302 can be formed using a compound such as LiFeO$_2$, LiCoO$_2$, LiNiO$_2$, LiMn$_2$O$_4$, V$_2$O$_5$, Cr$_2$O$_5$, or MnO$_2$ as a material.

Alternatively, an olivine-type lithium-containing composite oxide (a general formula LiMPO$_4$ (M is one or more of Fe(II), Co(II), and Ni(II))) can be used. Typical examples of the general formula LiMPO$_4$ which can be used as a material are lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

Alternatively, a lithium-containing composite oxide such as a general formula Li$_2$MSiO$_4$ (M is one or more of Fe(II), Mn(II), Co(II), and Ni(II); 0≤j≤2) can be used. Typical examples of the general formula Li$_{(2-j)}$MSiO$_4$ which can be used as a material are lithium compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_a$Ni$_b$SiO$_4$, Li$_{(2-j)}$Fe$_k$Co$_l$SiO$_4$, Li$_{(2-j)}$Fe$_k$Mn$_l$SiO$_4$Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_2$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

In the case where carrier ions are alkali metal ions other than lithium ions, alkaline-earth metal ions, beryllium ions, or magnesium ions, the positive electrode active material layer 302 may contain, instead of lithium in the lithium compound and the lithium-containing composite oxide, an alkali metal (e.g., sodium or potassium), an alkaline-earth metal (e.g., calcium, strontium, or barium), beryllium, or magnesium.

The positive electrode active material layer 302 is not necessarily in direct contact with the surface of the positive electrode current collector 301. Between the positive electrode current collector 301 and the positive electrode active material layer 302, any of the following functional layers may be formed using a conductive material such as metal: an adhesive layer for the purpose of improving adhesiveness between the positive electrode current collector 301 and the positive electrode active material layer 302, a planarization layer for reducing unevenness of the surface of the positive electrode current collector 301, a heat radiation layer for radiating heat, and a stress relaxation layer for relieving stress of the positive electrode current collector 301 or the positive electrode active material layer 302.

Figure 11B:
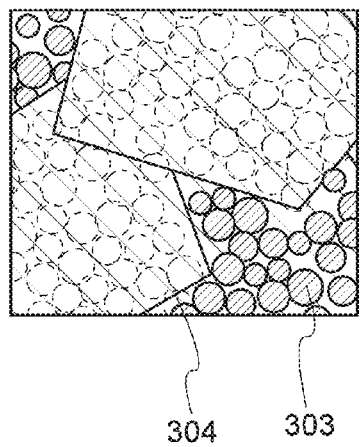

FIG. 11B is a plan view of the positive electrode active material layer 302. The positive electrode active material layer 302 contains positive electrode active materials 303 which are particles capable of inserting and extracting carrier ions, and graphene 304 which cover a plurality of positive electrode active materials 303 and at least partly surround the plurality of positive electrode active materials 303. The different sheets of graphene 304 cover surfaces of the plurality of the positive electrode active materials 303. The positive electrode active materials 303 may be partly exposed.

The size of the particle of the positive electrode active material 303 is preferably greater than or equal to 20 nm and less than or equal to 100 nm. Note that the size of the particle of the positive electrode active material 303 is preferably smaller because electrons transfer in the positive electrode active materials 303.

Sufficient characteristics can be obtained even when surfaces of the positive electrode active materials 303 are not covered with a graphite layer; however, it is preferable to use both the graphene and the positive electrode active material covered with a graphite layer because carriers transfer hopping between the positive electrode active materials, so that current flows.

Figure 11C:
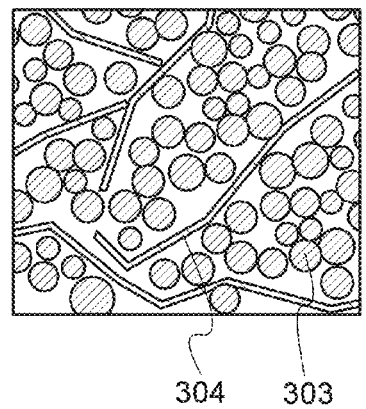

FIG. 11C is a cross-sectional view of part of the positive electrode active material layer 302 in FIG. 11B. The positive electrode active material layer 302 contains the positive electrode active materials 303 and the sheet of graphene 304 which covers the positive electrode active materials 303. The sheet of graphene 304 is observed to have linear shapes in the cross-sectional view. A plurality of particles of the positive electrode active materials are at least partly surrounded with one sheet of graphene or plural sheets of graphene. That is, the plurality of particles of the positive electrode active materials exist within one sheet of graphene or among plural sheets of graphene. Note that the sheet of graphene has a bag-like shape, and the plurality of the positive electrode active materials are surrounded with the bag-like portion in some cases. In addition, the positive electrode active materials are in some cases partly not covered with the sheets of graphene and exposed.

The desired thickness of the positive electrode active material layer 302 is determined in the range of 20 µm to 100 µm. It is preferable to adjust the thickness of the positive electrode active material layer 302 as appropriate so that cracks and separation do not occur.

Note that the positive electrode active material layer 302 may contain acetylene black particles having a volume 0.1 times to 10 times as large as that of the sheet of graphene, carbon particles such as carbon nanofibers having a one-dimensional expansion, or other known binders.

As an example of the positive electrode active material, a material whose volume is expanded by insertion of ions serving as carriers can be given. When such a material is used, the positive electrode active material layer gets vulnerable and is partly broken by charge/discharge, resulting in lower reliability of a lithium secondary battery. However, even when the volume of the positive electrode active material expands due to charge/discharge, the graphene partly covers the periphery of the positive electrode active material, which allows prevention of dispersion of the positive electrode active material and the break of the positive electrode active material layer. That is to say, the graphene has a function of maintaining the bond between the positive electrode active materials even when the volume of the positive electrode active materials fluctuates by charge and discharge.

The graphene 304 is in contact with a plurality of particles of the positive electrode active materials and serves also as a conductive additive. Further, the graphene 304 has a function of holding the positive electrode active material layer 302 capable of insertion and extraction of carrier ions. Thus, binder does not have to be mixed into the positive electrode active material layer 302. Accordingly, the amount of the positive electrode active materials in the positive electrode active material layer can be increased, which allows an increase in discharge capacity of a lithium secondary battery.

Next, a manufacturing method of the positive electrode active material layer 302 will be described.

Slurry containing positive electrode active materials which are particles and graphene oxide is formed. After the positive electrode current collector 301 is coated with the slurry, heating is performed in a reduced atmosphere for reduction treatment so that the positive electrode active materials are baked and oxygen included in the graphene oxide is extracted to form openings in the graphene, as in the formation method of graphene, which is described in Embodiment 2. Note that oxygen in the graphene oxide is not entirely reduced and partly remains in the graphene. Through the above process, the positive electrode active material layer 302 can be formed over the positive electrode current collector 301. Consequently, the positive electrode active material layer has higher conductivity.

Graphene oxide contains oxygen and thus is negatively charged in a polar solvent. As a result of being negatively charged, graphene oxide is dispersed. Accordingly, the positive electrode active materials contained in the slurry are not easily aggregated, so that the size of the particle of the positive electrode active material can be prevented from increasing by baking. Thus, the transfer of electrons in the positive electrode active materials is facilitated, resulting in an increase in conductivity of the positive electrode active material layer.

Figure 12A:
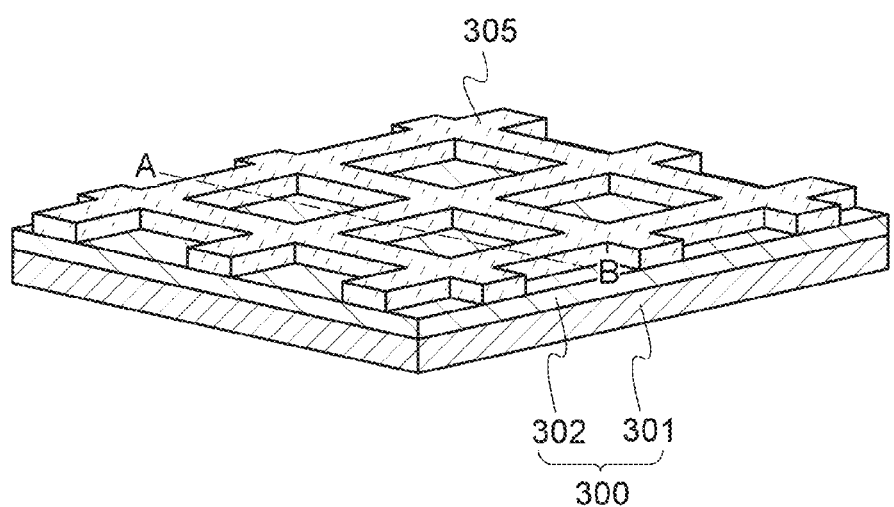
FIGS. 12A and 12B illustrate a positive electrode.
Figure 12B:
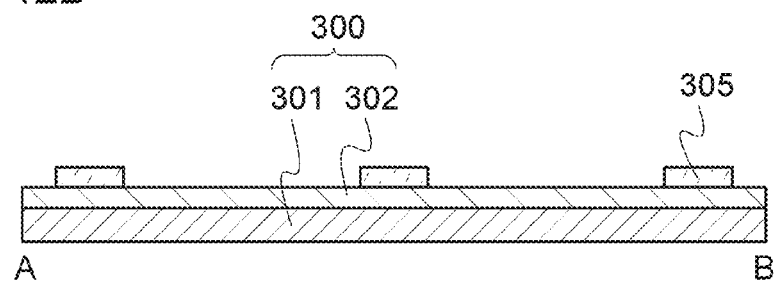

Now, an example in which a spacer 305 is provided on the surface of the positive electrode 300 is illustrated in FIGS. 12A and 12B. FIG. 12A is a perspective view of the positive electrode including the spacer, and FIG. 12B is a cross-sectional view taken along the dotted line A-B in FIG. 12A.

As illustrated in FIGS. 12A and 12B, in the positive electrode 300, the positive electrode active material layer 302 is provided over the positive electrode current collector 301. Further, the spacer 305 is provided over the positive electrode active material layer 302.

The spacer 305 can be formed using a material which has an insulating property and does not react with an electrolyte. Typically, an organic material such as an acrylic resin, an epoxy resin, a silicone resin, polyimide, or polyamide; or low-melting-point glass such as glass paste, glass frit, or glass ribbon can be used.

The spacer 305 can be formed by a printing method such as screen printing, an inkjet method, or the like. Thus, the spacer 305 can be formed in an arbitrary shape.

The spacer 305 is formed directly on the positive electrode active material layer 302 in a thin film form when seen from the above, and has a plurality of openings with a shape such as a rectangle, a polygon, or a circle. Thus, the planar shape of the spacer 305 can be a lattice-like shape, a closed circular or polygonal loop shape, porous shape, or the like. Alternatively, a plurality of the spacers may be arranged in a stripe by linearly extending the plurality of openings. The positive electrode active material layer 302 is partly exposed from the plurality of openings of the spacer 305. As a result, the spacer 305 prevents the positive electrode and a negative electrode from being in contact with each other and also ensures that carrier ions transfer between the positive electrode and the negative electrode through the plurality of openings.

The thickness of the spacer 305 is preferably greater than or equal to 1 µm and less than or equal to 5 µm, more preferably greater than or equal to 2 µm and less than or equal to 3 µm. As a result, as compared with the case where a separator having a thickness of several tens of micrometers is provided between a positive electrode and a negative electrode as in a conventional lithium secondary battery, the distance between the positive electrode and the negative electrode can be reduced, and the distance of transfer of carrier ions between the positive electrode and the negative electrode can be made short. Accordingly, carrier ions included in the lithium secondary battery can be effectively used for charge/discharge.

As described above, it is not necessary to provide a separator in a lithium secondary battery owing to the spacer 305. As a result, the number of components of the lithium secondary battery and the cost can be reduced.

Figure 13A:
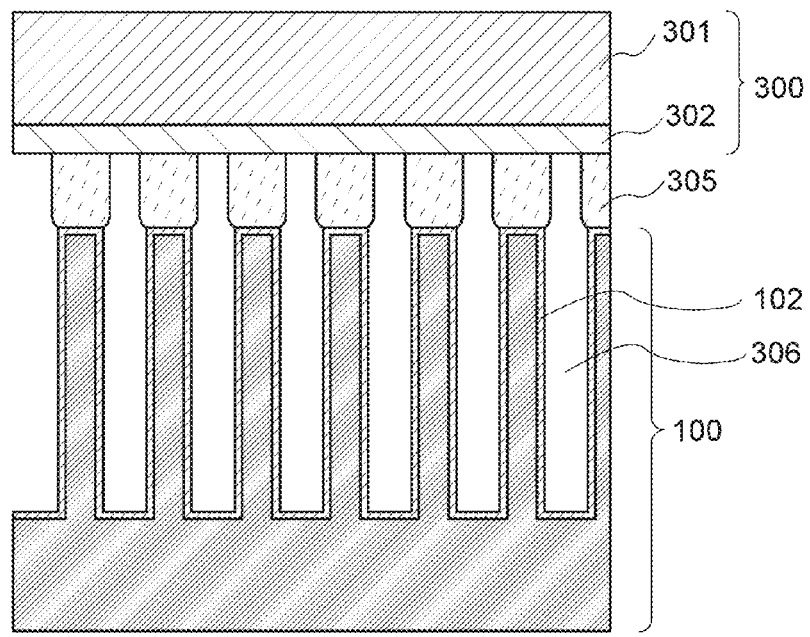
FIGS. 13A and 13B each illustrate a separator-less lithium secondary battery.
Figure 13B:
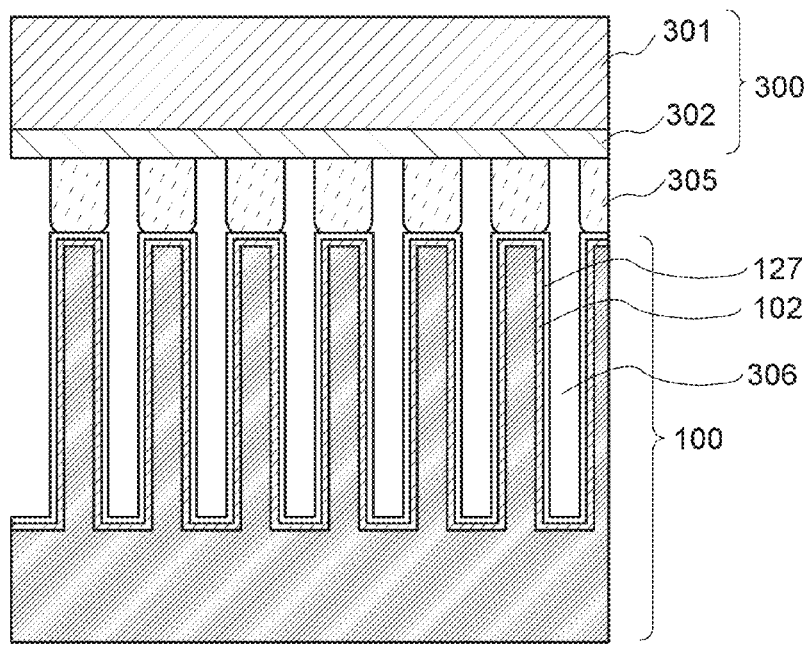

An example of a separator-less lithium secondary battery using the spacer 305 is illustrated in FIGS. 13A and 13B. In FIG. 13A, a battery is assembled from the negative electrode 100 formed through Manufacturing Method 1 or 3 of Negative Electrode described above and the above positive electrode 300, between which the spacer 305 is interposed, and spaces made by the negative electrode 100, the positive electrode 300, and the spacer 305 are filled with an electrolyte solution 306. The shape of the protrusion portions of the negative electrode 100 or the spacer 305 is designed so that the protrusion portions thereof make contact with the spacer 305. The protrusion portions and the spacer preferably make surface contact with each other in order to maintain the mechanical strength. Thus, the surface of the spacer 305 and the surfaces of the protrusion portions of the negative electrode 100 which make contact with each other are preferably as even as possible.

Note that although all protrusion portions and the spacer are in contact with each other in FIGS. 13A and 13B, all protrusion portions do not necessarily make contact with the spacer. That is, there is no problem even if some of the plurality of protrusion portions of the negative electrode are placed in a position facing the openings in the spacer 305.

Further, as well as the spacer 305, the protrusion portions of the negative electrode 100, which are in contact with the spacer 305, have a function of keeping a distance between the positive electrode 300 and the negative electrode 100. Thus, it is important that the protrusion portions have sufficient mechanical strength. Therefore, an extremely significant structure can be obtained when a current collector material which forms the protrusion portions is used as a core of the negative electrode active material layer, and titanium whose strength is higher than that of copper or the like is used.

An example of a separator-less lithium secondary battery whose negative electrode is formed using graphene is illustrated in FIG. 13B. Although FIG. 13B differs from FIG. 13A in that graphene is provided, the same can be said for the shape and the structure thereof.

Next, a structure and a manufacturing method of the lithium secondary battery will be described with reference to FIGS. 14A and 14B. Here, a cross-sectional structure of the lithium secondary battery will be described below.

Figure 14A:
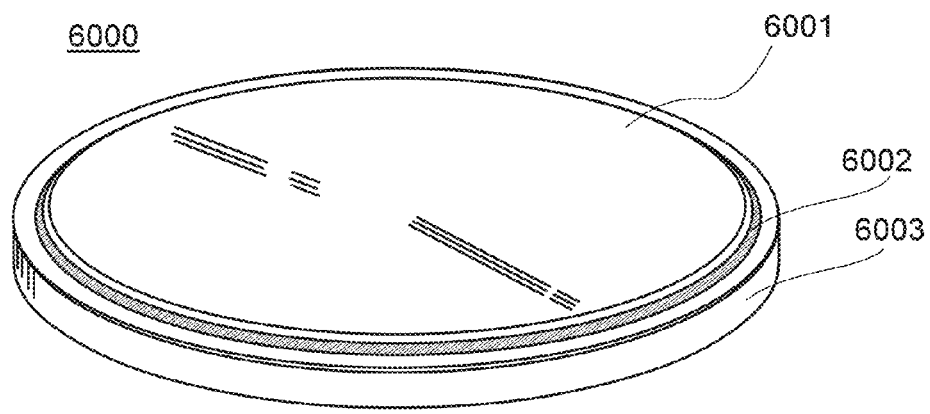
FIGS. 14A and 14B illustrate a coin-type lithium secondary battery.
Figure 14B:
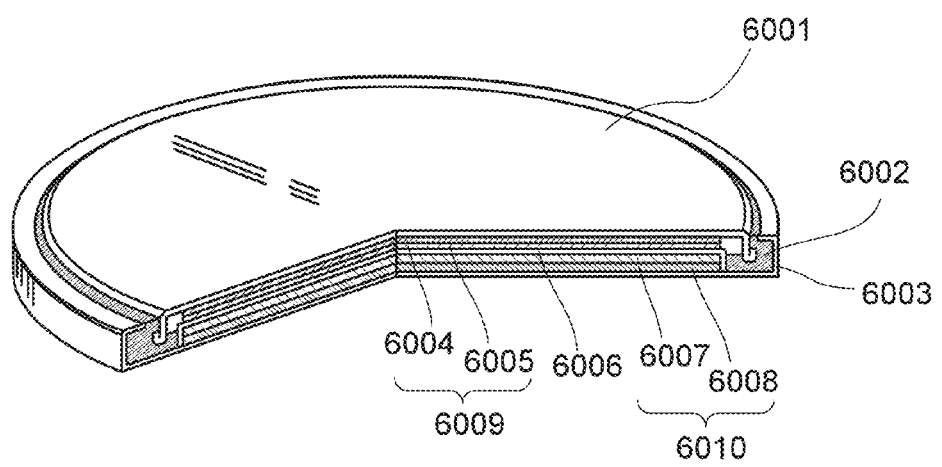

FIG. 14A is an external view of a coin-type (single-layer flat type) lithium secondary battery, and FIG. 14B is a cross-sectional view thereof.

In a coin-type lithium secondary battery 6000, a positive electrode can 6003 serving also as a positive electrode terminal and a negative electrode can 6001 serving also as a negative electrode terminal are insulated and sealed with a gasket 6002 formed of polypropylene or the like. In a manner similar to that of the above, a positive electrode 6010 is formed of a positive electrode current collector 6008 and a positive electrode active material layer 6007 which is provided to be in contact with the positive electrode current collector 6008. On the other hand, a negative electrode 6009 is formed of a negative electrode current collector 6004 and a negative electrode active material layer 6005 which is provided to be in contact with the negative electrode current collector 6004. A separator 6006 and an electrolyte (not illustrated) are included between the positive electrode active material layer 6007 and the negative electrode active material layer 6005. In the positive electrode 6010, the positive electrode active material layer 302 which is obtained by the above process is used as the positive electrode active material layer 6007.

The negative electrode 100 described in Embodiment 1 or 2 is favorably used as appropriate as the negative electrode 6009.

As the positive electrode current collector 6008 and the positive electrode active material layer 6007, the positive electrode current collector 301 and the positive electrode active material layer 302 which are described in this embodiment can be used as appropriate.

The separator 6006 can be formed using an insulator such as cellulose (paper) or polyethylene or polypropylene with pores.

Note that the separator 6006 is not necessarily provided when the above positive electrode including the spacer 305, which is illustrated in FIGS. 12A and 12B, is used as the positive electrode 6010.

As a solute of the electrolyte, a material which contains carrier ions is used. Typical examples of the solute of the electrolyte include lithium salts such as $LiClO_4$, $LiAsF_6$, $LiBF_4$, $LiPF_6$, and $Li(C_2F_5SO_2)_2N$.

In the case where carrier ions are alkali metal ions other than lithium ions, alkaline-earth metal ions, beryllium ions, or magnesium ions, the solute of the electrolyte may contain, instead of lithium in the lithium salts, an alkali metal (e.g., sodium or potassium), an alkaline-earth metal (e.g., calcium, strontium, or barium), beryllium, or magnesium.

As a solvent for the electrolyte, a material in which carrier ions can transfer is used. As the solvent for the electrolyte, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used. When a gelled polymer material is used as the solvent for the electrolyte, safety against liquid leakage and the like is improved. Further, the lithium secondary battery can be thinner and more lightweight. Typical examples of a gelled macromolecular material include a silicon gel, an acrylic gel, an acrylonitrile gel, polyethylene oxide, polypropylene oxide, and a fluorine-based polymer. Alternatively, the use of one or more of ionic liquids (room temperature molten salts) which are less likely to burn and volatilize as the solvent for the electrolyte can prevent the secondary battery from exploding or catching fire even when the secondary battery internally shorts out or the internal temperature increases due to overcharging or the like.

Instead of the electrolyte, a solid electrolyte including a sulfide-based inorganic material, an oxide-based inorganic material, or the like, or a solid electrolyte including a polyethylene oxide (PEO)-based macromolecular material or the like can be used. When the solid electrolyte is used, a separator or a spacer is not necessary. Further, the battery can be entirely solidified; therefore, there is no possibility of liquid leakage and thus the safety of the battery is dramatically increased.

A metal having corrosion resistance, such as nickel, aluminum, or titanium, an alloy of such a metal, and an alloy of such a metal and another metal (stainless steel or the like)

can be used for the positive electrode can 6003 and the negative electrode can 6001. It is particularly preferable to plate a corrosive metal with nickel or the like in order to prevent corrosion by the electrolyte solution, which occurs due to charge/discharge of the secondary battery. The positive electrode can 6003 and the positive electrode 6010 are electrically connected to each other, and the negative electrode can 6001 and the negative electrode 6009 are electrically connected to each other.

The negative electrode 6009, the positive electrode 6010, and the separator 6006 are immersed in the electrolyte. Then, as illustrated in FIG. 14B, the positive electrode 6010, the separator 6006, the negative electrode 6009, and the negative electrode can 6001 are stacked in this order with the positive electrode can 6003 positioned at the bottom, and the positive electrode can 6003 and the negative electrode can 6001 are subjected to pressure bonding with the gasket 6002 interposed therebetween. In such a manner, the coin-type lithium secondary battery 6000 is manufactured.

Figure 15A:
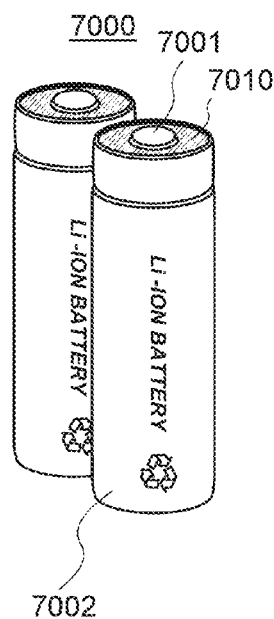
FIGS. 15A and 15B illustrate a cylindrical lithium secondary battery.

Next, a structure of a cylindrical lithium secondary battery will be described with reference to FIGS. 15A and 15B. As illustrated in FIG. 15A, a cylindrical lithium secondary battery 7000 includes a positive electrode cap (battery lid) 7001 on the top surface and a battery can (outer can) 7002 on the side surface and bottom surface. The positive electrode cap (battery lid) 7001 and the battery can (outer can) 7002 are insulated by the gasket 7010 (insulating packing).

Figure 15B:
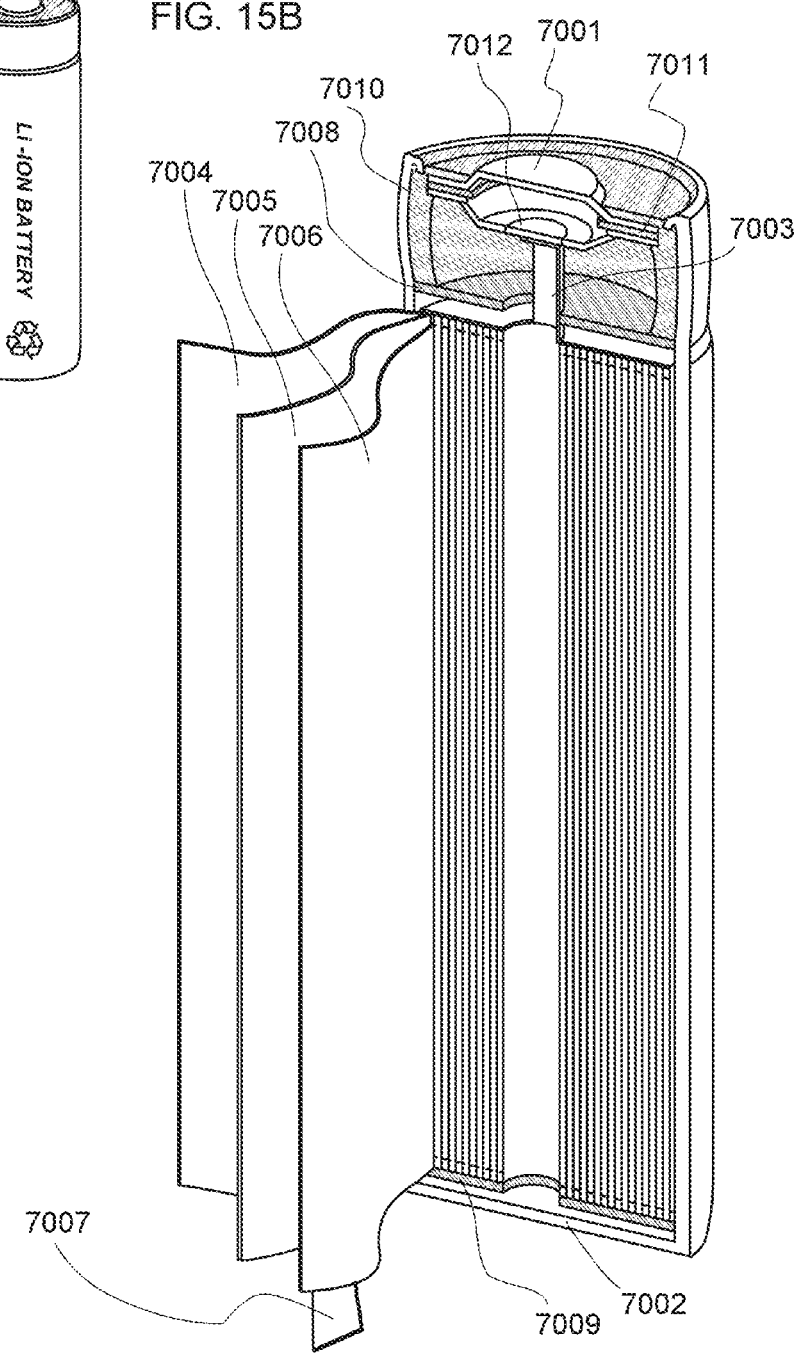

FIG. 15B is a diagram schematically illustrating a cross section of the cylindrical lithium secondary battery. Inside the battery can 7002 having a hollow cylindrical shape, a battery element in which a strip-like positive electrode 7004 and a strip-like negative electrode 7006 are wound with a stripe-like separator 7005 interposed therebetween is provided. Although not illustrated, the battery element is wound around a center pin as a center. One end of the battery can 7002 is close and the other end thereof is open. A metal having corrosion resistance, such as nickel, aluminum, or titanium, an alloy of such a metal, and an alloy of such a metal and another metal (stainless steel or the like) can be used for the battery can 7002. It is particularly preferable to plate a corrosive metal with nickel or the like in order to prevent corrosion by the electrolyte solution, which occurs due to charge/discharge of the secondary battery. Inside the battery can 7002, the battery element in which the positive electrode, the negative electrode, and the separator are wound is interposed between a pair of insulating plates 7008 and 7009 which face each other. Further, an electrolyte (not illustrated) is injected inside the battery can 7002 which is provided with the battery element. An electrolyte which is similar to that of the above coin-type lithium secondary battery can be used.

Although the positive electrode 7004 and the negative electrode 7006 can be formed in a manner similar to that of the positive electrode and the negative electrode of the coin-type lithium secondary battery 6000, the difference lies in that, since the positive electrode and the negative electrode of the cylindrical lithium secondary battery are wound, active materials are formed on both sides of the current collectors. The use of the negative electrode described in Embodiment 1 or 2 for the negative electrode 7006 enables the secondary battery with high capacity to be manufactured. A positive electrode terminal (positive electrode current collecting lead) 7003 is connected to the positive electrode 7004, and a negative electrode terminal (negative electrode current collecting lead) 7007 is connected to the negative electrode 7006. Both the positive electrode terminal 7003 and the negative electrode terminal 7007 can be formed using a metal material such as aluminum. The positive electrode terminal 7003 is resistance-welded to a safety valve mechanism 7012, and the negative electrode terminal 7007 is resistance-welded to the bottom of the battery can 7002. The safety valve mechanism 7012 is electrically connected to the positive electrode cap 7001 through a positive temperature coefficient (PTC) element 7011. The safety valve mechanism 7012 cuts off electrical connection between the positive electrode cap 7001 and the positive electrode 7004 when the internal pressure of the battery increases and exceeds a predetermined threshold value. Further, the PTC element 7011, which serves as a heat sensitive resistor whose resistance increases as temperature rises, limits the amount of current when the resistance is increased to prevent abnormal heat generation. Note that barium titanate ($BaTiO_3$)-based semiconductor ceramic or the like can be used for the PTC element.

Note that in this embodiment, the coin-type lithium secondary battery and the cylindrical lithium secondary battery are given as examples of the lithium secondary battery; however, any of lithium secondary batteries with various shapes, such as a sealing-type lithium secondary battery and a square-type lithium secondary battery, can be used. Further, a structure in which a plurality of positive electrodes, a plurality of negative electrodes, and a plurality of separators are stacked or wound may be employed.

This embodiment can be implemented in combination with any of the other embodiments as appropriate.

[Embodiment 4]

A lithium secondary battery of one embodiment of the present invention can be used for power supplies of a variety of electrical appliances.

Specific examples of electrical appliances each utilizing the lithium secondary battery of one embodiment of the present invention are as follows: display devices of televisions, monitors, and the like, lighting devices, desktop personal computers and laptop personal computers, word processors, image reproduction devices which reproduce still images or moving images stored in recording media such as digital versatile discs (DVDs), portable or stationary music reproduction devices such as compact disc (CD) players and digital audio players, portable or stationary radio receivers, recording reproduction devices such as tape recorders and IC recorders (voice recorders), headphone stereos, stereos, clocks such as table clocks and wall clocks, cordless phone handsets, transceivers, portable wireless devices, cellular phones, car phones, portable or stationary game machines, calculators, portable information terminals, electronic notebooks, e-book readers, electronic translators, audio input devices such as microphones, cameras such as still cameras and video cameras, electric shavers, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke detectors, and a health equipment and a medical equipment such as hearing aids, cardiac pacemakers, portable X-ray equipments, electric massagers, and dialyzers. Further, industrial equipment such as guide lights, traffic lights, meters such as gas meters and water meters, belt conveyors, elevators, escalators, industrial robots, wireless relay stations, cellular base stations, power storage systems, and power storage devices for leveling the amount of power supply and smart grid can be given. In addition, moving objects driven by electric motors using power from the lithium secondary batteries are also included in the category of electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, agricultural machines, motorized bicycles including motor-assisted bicycles, motorcycles, electric wheelchairs, electric carts, boats or ships, submarines, aircrafts such as fixed-wing aircraft and rotary-wing aircraft, rockets, artificial satellites, space probes, planetary probes, and spacecrafts.

In the above electrical appliances, the lithium secondary battery of one embodiment of the present invention can be used as a main power supply for supplying enough power for almost the whole power consumption. Alternatively, in the above electrical appliances, the lithium secondary battery of one embodiment of the present invention can be used as an uninterruptible power supply which can supply power to the electric devices when the supply of power from the main power supply or a commercial power supply is stopped. Still alternatively, in the above electrical appliances, the lithium secondary battery of one embodiment of the present invention can be used as an auxiliary power supply for supplying power to the electrical appliances at the same time as the power supply from the main power supply or a commercial power supply.

Figure 16:
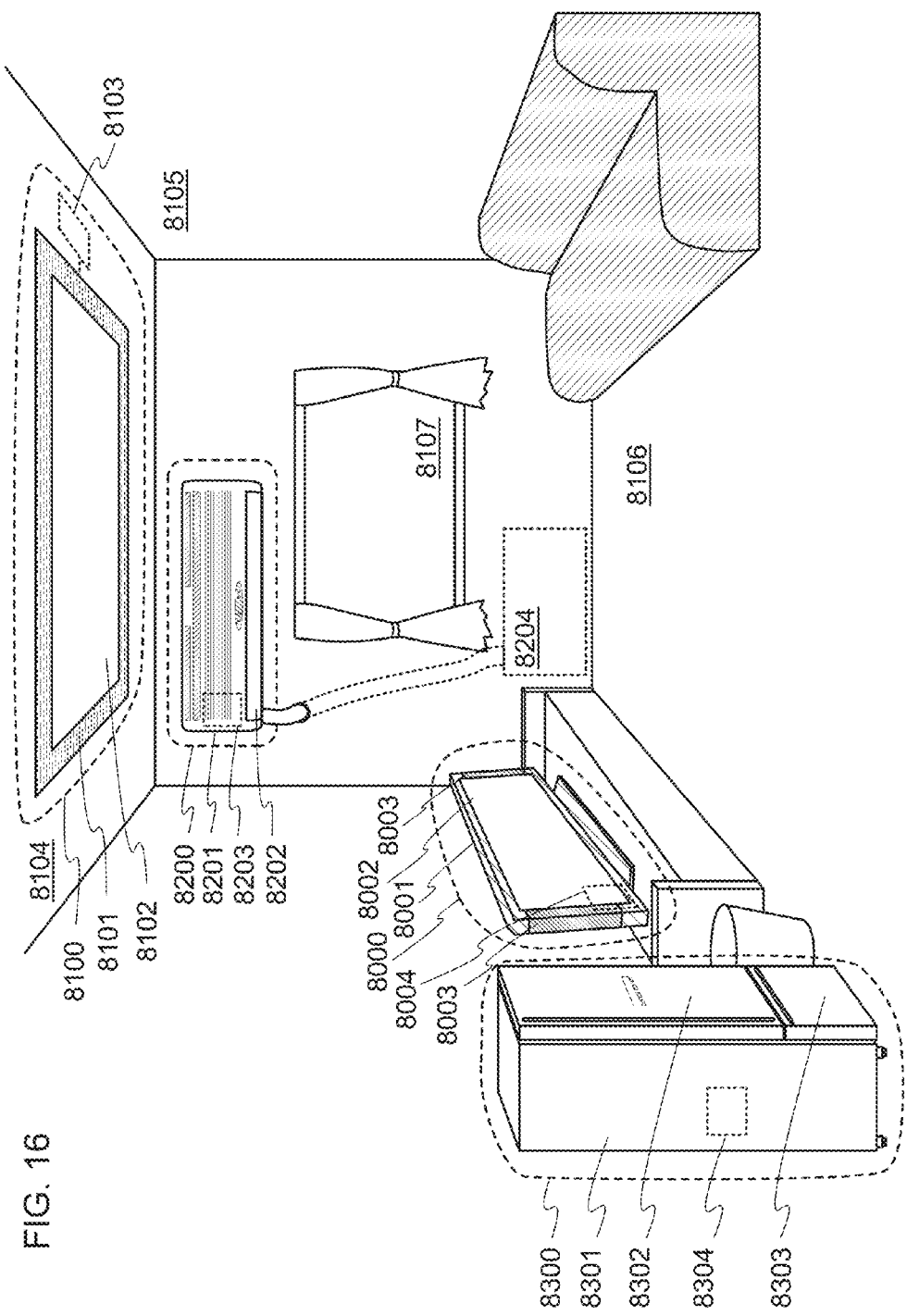
FIG. 16 illustrates electrical appliances.

FIG. 16 illustrates specific structures of the above electrical appliances. In FIG. 16, a display device 8000 is an example of an electrical appliance including a lithium secondary battery 8004 of one embodiment of the present invention. Specifically, the display device 8000 corresponds to a display device for TV broadcast reception and includes a housing 8001, a display portion 8002, speaker portions 8003, the lithium secondary battery 8004, and the like. The lithium secondary battery 8004 of one embodiment of the present invention is provided in the housing 8001. The display device 8000 can receive power from a commercial power supply. Alternatively, the display device 8000 can use power stored in the lithium secondary battery 8004. Thus, the display device 8000 can be operated with the use of the lithium secondary battery 8004 of one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 16, an installation lighting device 8100 is an example of an electrical appliance including a lithium secondary battery 8103 of one embodiment of the present invention. Specifically, the lighting device 8100 includes a housing 8101, a light source 8102, the lithium secondary battery 8103, and the like. Although FIG. 16 illustrates the case where the lithium secondary battery 8103 is provided in a ceiling 8104 on which the housing 8101 and the light source 8102 are installed, the lithium secondary battery 8103 may be provided in the housing 8101. The lighting device 8100 can receive power from a commercial power supply. Alternatively, the lighting device 8100 can use power stored in the lithium secondary battery 8103. Thus, the lighting device 8100 can be operated with the use of the lithium secondary battery 8103 of one embodiment of the present invention as an uninterruptible power supply even when power cannot be supplied from a commercial power supply due to power failure or the like.

Note that although the installation lighting device 8100 provided in the ceiling 8104 is illustrated in FIG. 16 as an example, the lithium secondary battery of one embodiment of the present invention can be used as an installation lighting device provided in, for example, a wall 8105, a floor 8106, a window 8107, or the like other than the ceiling 8104. Alternatively, the lithium secondary battery can be used in a tabletop lighting device or the like.

As the light source 8102, an artificial light source which emits light artificially by using power can be used. Specifically, an incandescent lamp, a discharge lamp such as a fluorescent lamp, and light-emitting elements such as an LED or an organic EL element are given as examples of the artificial light source.

In FIG. 16, an air conditioner including an indoor unit 8200 and an outdoor unit 8204 is an example of an electrical appliance including a lithium secondary battery 8203 of one embodiment of the present invention. Specifically, the indoor unit 8200 includes a housing 8201, an air outlet 8202, the lithium secondary battery 8203, and the like. Although FIG. 16 illustrates the case where the lithium secondary battery 8203 is provided in the indoor unit 8200, the lithium secondary battery 8203 may be provided in the outdoor unit 8204. Alternatively, the lithium secondary batteries 8203 may be provided in both the indoor unit 8200 and the outdoor unit 8204. The air conditioner can receive power from a commercial power supply. Alternatively, the air conditioner can use power stored in the lithium secondary battery 8203. Particularly in the case where the lithium secondary batteries 8203 are provided in both the indoor unit 8200 and the outdoor unit 8204, the air conditioner can be operated with the use of the lithium secondary battery 8203 of one embodiment of the present invention as an uninterruptible power supply even when power cannot be supplied from a commercial power supply due to power failure or the like.

Note that although the split-type air conditioner including the indoor unit and the outdoor unit is illustrated in FIG. 16 as an example, the lithium secondary battery of one embodiment of the present invention can be used in an air conditioner in which the functions of an indoor unit and an outdoor unit are integrated in one housing.

In FIG. 16, an electric refrigerator-freezer 8300 is an example of an electrical appliance including a lithium secondary battery 8304 of one embodiment of the present invention. Specifically, the electric refrigerator-freezer 8300 includes a housing 8301, a door for a refrigerator 8302, a door for a freezer 8303, the lithium secondary battery 8304, and the like. The lithium secondary battery 8304 is provided in the housing 8301 in FIG. 16. The electric refrigerator-freezer 8300 can receive power from a commercial power supply. Alternatively, the electric refrigerator-freezer 8300 can use power stored in the lithium secondary battery 8304. Thus, the electric refrigerator-freezer 8300 can be operated with the use of the lithium secondary battery 8304 of one embodiment of the present invention as an uninterruptible power supply even when power cannot be supplied from a commercial power supply due to power failure or the like.

Note that among the electrical appliances described above, a high-frequency heating apparatus such as a microwave oven and an electrical appliance such as an electric rice cooker require high power in a short time. The tripping of a breaker of a commercial power supply in use of an electrical appliance can be prevented by using the lithium secondary battery of one embodiment of the present invention as an auxiliary power supply for supplying power which cannot be supplied enough by the commercial power supply.

In addition, in a time period when electrical appliances are not used, particularly when the proportion of the amount of power which is actually used to the total amount of power which can be supplied from a commercial power supply source (such a proportion referred to as a usage rate of power) is low, power can be stored in the lithium secondary battery, whereby the usage rate of power can be reduced in a time period when the electrical appliances are used. For example, in the case of the electric refrigerator-freezer 8300, power can be stored in the lithium secondary battery 8304 in night time when the temperature is low and the door for a refrigerator 8302 and the door for a freezer 8303 are not often opened and closed. On the other hand, in daytime when the temperature is high and the door for a refrigerator 8302 and the door for a freezer 8303 are frequently opened and closed, the lithium secondary battery 8304 is used as an auxiliary power supply; thus, the usage rate of power in daytime can be reduced.

This embodiment can be implemented in combination with any of the other embodiments as appropriate.

[Embodiment 5]

Next, a portable information terminal which is an example of the electrical appliance will be described with reference to FIGS. 17A to 17C.

Figure 17A:
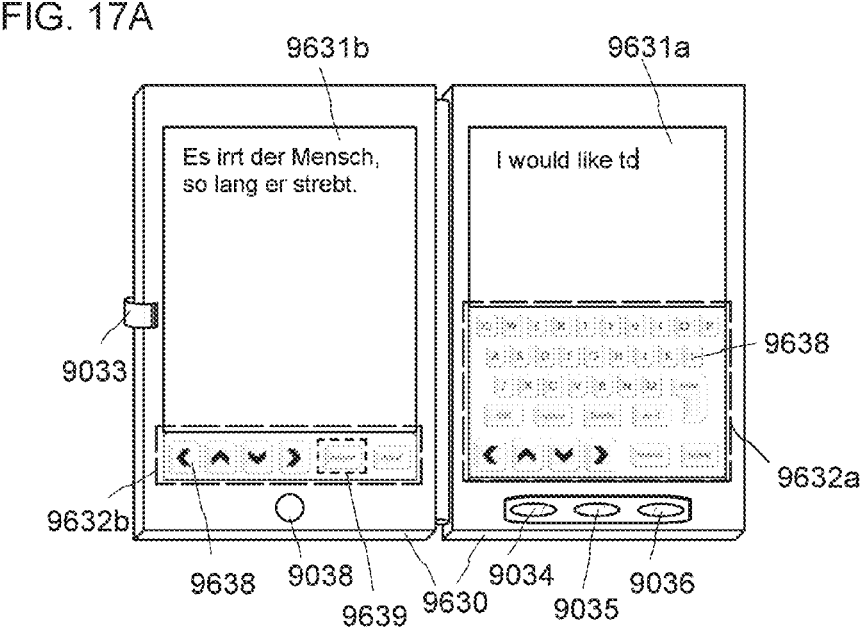
FIGS. 17A to 17C illustrate an electrical appliance.
Figure 17B:
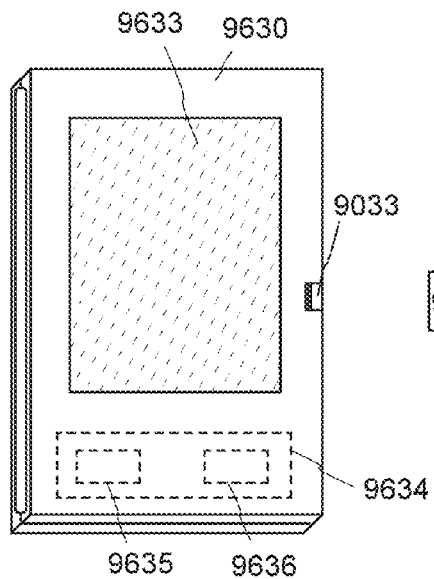

FIGS. 17A and 17B illustrate a tablet terminal that can be folded. In FIG. 17A, the tablet terminal is open, and includes a housing 9630, a display portion 9631a, a display portion 9631b, a switch 9034 for switching display modes, a power switch 9035, a switch 9036 for switching to power-saving mode, a fastener 9033, and an operation switch 9038.

Part of the display portion 9631a can be a touch panel region 9632a and data can be input when a displayed operation key 9638 is touched. Although a structure in which a half region in the display portion 9631a has only a display function and the other half region has a touch panel function is shown as an example, the display portion 9631a is not limited to the structure. The whole region in the display portion 9631a may have a touch panel function. For example, keyboard buttons can be displayed on the entire display portion 9631a to be used as a touch panel, and the display portion 9631b can be used as a display screen.

As in the display portion 9631a, part of the display portion 9631b can be a touch panel region 9632b. A switching button 9639 for showing/hiding a keyboard of the touch panel is touched with a finger, a stylus, or the like, so that keyboard buttons can be displayed on the display portion 9631b.

Touch input can be performed in the touch panel region 9632a and the touch panel region 9632b at the same time.

The switch 9034 for switching display modes can switch the display between portrait mode, landscape mode, and the like, and between monochrome display and color display, for example. The switch 9036 for switching to power-saving mode can control display luminance to be optimal in accordance with the amount of external light in use of the tablet terminal which is detected by an optical sensor incorporated in the tablet terminal. Another detection device including a sensor or the like for detecting inclination, such as a gyroscope or an acceleration sensor, may be incorporated in the tablet terminal, in addition to the optical sensor.

Note that FIG. 17A illustrates an example in which the display portion 9631a and the display portion 9631b have the same display area; however, without limitation thereon, one of the display portions may be different from the other display portion in size and display quality. For example, one display panel may be capable of higher-definition display than the other display panel.

The tablet terminal is closed in FIG. 17B. The tablet terminal includes the housing 9630, a solar cell 9633, a charge/discharge control circuit 9634, a battery 9635, and a DC-DC converter 9636. In FIG. 17B, a structure including the battery 9635 and the DC-DC converter 9636 is illustrated as an example of the charge/discharge control circuit 9634. The lithium secondary battery described in any of the above embodiments is used as the battery 9635.

Since the tablet terminal can be folded, the housing 9630 can be closed when the tablet terminal is not used. As a result, the display portion 9631a and the display portion 9631b can be protected; thus, a tablet terminal which has excellent durability and excellent reliability also in terms of long-term use can be provided.

In addition, the tablet terminal illustrated in FIGS. 17A and 17B can have a function of displaying a variety of kinds of data (e.g., a still image, a moving image, and a text image), a function of displaying a calendar, a date, the time, or the like on the display portion, a touch-input function of operating or editing the data displayed on the display portion by touch input, a function of controlling processing by a variety of kinds of software (programs), and the like.

The solar cell 9633 provided on a surface of the tablet terminal can supply power to the touch panel, the display portion, a video signal processing portion, or the like. Note that the solar cell 9633 can be provided on one or both surfaces of the housing 9630, so that the battery 9635 can be charged efficiently. When the lithium secondary battery of one embodiment of the present invention is used as the battery 9635, there is an advantage such as a reduction in size.

The structure and the operation of the charge/discharge control circuit 9634 illustrated in FIG. 17B will be described with reference to a block diagram in FIG. 17C. The solar cell 9633, the battery 9635, the DC-DC converter 9636, a converter 9637, switches SW1 to SW3, and the display portion 9631 are illustrated in FIG. 17C, and the battery 9635, the DC-DC converter 9636, the converter 9637, and the switches SW1 to SW3 correspond to the charge/discharge control circuit 9634 in FIG. 17B.

First, an example of the operation in the case where power is generated by the solar cell 9633 using external light is described. The voltage of power generated by the solar cell is raised or lowered by the DC-DC converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and the switch SW2 is turned on so that charge of the battery 9635 may be performed.

Note that the solar cell 9633 is described as an example of a power generation means; however, without limitation thereon, the battery 9635 may be charged using another power generation means such as a piezoelectric element or a thermoelectric conversion element (Peltier element). For example, the battery 9635 may be charged with a non-contact power transmission module which is capable of charging by transmitting and receiving power by wireless (without contact), or another charging means may be used in combination.

Figure 17C:
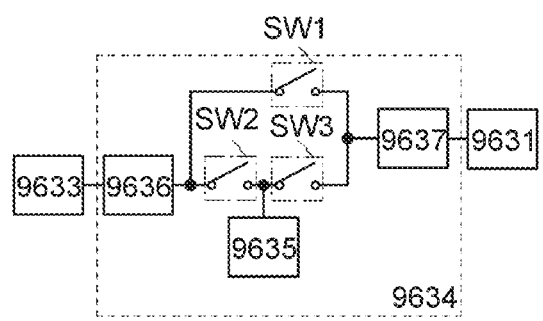

It is needless to say that one embodiment of the present invention is not limited to the electrical appliance illustrated in FIGS. 17A to 17C as long as the lithium secondary battery described in any of the above embodiments is included.

[Embodiment 6]

Further, an example of the moving object which is an example of the electrical appliance will be described with reference to FIGS. 18A and 18B.

The lithium secondary battery described in any of Embodiments 1 to 3 can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 18A:
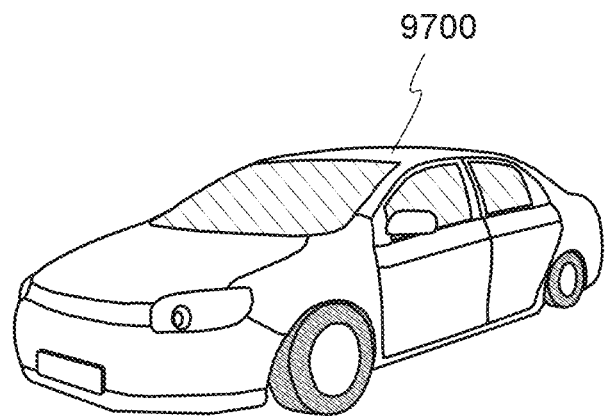
FIGS. 18A and 18B illustrate an electrical appliance.
Figure 18B:
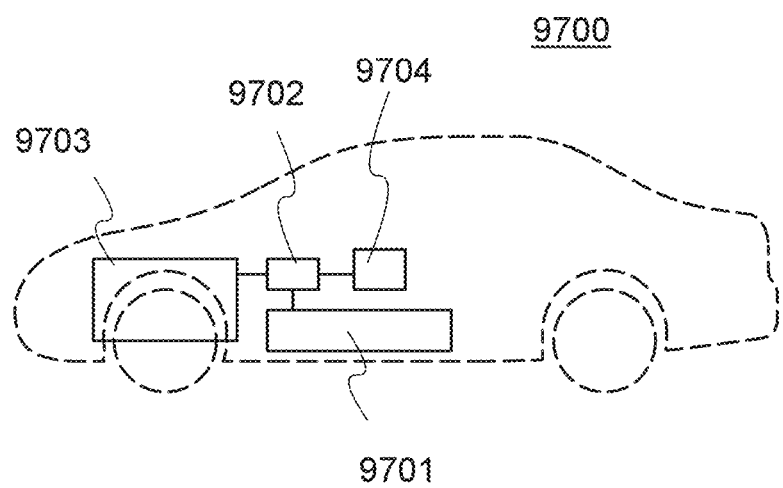

FIGS. 18A and 18B illustrate an example of an electric vehicle. An electric vehicle 9700 is equipped with a lithium secondary battery 9701. The output of the electric power of the lithium secondary battery 9701 is adjusted by a control circuit 9702 and the electric power is supplied to a driving device 9703. The control circuit 9702 is controlled by a processing unit 9704 including a ROM, a RAM, a CPU, or the like which is not illustrated.

The driving device 9703 includes a DC motor or an AC motor either alone or in combination with an internal-combustion engine. The processing unit 9704 outputs a control signal to the control circuit 9702 based on input data such as data of operation (e.g., acceleration, deceleration, or stop) by a driver or data during driving (e.g., data on an upgrade or a downgrade, or data on a load on a driving wheel) of the electric vehicle 9700. The control circuit 9702 adjusts the electric energy supplied from the lithium secondary battery 9701 in accordance with the control signal of the processing unit 9704 to control the output of the driving device 9703. In the case where the AC motor is mounted, although not illustrated, an inverter which converts direct current into alternate current is also incorporated.

Charge of the lithium secondary battery 9701 can be performed by external electric power supply using a plug-in technique. For example, the lithium secondary battery 9701 is charged through a power plug from a commercial power supply. The lithium secondary battery 9701 can be charged by converting external power into DC constant voltage having a predetermined voltage level through a converter such as an AC-DC converter. When the lithium secondary battery of one embodiment of the present invention is provided as the lithium secondary battery 9701, a shorter charging time can be brought about and improved convenience can be realized. Moreover, the higher charging and discharging rate of the lithium secondary battery 9701 can contribute to greater acceleration and excellent performance of the electric vehicle 9700. When the lithium secondary battery 9701 itself can be more compact and more lightweight as a result of improved characteristics of the lithium secondary battery 9701, the vehicle can be lightweight and fuel efficiency can be increased.

This embodiment can be implemented in combination with any of the other embodiments as appropriate.

EXAMPLE 1

The present invention will be specifically described below using Examples and Comparative Examples. Note that the present invention is not limited to Examples below.

(Manufacture of Negative Electrode)

A 0.7-mm-thick sheet-like titanium was used as a material for a current collector of a negative electrode. The purity of the titanium is 99.5%. A photoresist pattern was formed over the sheet-like titanium, and then exposed titanium was etched by dry etching.

The etching was performed for 440 seconds under the conditions that the power of source (13.56 MHz) was 1000 W, the power of bias (3.2 MHz) was 80 W, the pressure was 0.67 Pa, the etching gas was a mixed gas of $BCl_3$ and $Cl_2$ with flow rates of 150 sccm and 50 sccm, respectively, and the substrate temperature was −10° C. By the above etching, a negative electrode current collector including a base portion and protrusion portions was formed.

After that, amorphous silicon which serves as a negative electrode active material layer was formed over the current collector with a reduced-pressure CVD (thermal CVD) apparatus. An amorphous silicon layer was deposited for 2 hours and 20 minutes by introducing monosilane ($SiH_4$) and nitrogen ($N_2$) into a reaction chamber at flow rates of 300 sccm under the conditions that the pressure was 100 Pa and the substrate temperature was 550° C. In the above manner, a negative electrode active material layer formed of amorphous silicon with a thickness of about 500 nm was formed over the current collector.

Figure 19A:
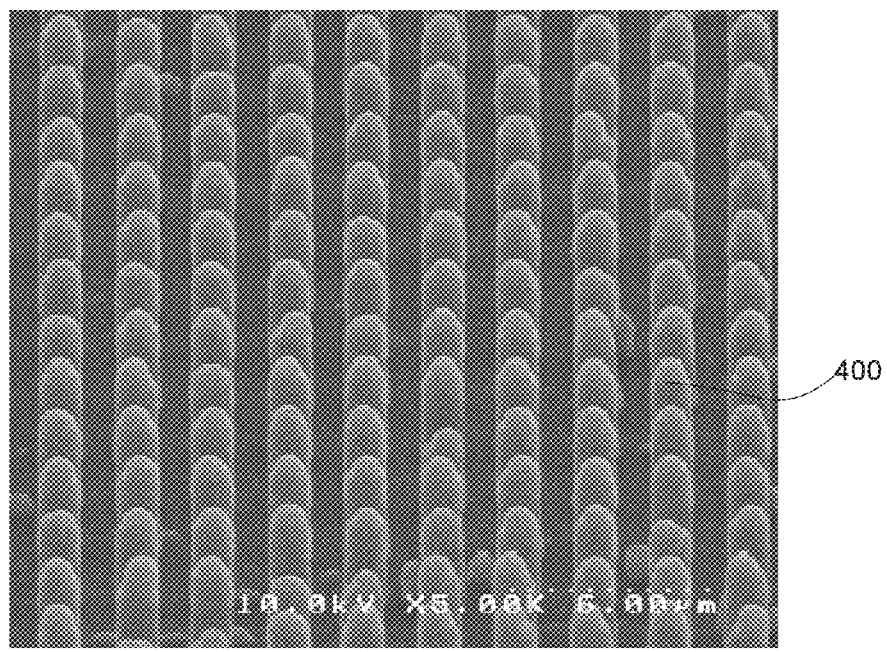
FIGS. 19A and 19B are SEM images of a negative electrode in Example.
Figure 19B:
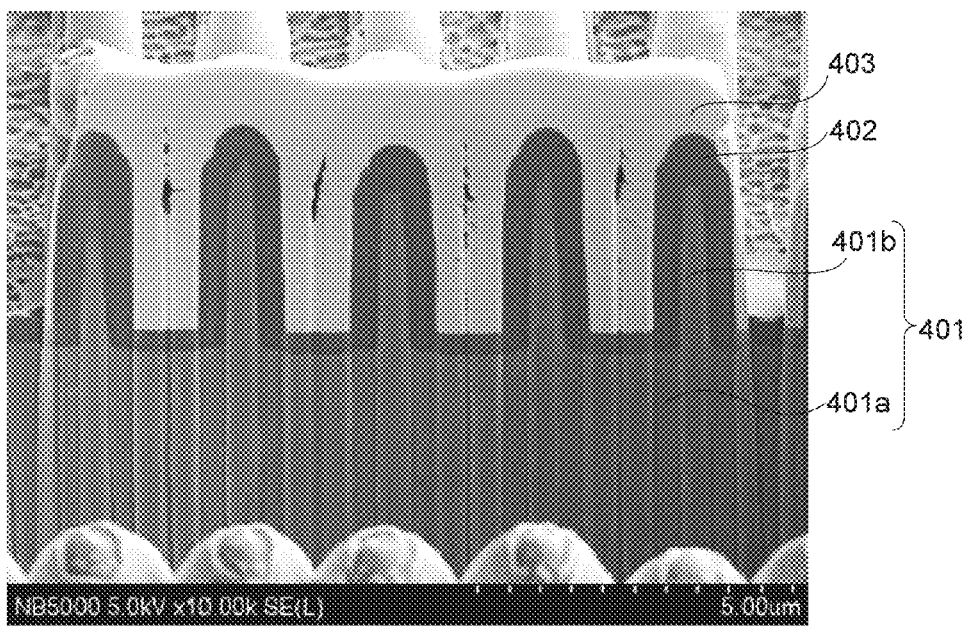

FIGS. 19A and 19B are observation photographs of the manufactured negative electrode. FIG. 19A is a bird's-eye image of the manufactured negative electrode observed by a scanning electron microscope (SEM). A plurality of protrusions 400 covered with amorphous silicon, which are regularly arranged, can be observed.

FIG. 19B is a photograph of a cross section of the manufactured negative electrode which was processed with a focused ion beam (FIB) apparatus and observed by SEM. A negative electrode current collector 401 in which a base portion 401a and protrusion portions 401b are combined and a negative electrode active material layer 402 with which the negative electrode current collector 401 is covered and which is formed of amorphous silicon can be observed. The diameter of the protrusion portion 401b of the negative electrode current collector 401 is about 500 nm, which is substantially the same as the thickness of the negative electrode active material layer 402. The height of the protrusion portion 401b is about 2.5 μm. FIG. 19B shows that the protrusion portion 401b with the height is covered with the negative electrode active material layer 402 by a reduced-pressure CVD method. Further, a top surface of the base portion 401a is also covered with the negative electrode active material layer 402. Note that a film 403 observed over the negative electrode active material layer 402 is a carbon film deposited by evaporation for cross-sectional processing and observation of the negative electrode and is not provided in actual manufacture of a battery.

(Battery Characteristics)

Characteristics of a battery including the negative electrode of one embodiment of the present invention which was manufactured in the above-described manner were evaluated. The characteristics were evaluated using a three-electrode cell in which lithium was used for a counter electrode and a reference electrode. An electrolyte solution was formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1. Charge and discharge were performed with a constant current at a rate of 0.05 C. Note that insertion of lithium with a discharge capacity of about 750 µAh/cm² or higher was performed at a constant voltage of 0.01 V in order to prevent separation of lithium.

Figure 20A:
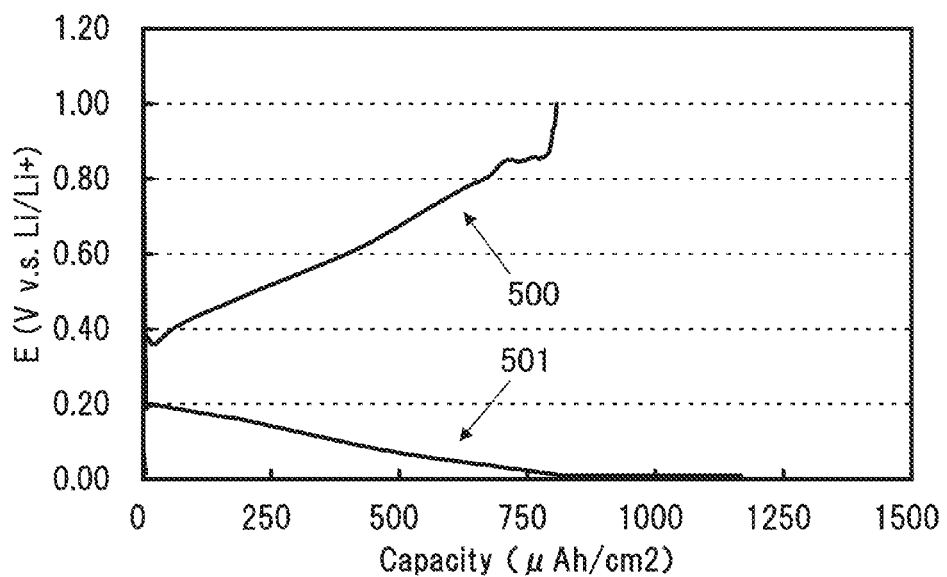
FIGS. 20A and 20B show measurement results of battery characteristics.

FIG. 20A shows results of the characteristic evaluation. The vertical axis represents voltage of the negative electrode with oxidation-reduction potential of lithium used as a reference and the horizontal axis represents capacity of the negative electrode of one embodiment of the present invention. A curved line 500 represents extraction of lithium from the negative electrode; a curved line 501 represents insertion of lithium in the negative electrode. The capacity was about 1170 µAh/cm², which is close to a calculated theoretical capacity of about 1320 µAh/cm².

COMPARATIVE EXAMPLE

Figure 20B:
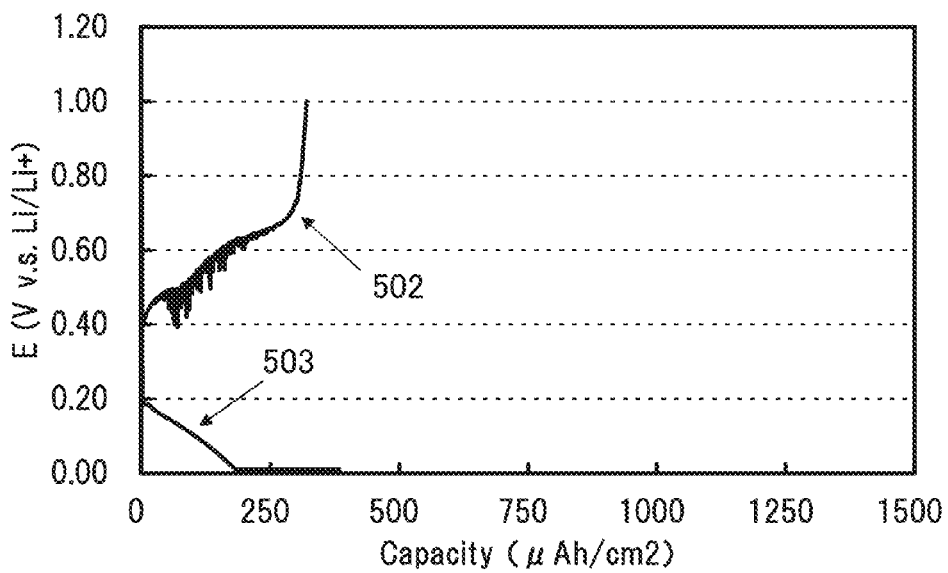

For comparative evaluation with the negative electrode of one embodiment of the present invention, characteristics of a battery including a negative electrode in which thin-film amorphous silicon was formed as a negative electrode active material layer over a flat titanium sheet with no protrusion portion were evaluated. The titanium sheet is a 0.7-mm-thick sheet-like titanium which is the same as that described above. The formed negative electrode active material layer is thin-film amorphous silicon with a thickness of about 500 nm formed by a reduced-pressure CVD method under the same conditions described above. FIG. 20B shows measurement results. A curved line 502 represents extraction of lithium; a curved line 503 represents insertion of lithium. FIG. 20B shows that the discharge capacity of the comparative negative electrode is about 380 µAh/cm² (calculated theoretical capacity: about 520 µAh/cm²), which is significantly lower than the discharge capacity in the case of using the negative electrode of one embodiment of the present invention. These results confirmed that a lithium secondary battery including the negative electrode of one embodiment of the present invention has high discharge capacity.

EXAMPLE 2

In this example, a negative electrode in which a negative electrode active material layer was provided only in the vicinity of protrusion portions of a current collector, which is different from the negative electrode in Example 1, will be described with reference to FIGS. 21A and 21B.

(Manufacture of Negative Electrode)

The negative electrode in Example 2 was manufactured on the basis of the manufacturing method of the negative electrode in Example 1. However, a film of amorphous silicon which was a negative electrode active material is formed by a CVD method, and then the amorphous silicon film was anisotropically etched by an etch-back method so that the thickness of the amorphous silicon film was entirely reduced, whereby the amorphous silicon only in the vicinity of the protrusion portions of the current collector remained.

The amorphous silicon was etched back for 233 seconds under the conditions that the power of source (13.56 MHz) was 2000 W, the power of bias (3.2 MHz) was 150 W, the pressure was 0.67 Pa, the etching gas was a mixed gas of $CF_4$ and $O_2$ with flow rates of 70 sccm and 30 sccm, respectively, and the substrate temperature was 40° C.

Figure 21A:
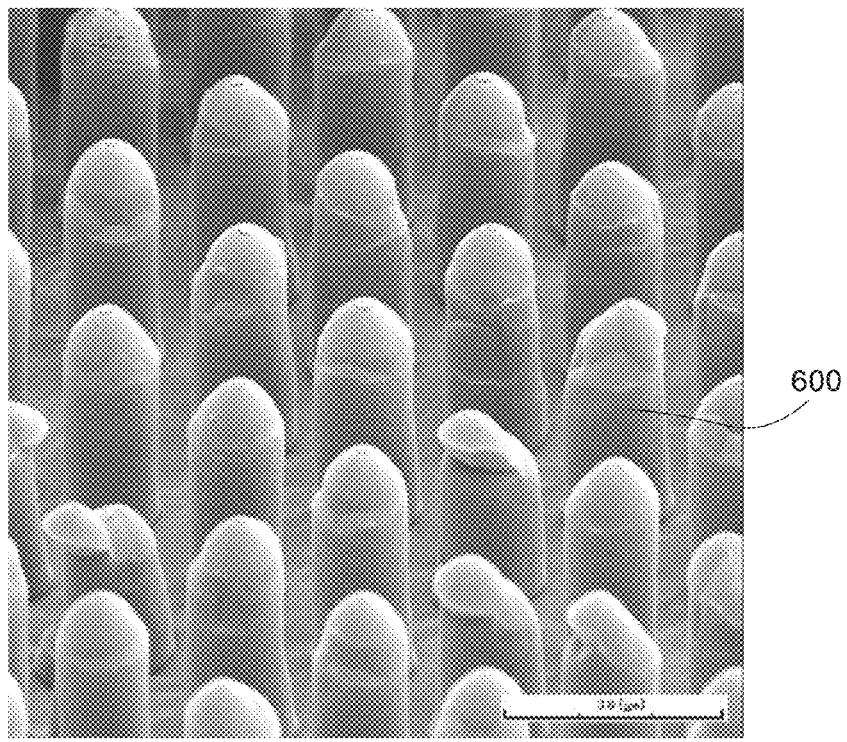
FIGS. 21A and 21B are SEM images of a negative electrode in Example.

FIG. 21A is a SEM image showing the negative electrode manufactured in the above-described manner. The negative electrode was observed at an angle of 54° thereto. Protrusions 600 which are regularly arranged can be observed. A uniform, periodic arrangement in which the heights of the protrusions 600 are about 4 µm and the spaces between the protrusions 600 are about 2 µm was able to be formed.

Figure 21B:
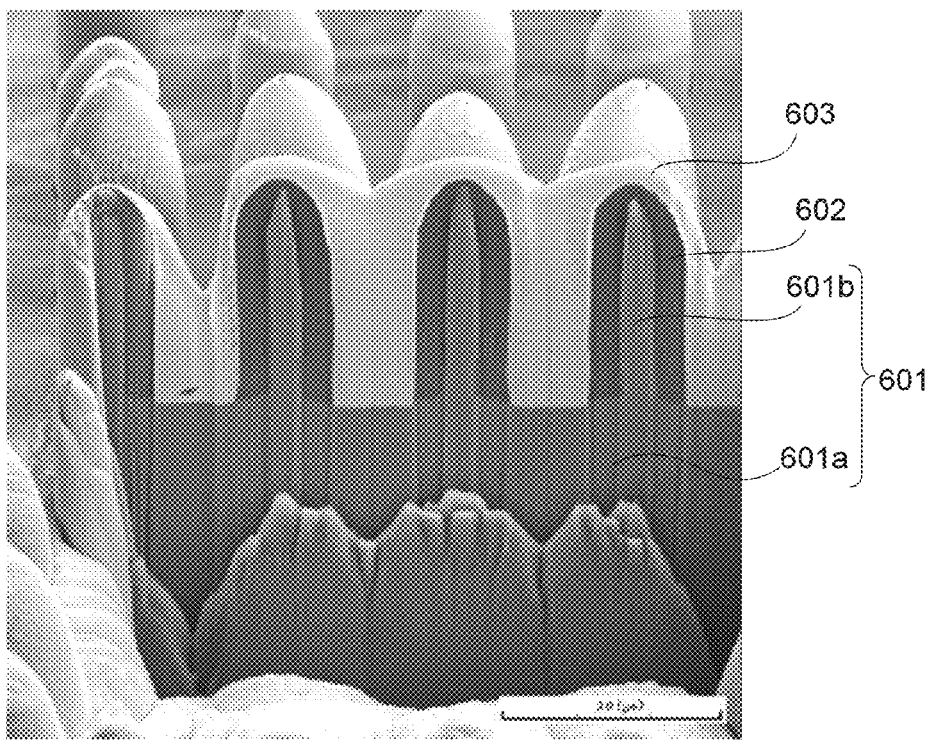

FIG. 21B is a photograph of a cross section of the manufactured negative electrode which was processed with an FIB apparatus and observed by SEM. A negative electrode current collector 601 including a base portion 601a and protrusion portions 601b is similar to the negative electrode current collector in Example 1. The protrusion portions 601b each have a sharp end. A negative electrode active material layer 602 is formed over the negative electrode current collector 601. The negative electrode active material layer 602 over the base portion 601a of the negative electrode current collector 601 has been removed but the negative electrode active material layer 602 is provided only on side surfaces and top surfaces of the protrusion portions 601b. The thickness of the negative electrode active material layer 602 formed on the side surface of the protrusion portion 601b was about 410 nm to 440 nm, and the thickness of the negative electrode active material layer 602 on the top surface of the protrusion portion 601b was about 245 nm. The thickness of the negative electrode active material layer 602 on the side surface of the protrusion portion 601b was different from that on the top surface of the protrusion portion 601b because of anisotropic etching.

Note that a film 603 over the negative electrode active material layer 602 is provided for processing and observation of the sample and is thus not included in the structure of the negative electrode of one embodiment of the present invention.

(Charge-Discharge Cycle Evaluation)

Characteristics of a battery including the negative electrode of one embodiment of the present invention which was manufactured in the above-described manner were evaluated. The characteristics were evaluated using a two-electrode cell in which lithium was used for a counter electrode. An electrolyte solution was formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1. As a separator, polypropylene (PP) was used. Charge and discharge were performed with a constant current at a rate of 0.05 C and then at a rate of 0.25 C. The maximum charge-discharge capacity was set to 1050 mAh/g, and the voltage range was from 0.01 V to 1.0 V (vs. Li/Li⁺). The measurement was performed at 25° C.

(After 10th Charge-Discharge Cycle)

Figure 22A:
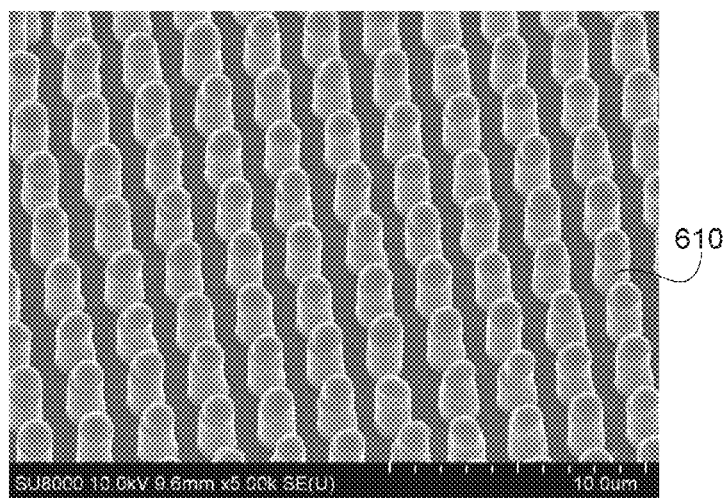
FIGS. 22A to 22C are SEM images of the negative electrode in Example.
Figure 22B:
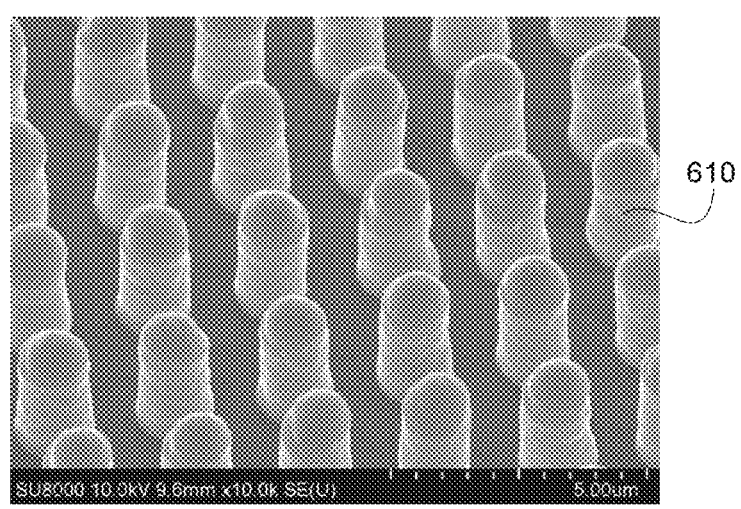
Figure 22C:
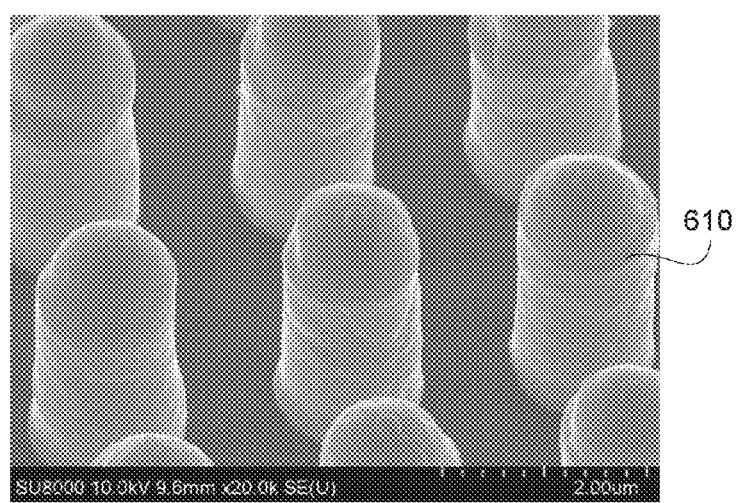

FIGS. 22A to 22C are SEM images of the thus manufactured negative electrode observed after the 10th charge-discharge cycle. FIG. 22A is a SEM image in which the protrusions were observed obliquely from above; FIG. 22B is an enlarged view thereof; FIG. 22C is an enlarged view of FIG. 22B. FIGS. 22A to 22C show that protrusions 610 are regularly arranged and that cracks and separation of a silicon film forming the surface of the protrusion are not generated.

Figure 23A:
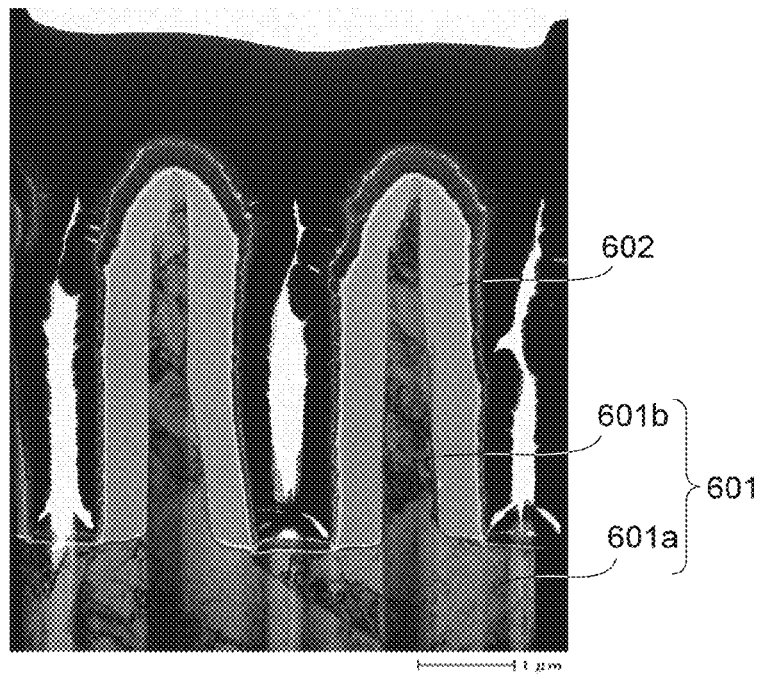
FIGS. 23A and 23B are TEM images of the negative electrode in Example.
Figure 23B:
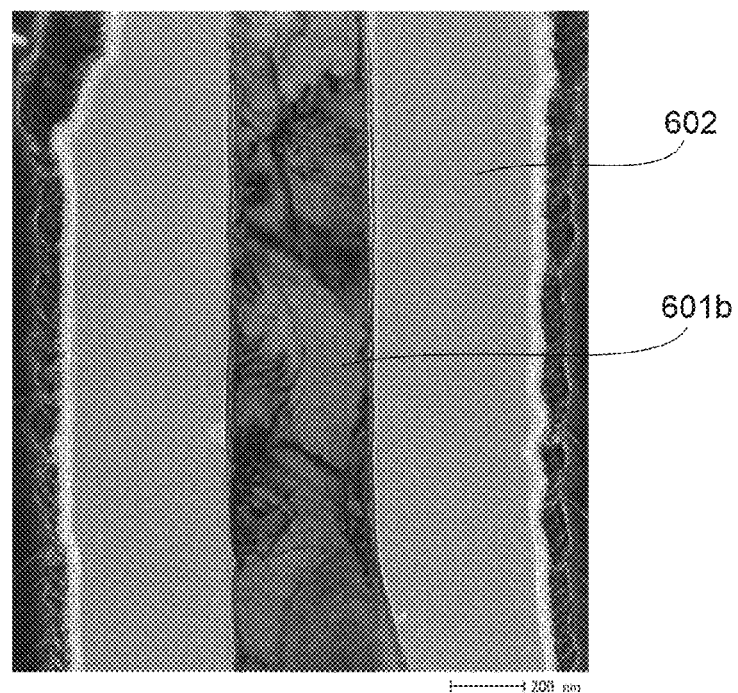

FIGS. 23A and 23B are transmission electron microscopy (TEM) images of the negative electrode observed after the 10th charge-discharge cycle. The negative electrode active material layer 602 on the side surface of the protrusion portion 601b can be observed. A black film over the negative electrode active material layer 602 is platinum or tungsten with which the negative electrode active material layer 602 was covered for processing and observation of the sample and is thus not included in the structure of the negative electrode of one embodiment of the present invention. No deterioration such as separation or cracks was observed in the negative electrode active material layer 602.

Figure 24A:
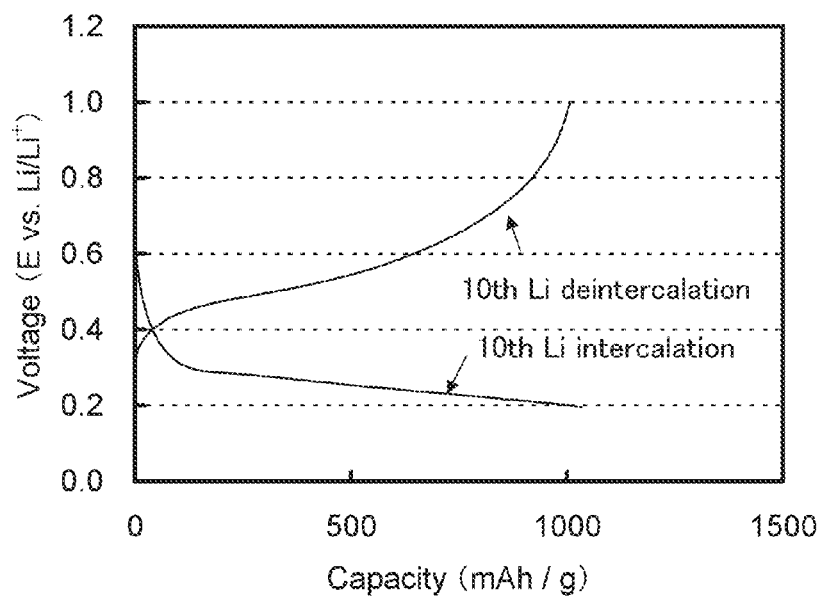
FIGS. 24A and 24B show characteristics of the negative electrode in Example.
Figure 24B:
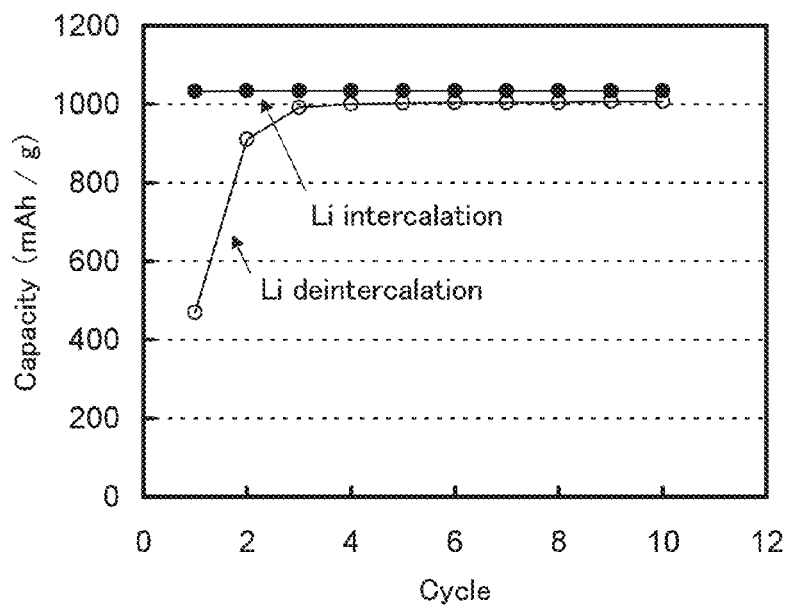

FIG. 24A shows charge-discharge characteristics of the negative electrode observed at the 10th charge-discharge cycle. The vertical axis represents voltage of the negative electrode with oxidation-reduction potential of lithium used as a reference and the horizontal axis represents capacity of the negative electrode of one embodiment of the present invention. FIG. 24B shows cycle characteristics of the charge-discharge capacity up to the 10th charge-discharge cycle. The vertical axis represents capacity of the negative electrode and the horizontal axis represents the number of cycles of insertion or extraction of Li in or from the negative electrode. FIGS. 24A and 24B show that the capacity of the negative electrode was maintained and deterioration of the charge-discharge capacity did not occur at the 10th charge-discharge cycle.

(After 40th Charge-Discharge Cycle)

Figure 25A:
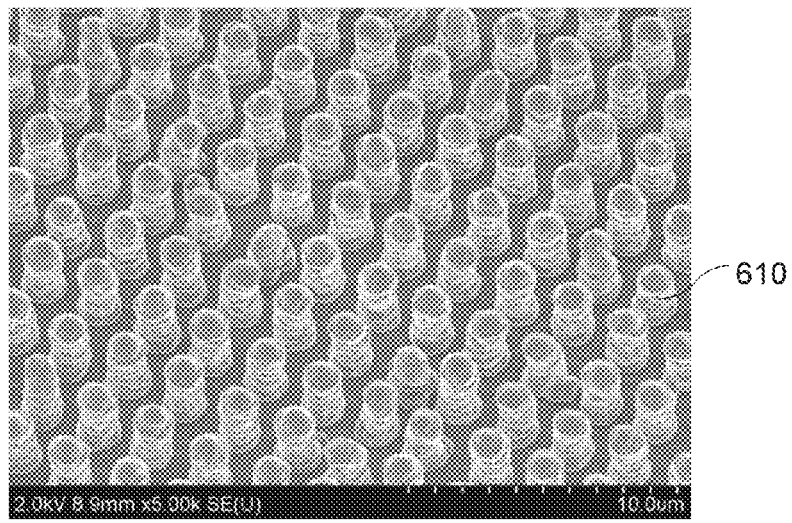
FIGS. 25A to 25C are SEM images of the negative electrode in Example.
Figure 25B:
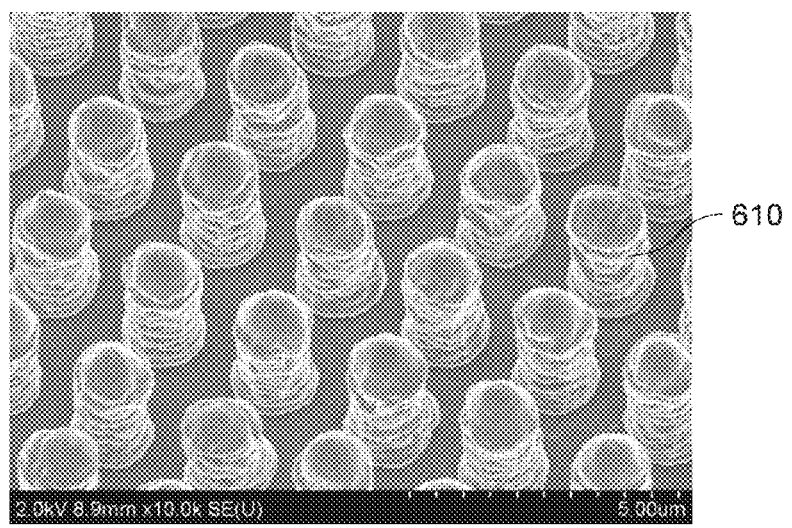
Figure 25C:
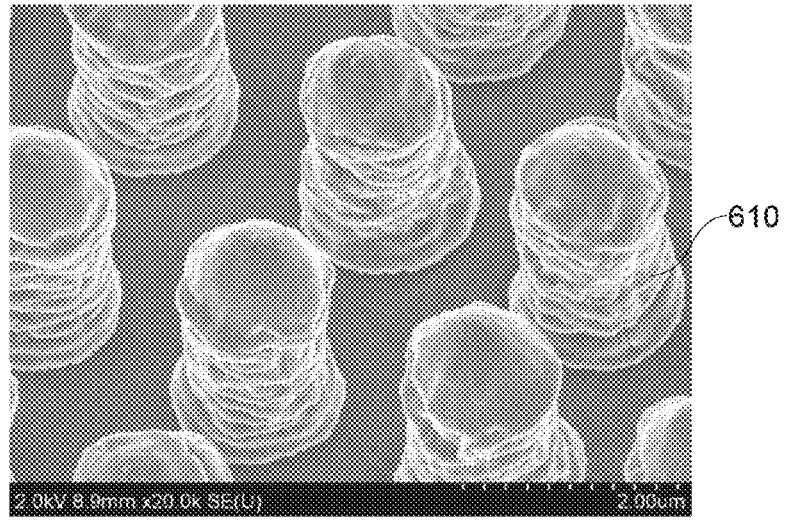

FIGS. 25A to 25C are SEM images of the negative electrode observed after the 40th charge-discharge cycle. According to FIGS. 25A to 25C, the regularly arranged protrusions 610 each have an uneven surface as compared to the state observed after the 10th charge-discharge cycle which is shown in FIG. 23A.

Figure 26A:
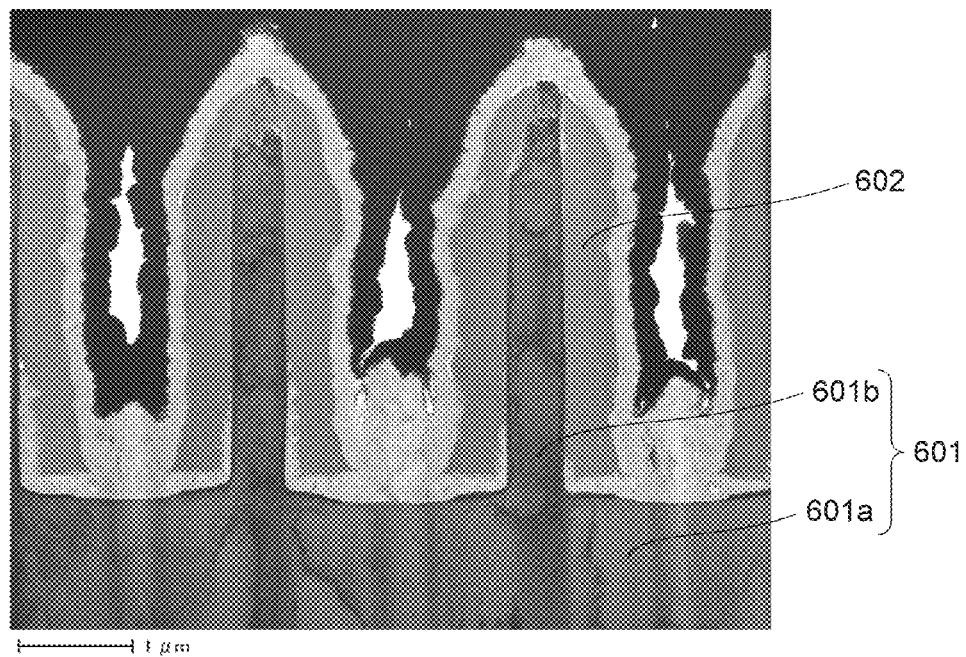
FIGS. 26A and 26B are TEM images of the negative electrode in Example.
Figure 26B:
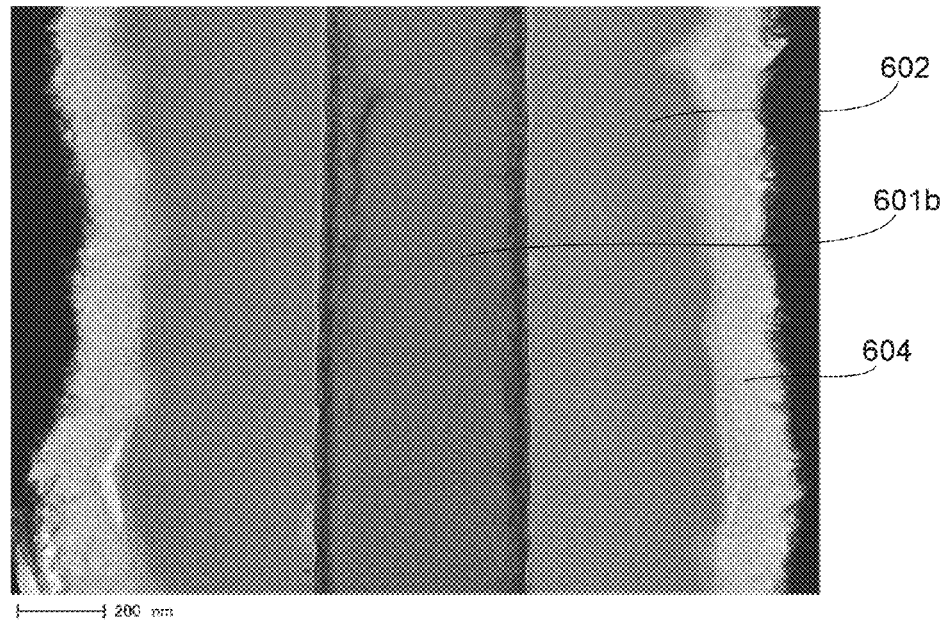

FIGS. 26A and 26B are TEM images of the negative electrode observed after the 40th charge-discharge cycle. According to FIGS. 26A and 26B, a porous portion 604 is formed in a surface part of the negative electrode active material layer 602 provided around the protrusion portion 601b. The porous portion 604 was probably formed because of the repeated charge and discharge, that is, repeated insertion and extraction of carrier ions.

Figure 27A:
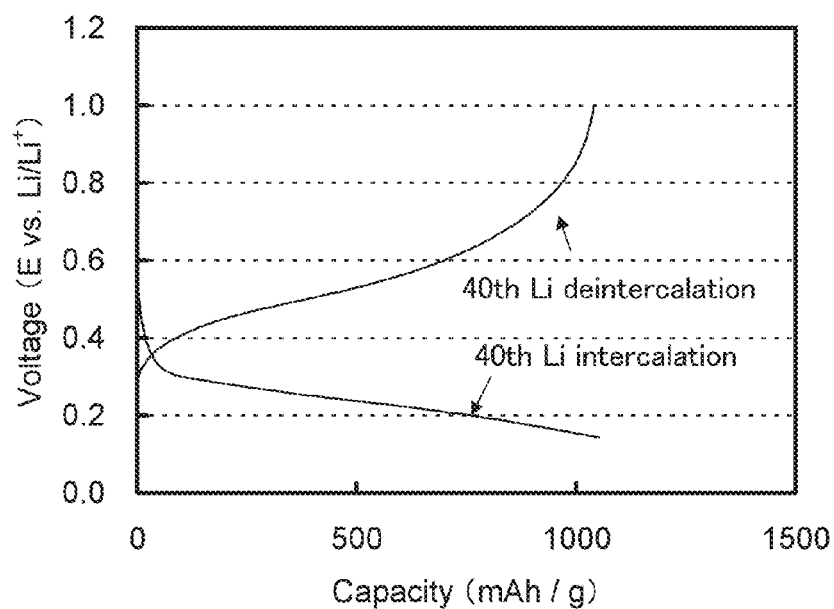
FIGS. 27A and 27B show characteristics of the negative electrode in Example.
Figure 27B:
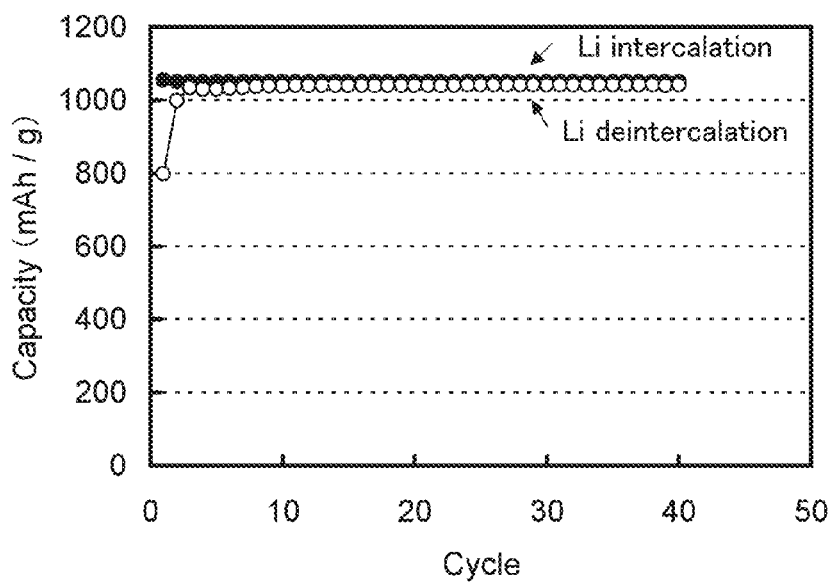

FIG. 27A shows charge-discharge characteristics of the negative electrode observed at the 40th charge-discharge cycle. The vertical axis represents voltage of the negative electrode with oxidation-reduction potential of lithium used as a reference and the horizontal axis represents capacity of the negative electrode of one embodiment of the present invention. FIG. 27B shows cycle characteristics of the charge-discharge capacity up to the 40th charge-discharge cycle. The vertical axis represents capacity of the negative electrode and the horizontal axis represents the number of cycles of insertion or extraction of Li in or from the negative electrode. As described above, the porous portion 604 was observed in part of the negative electrode active material layer 602 of the negative electrode after the 40th charge-discharge cycle. However, the measurement results of the charge-discharge characteristics show that the capacity of the negative electrode was maintained and deterioration of the charge-discharge capacity did not occur at the 40th charge-discharge cycle.

(After 150th Charge-Discharge Cycle)

Figure 28A:
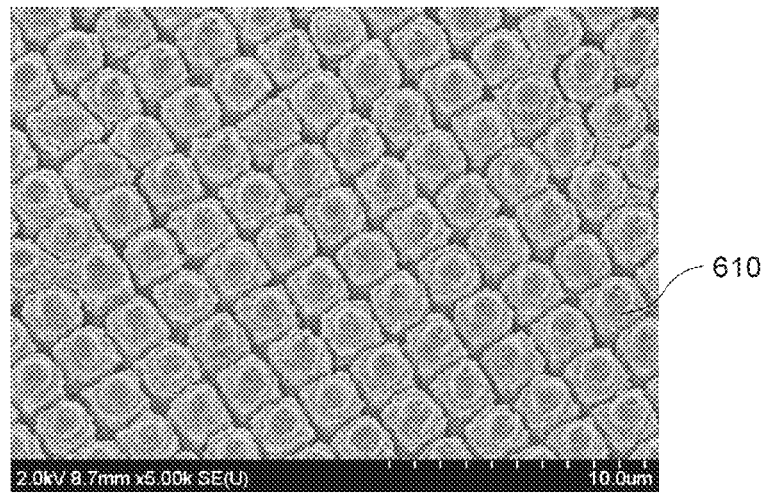
FIGS. 28A to 28C are SEM images of the negative electrode in Example.
Figure 28B:
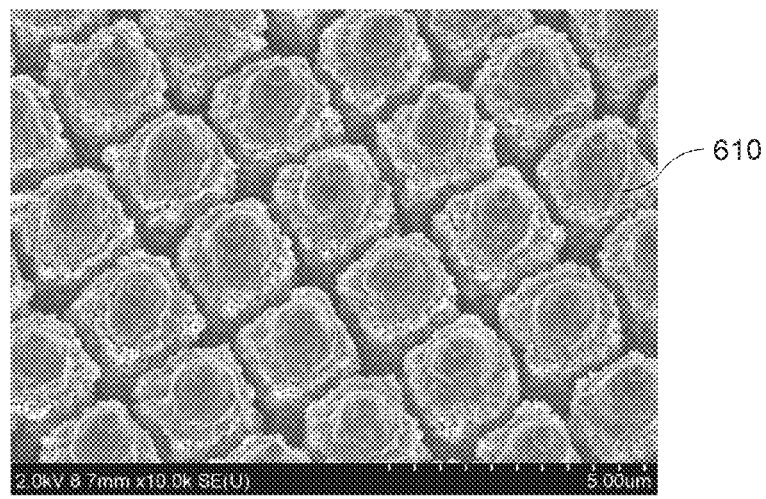
Figure 28C:
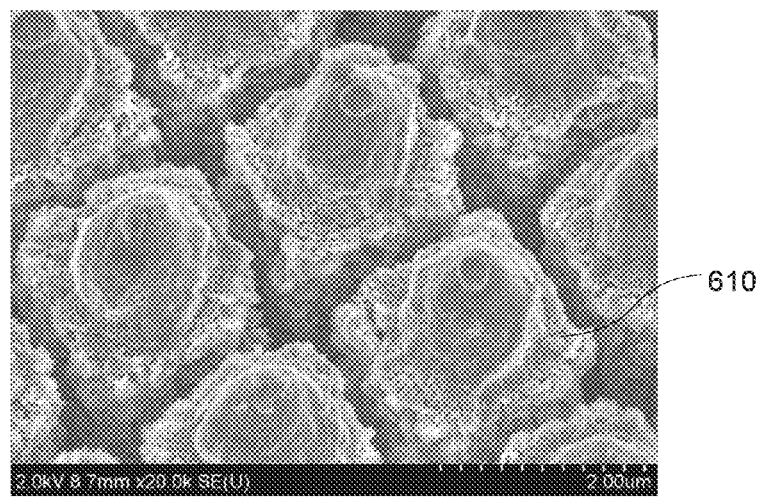

FIGS. 28A to 28C are SEM images of the negative electrode observed after the 150th charge-discharge cycle. According to FIGS. 28A to 28C, the regularly arranged protrusions 610 each expand as compared to the state observed after the 40th charge-discharge cycle which is shown in FIG. 25A. Negative electrode active materials of the protrusions 610 probably expanded toward spaces after coming in contact with the protrusions 610 adjacent thereto at the shortest distance, so that square pillar shapes were formed.

Figure 29A:
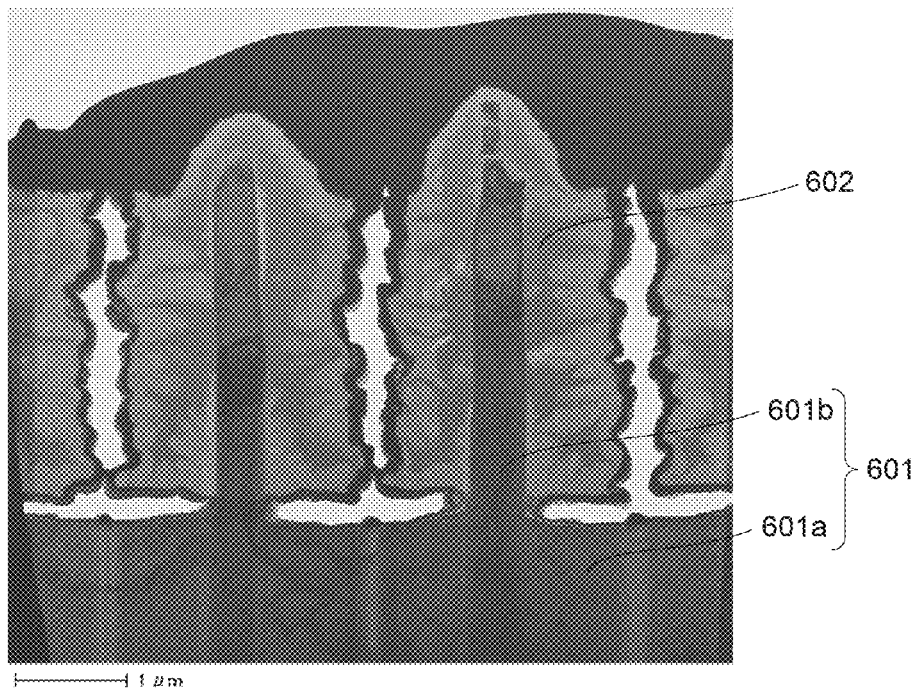
FIGS. 29A and 29B are TEM images of the negative electrode in Example.
Figure 29B:
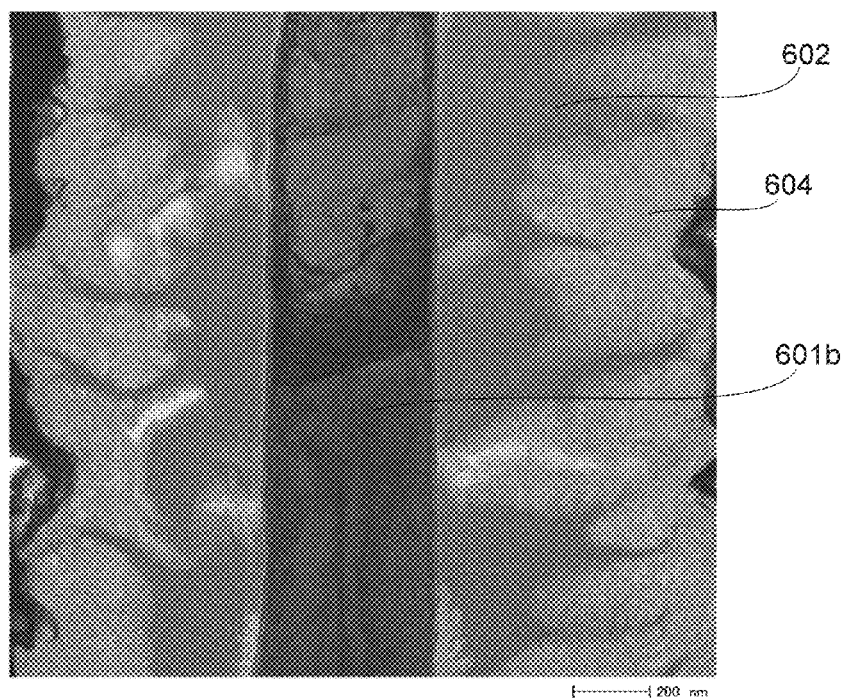

FIGS. 29A and 29B are TEM images of the negative electrode observed after the 150th charge-discharge cycle. The porous portion 604 is formed in a surface part of the negative electrode active material layer 602 provided around the protrusion portion 601b. The porous portion 604 spreads more than in the negative electrode after the 40th charge-discharge cycle which is shown in FIGS. 26A and 26B, so that the porous portion 604 occupied a large part of the negative electrode active material layer 602.

Figure 30A:
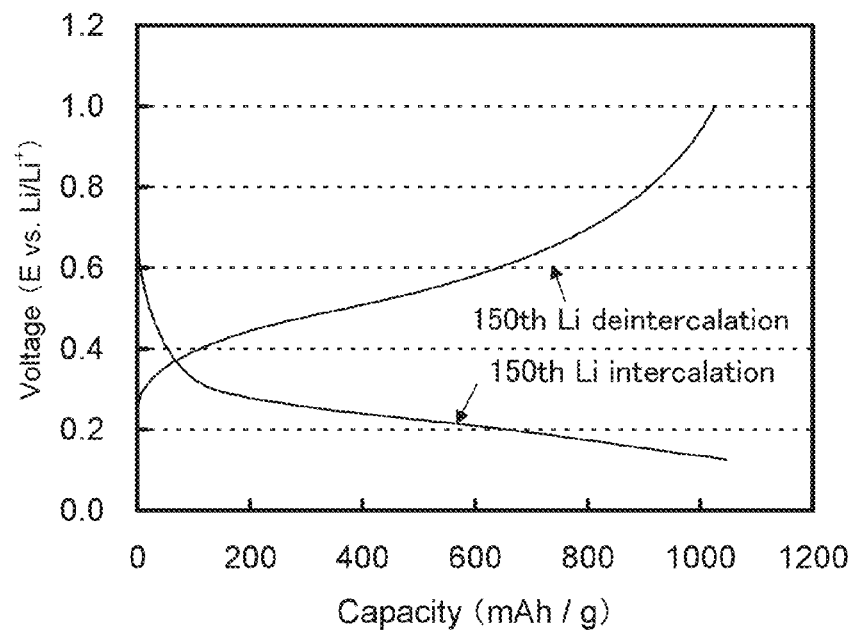
FIGS. 30A and 30B show characteristics of the negative electrode in Example.
Figure 30B:
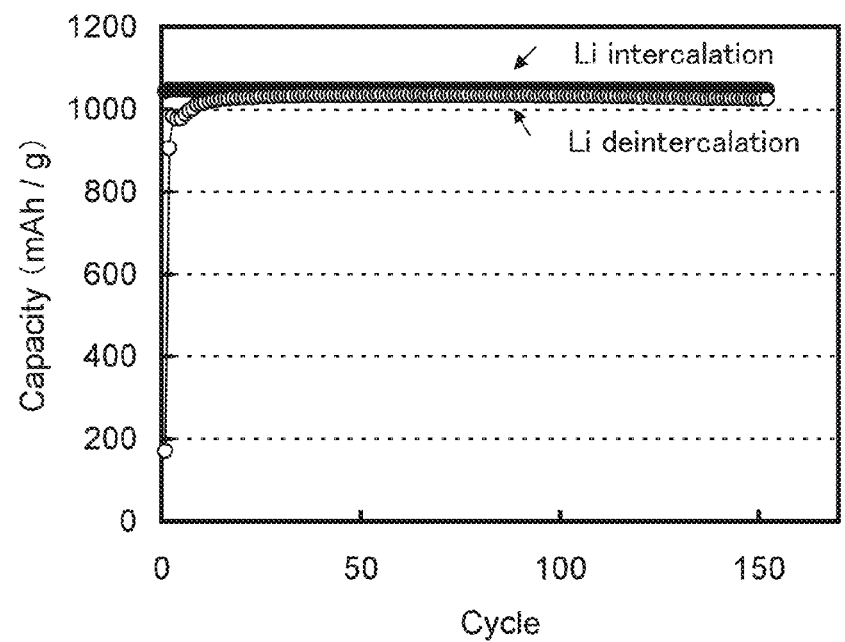

FIG. 30A shows charge-discharge characteristics of the negative electrode observed at the 150th charge-discharge cycle. The vertical axis represents voltage of the negative electrode with oxidation-reduction potential of lithium used as a reference and the horizontal axis represents capacity of the negative electrode of one embodiment of the present invention. FIG. 30B shows cycle characteristics of the charge-discharge capacity up to the 150th charge-discharge cycle. The vertical axis represents capacity of the negative electrode and the horizontal axis represents the number of cycles of insertion or extraction of Li in or from the negative electrode. As described above, the porous portion 604 was observed in a large part of the negative electrode active material layer 602 of the negative electrode after the 150th charge-discharge cycle. However, the measurement results of the charge-discharge characteristics show that the capacity of the negative electrode was maintained and deterioration of the charge-discharge capacity did not occur at the 150th charge-discharge cycle.

COMPARATIVE EXAMPLE

For comparison with the above example, a thin amorphous silicon film was formed over a current collector to a thickness of about 500 nm by a reduced-pressure CVD method under the same conditions, charge and discharge were repeated similarly, and cycle characteristics were evaluated. The cycle characteristics were evaluated in the same manner as the above example. Note that protrusion portions are not provided in a current collector in this comparative example and the silicon film is a continuous film.

(After 10th Charge-Discharge Cycle)

Figure 31A:
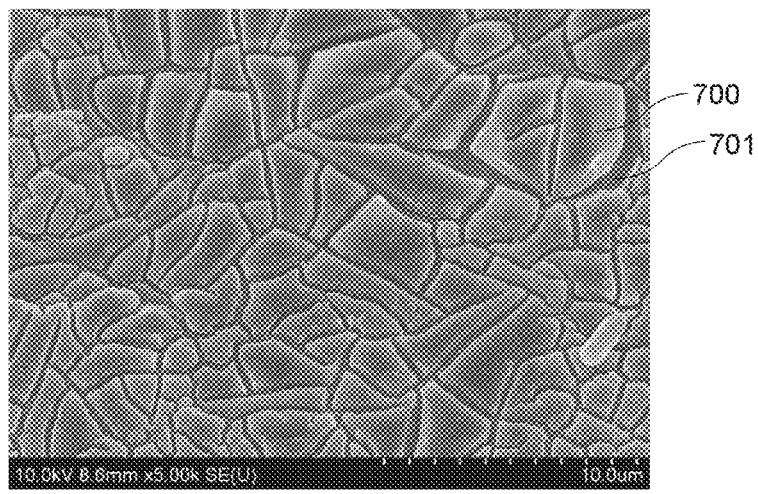
FIGS. 31A to 31C are SEM images of a negative electrode in Comparative Example.
Figure 31B:
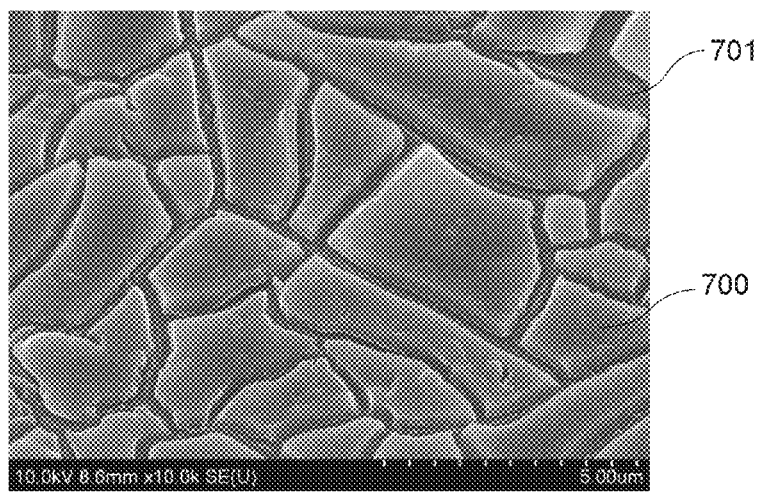
Figure 31C:
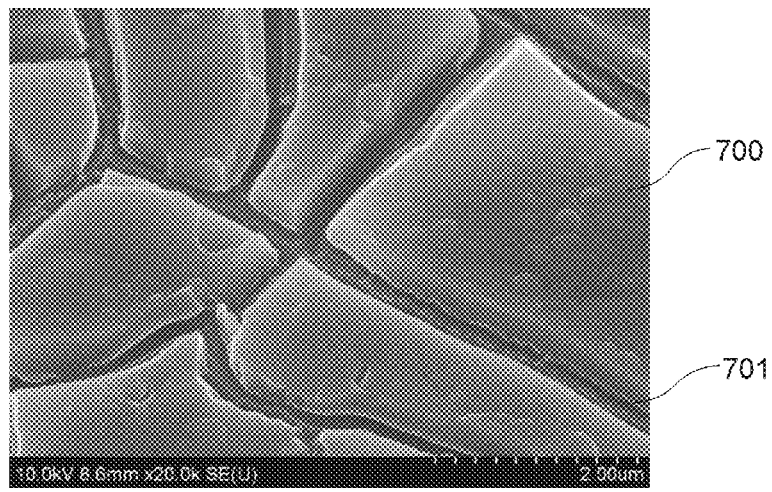

FIGS. 31A to 31C are SEM images of the negative electrode observed after the 10th charge-discharge cycle. FIG. 31A is a SEM image in which a surface of the thin amorphous silicon film was observed obliquely from above; FIG. 31B is an enlarged view of FIG. 31A; FIG. 31C is an enlarged view of FIG. 31B. The observation confirmed that countless cracks 701 were generated in a silicon film 700. The cracks 701 were probably generated because of expansion and contraction of the silicon film due to the repeated insertion and extraction of lithium.

Figure 32A:
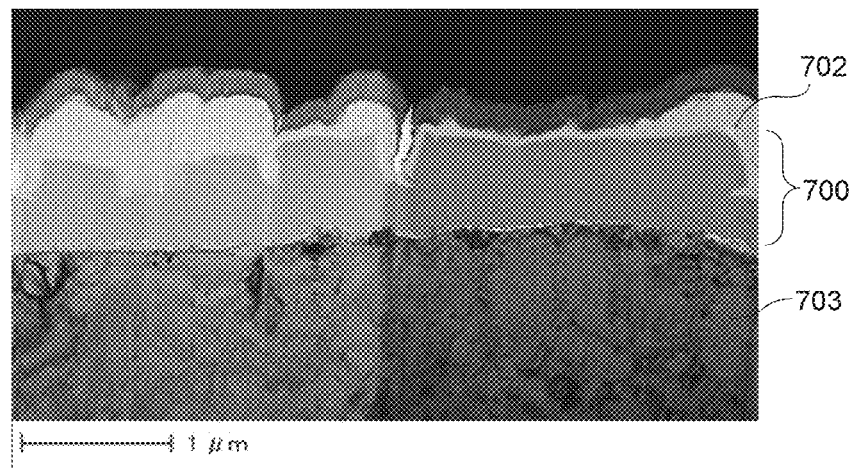
FIGS. 32A and 32B are TEM images of the negative electrode in Comparative Example.
Figure 32B:
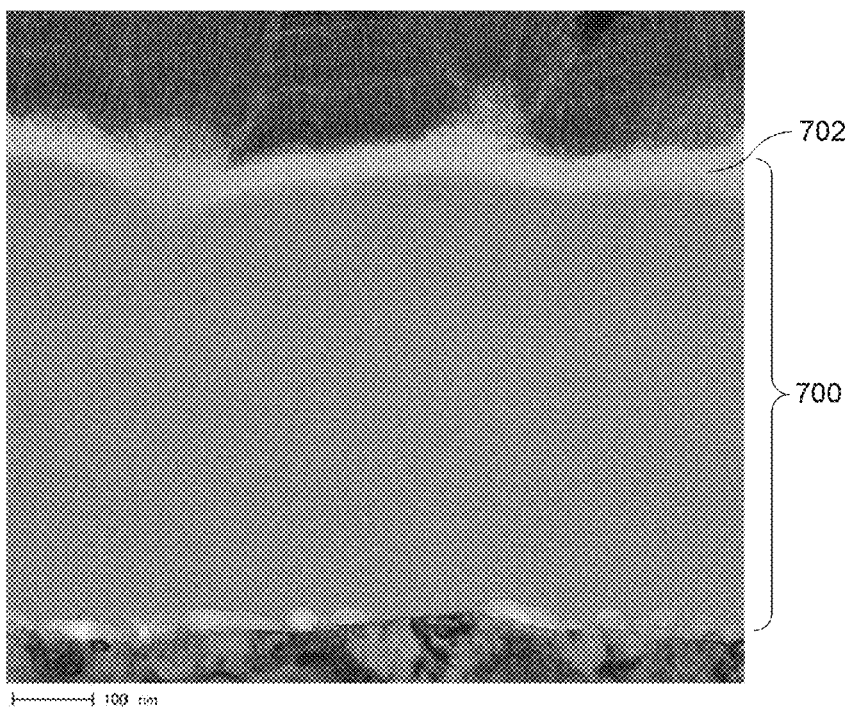

FIGS. 32A and 32B are TEM images of the negative electrode observed after the 10th charge-discharge cycle. A crack which is formed in the thickness direction of the silicon film 700 over a current collector 703 formed of sheet-like titanium can be observed near the center of the film. Further, a porous portion 702 is partly formed in the silicon film 700 in the thickness direction from a surface of the silicon film 700. Note that although a platinum film or a tungsten film for processing and observation of the sample is provided over the silicon film 700, the film is not included in the structure of the negative electrode of one embodiment of the present invention.

Figure 33A:
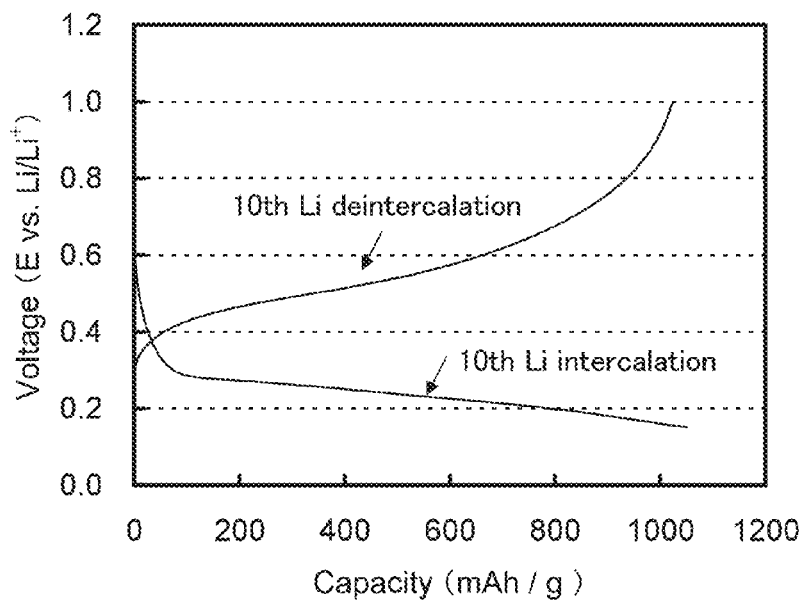
FIGS. 33A and 33B show characteristics of the negative electrode in Comparative Example.
Figure 33B:
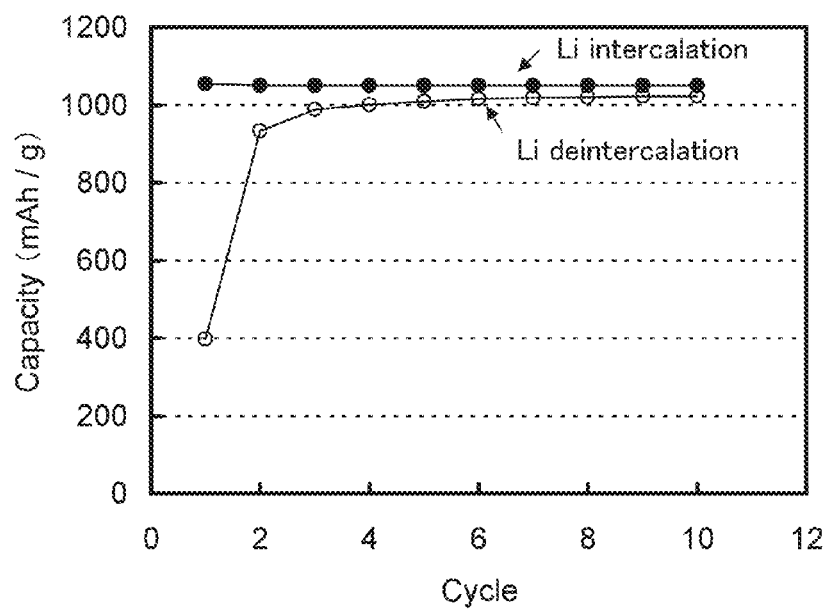

FIG. 33A shows charge-discharge characteristics of the negative electrode observed at the 10th charge-discharge cycle. The vertical axis represents voltage of the negative electrode with oxidation-reduction potential of lithium used as a reference and the horizontal axis represents capacity of the negative electrode in the comparative example. FIG. 33B shows cycle characteristics of the charge-discharge capacity up to the 10th charge-discharge cycle. The vertical axis represents capacity of the negative electrode and the horizontal axis represents the number of cycles of insertion or extraction of Li into or from the negative electrode. The measurement results of the charge-discharge characteristics show that the charge-discharge capacity was maintained and deterioration of cycle characteristics did not occur.

As described above, there was no significant difference in cycle characteristics up to the 10th charge-discharge cycle between the negative electrode in this comparative example in which the thin amorphous silicon film was used as a negative electrode active material and the negative electrode in Example 2. Meanwhile, the porous portion was observed in a large part of the thin amorphous silicon film in this comparative example.

(After 40th Charge-Discharge Cycle)

Figure 34A:
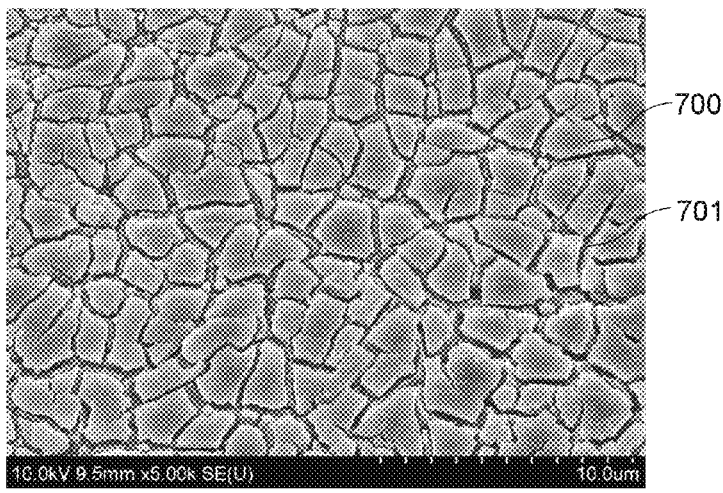
FIGS. 34A to 34C are SEM images of the negative electrode in Comparative Example.
Figure 34B:
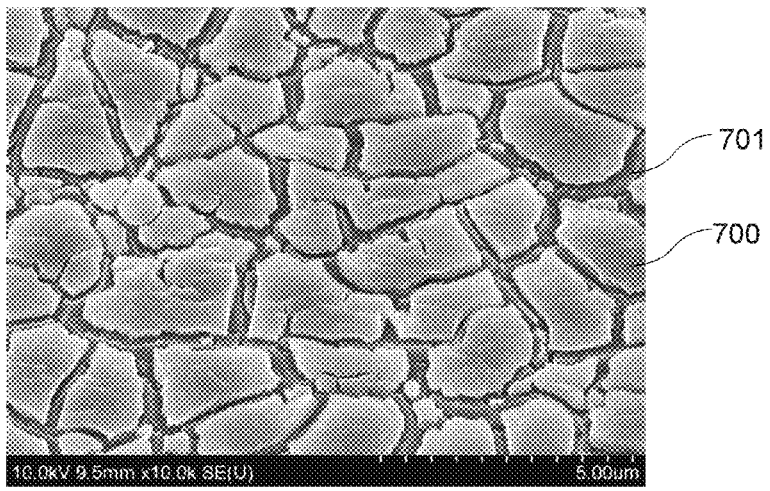
Figure 34C:
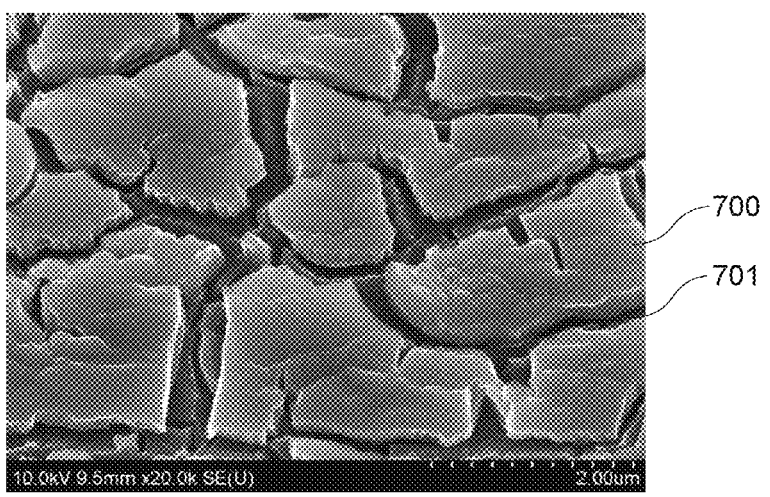

FIGS. 34A to 34C are SEM images of the negative electrode observed after the 40th charge-discharge cycle. The observation confirmed that the countless cracks 701 were generated in the silicon film 700 and the cracks were more noticeable than those observed after the 10th charge-discharge cycle which are shown in FIGS. 31A to 31C.

Figure 35A:
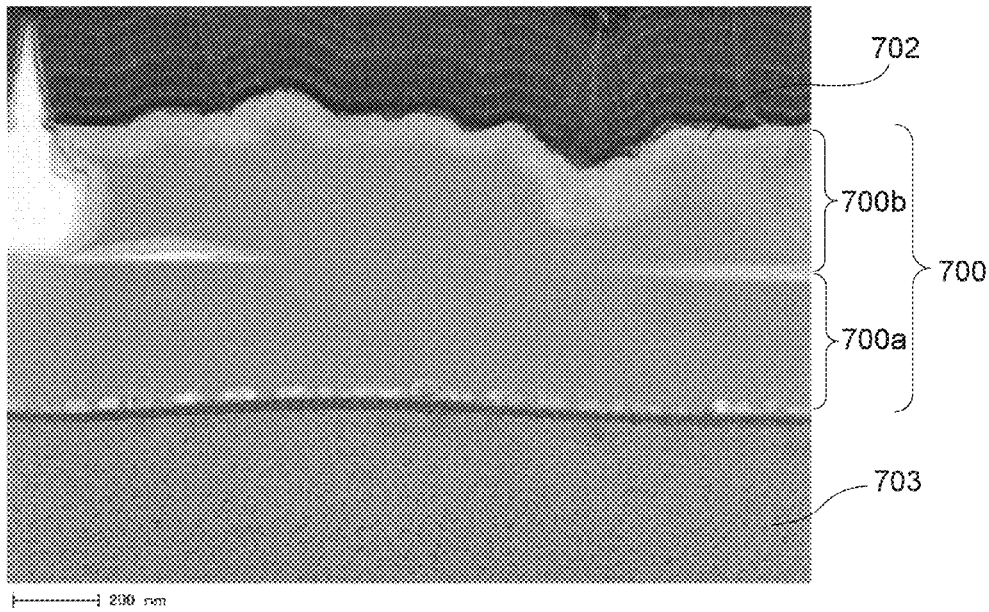
FIGS. 35A and 35B are TEM images of the negative electrode in Comparative Example.
Figure 35B:
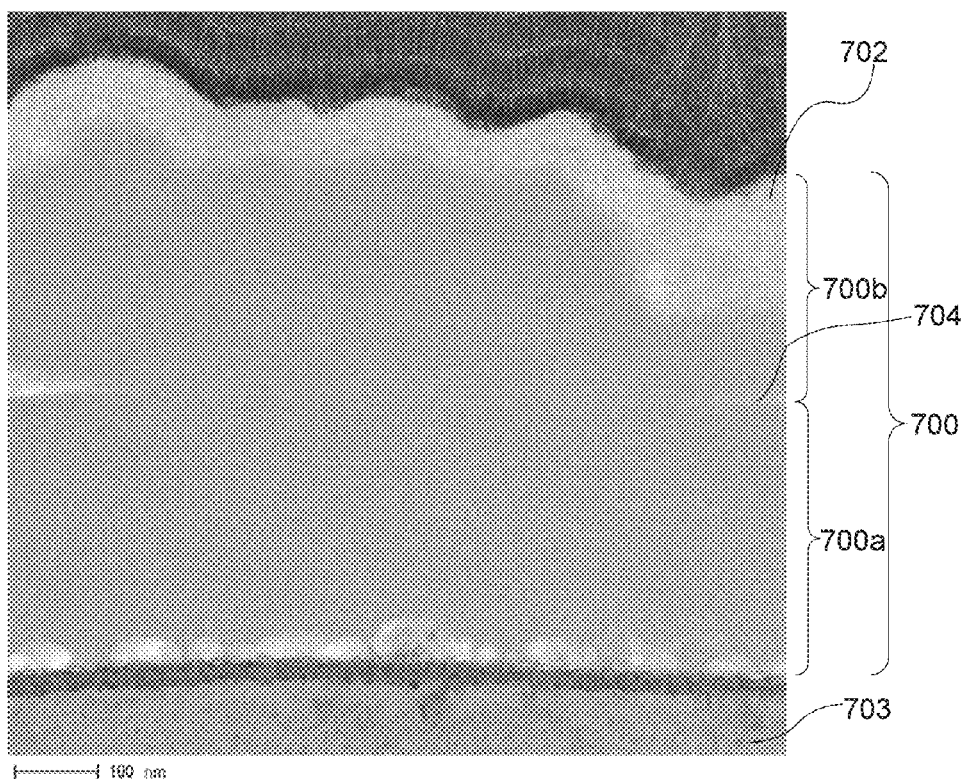

FIGS. 35A and 35B are TEM images of the negative electrode observed after the 40th charge-discharge cycle. The porous portion 702 is observed in a surface part of the silicon film 700 on the current collector 703 as in the negative electrode shown in FIGS. 32A and 32B. The TEM images of FIGS. 35A and 35B after the 40th charge-discharge cycle are different from the TEM images after the 10th charge-discharge cycle (see FIGS. 32A and 32B) in that the crack 704 is formed near the middle of the thickness of the silicon film 700. In the TEM observation, the silicon film 700 seems to be divided into an upper layer 700b and a lower layer 700a at the crack 704. Further, in this case, the above-described porous portion 702 is formed only in the upper layer 700b. From this, it can be presumed that lithium ions which are carrier ions were repeatedly inserted and extracted only in the upper part of the silicon film 700, which resulted in generation of the crack 704 at a boundary between the upper layer 700b and the lower layer 700a. This will be described later.

Figure 36A:
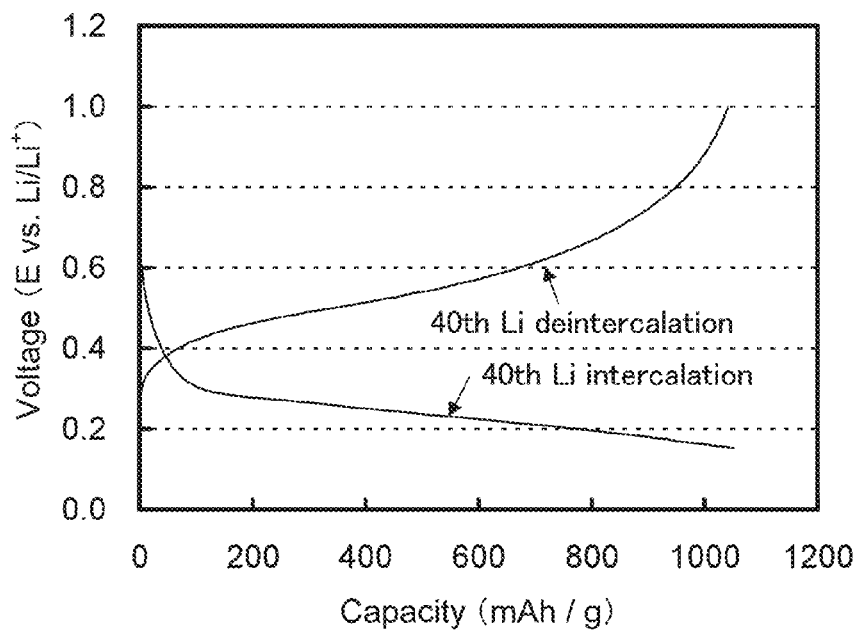
FIGS. 36A and 36B show characteristics of the negative electrode in Comparative Example.
Figure 36B:
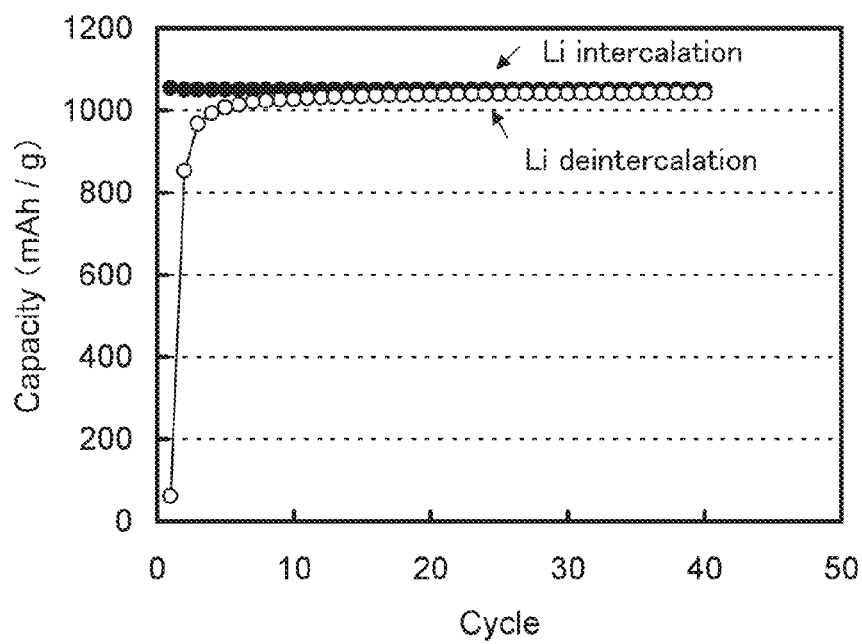

FIG. 36A shows charge-discharge characteristics of the negative electrode observed at the 40th charge-discharge cycle. The vertical axis represents voltage of the negative electrode with oxidation-reduction potential of lithium used as a reference and the horizontal axis represents capacity of the negative electrode in the comparative example. FIG. 36B shows cycle characteristics of the charge-discharge capacity up to the 40th charge-discharge cycle. The vertical axis represents capacity of the negative electrode and the horizontal axis represents the number of cycles of insertion or extraction of Li in or from the negative electrode. As described above, the porous portion 702 and the crack 704 were observed in part of the silicon film 700 in the negative electrode after the 40th charge-discharge cycle. However, the measurement results of the charge-discharge characteristics show that the capacity of the negative electrode was maintained and deterioration of the charge-discharge capacity did not occur at the 40th charge-discharge cycle.

(After 150th Charge-Discharge Cycle)

Figure 37A:
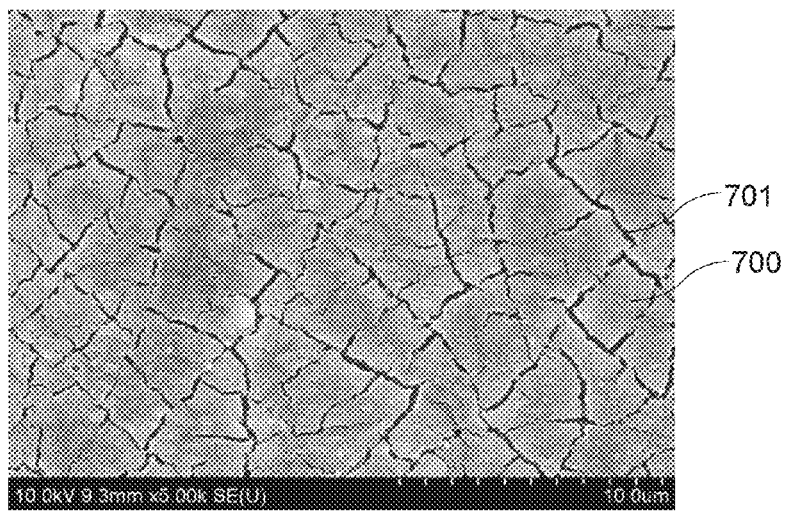
FIGS. 37A to 37C are SEM images of the negative electrode in Comparative Example.
Figure 37B:
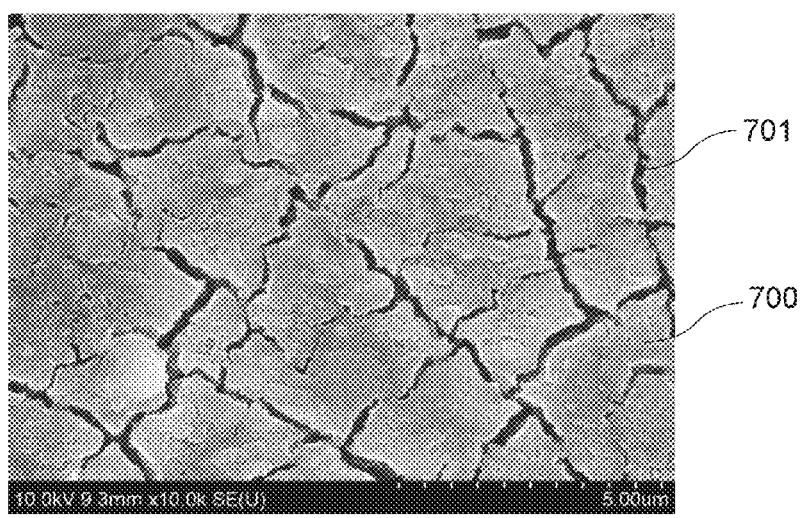
Figure 37C:
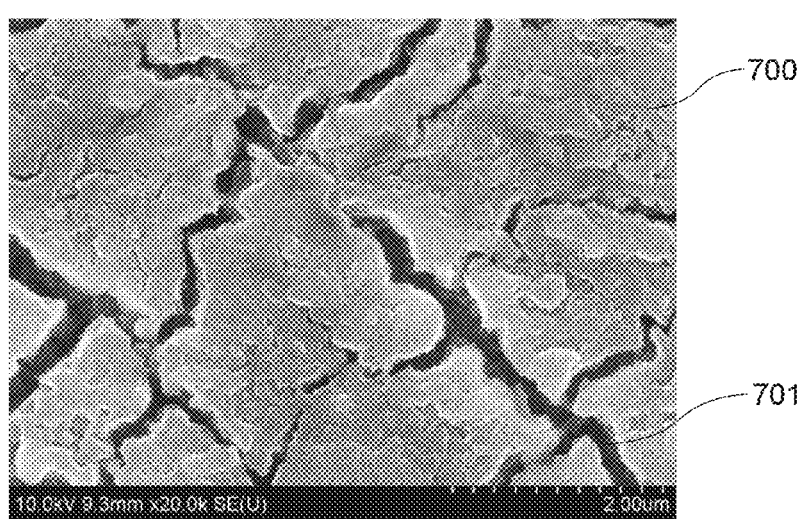

FIGS. 37A to 37C are SEM images of the negative electrode observed after the 150th charge-discharge cycle. The observation confirmed that the countless cracks 701 were observed in the silicon film 700 similarly to the cases after the 10th charge-discharge cycle and the 40th charge-discharge cycle.

Figure 38A:
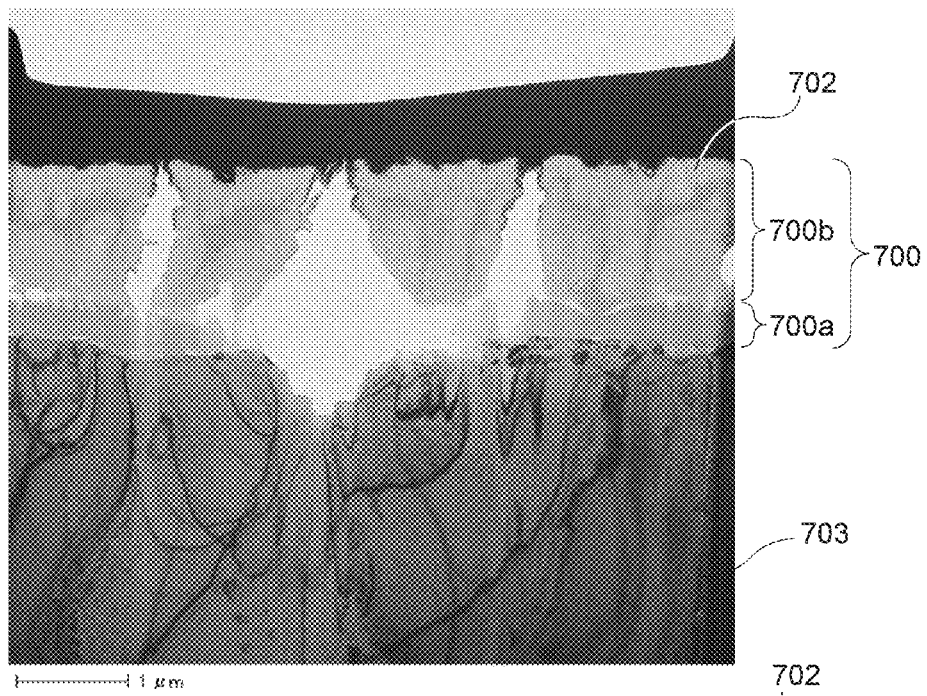
FIGS. 38A and 38B are TEM images of the negative electrode in Comparative Example.
Figure 38B:
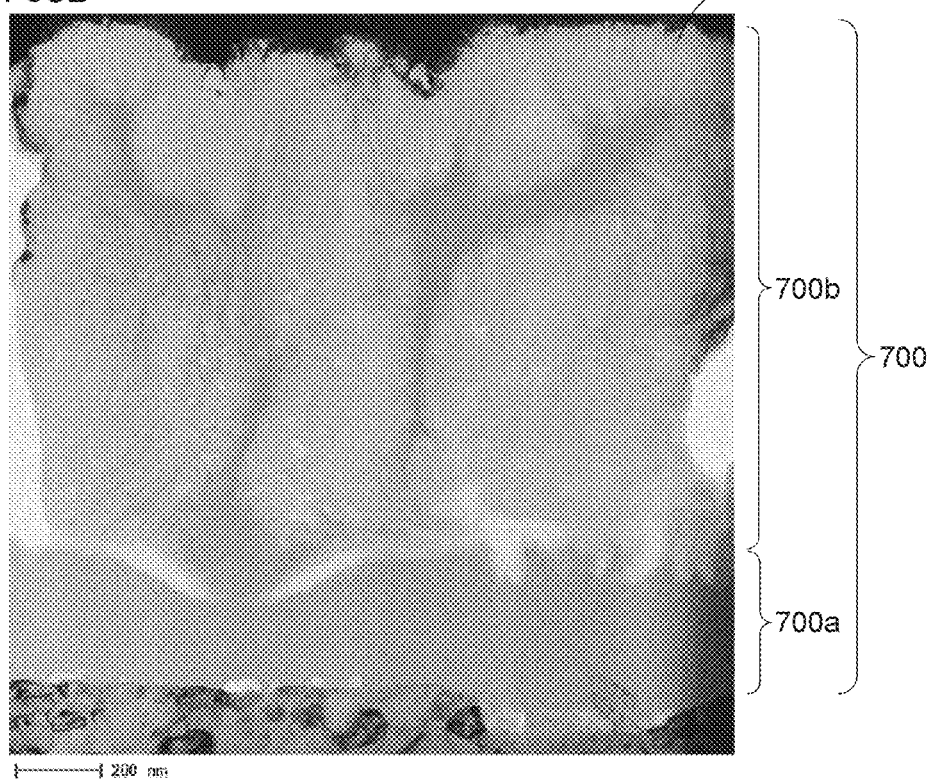

FIGS. 38A and 38B are TEM images of the negative electrode observed after the 150th charge-discharge cycle. The porous portion 702 was observed in a large part of the upper layer 700b of the silicon film 700 over the current collector 703. The expansion of the porous portion 702 is noticeable, and the porous portion 702 occupies about 80% of the entire thickness of the silicon film 700. The upper layer 700b and the lower layer 700a of the silicon film 700 are clearly separated as the porous portion and a non-porous portion, respectively, and the upper layer 700b is easily separated from the lower layer 700a.

Figure 39A:
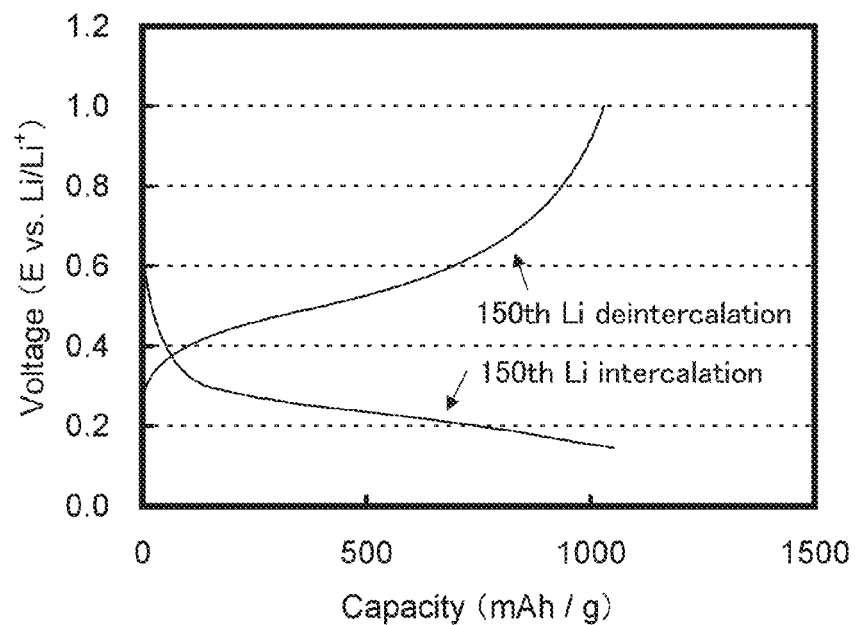
FIGS. 39A and 39B show characteristics of the negative electrode in Comparative Example.

FIG. 39A shows charge-discharge characteristics of the negative electrode at the 150th charge-discharge cycle. The vertical axis represents voltage of the negative electrode with oxidation-reduction potential of lithium used as a reference and the horizontal axis represents capacity of the negative electrode in the comparative example.

Figure 39B:
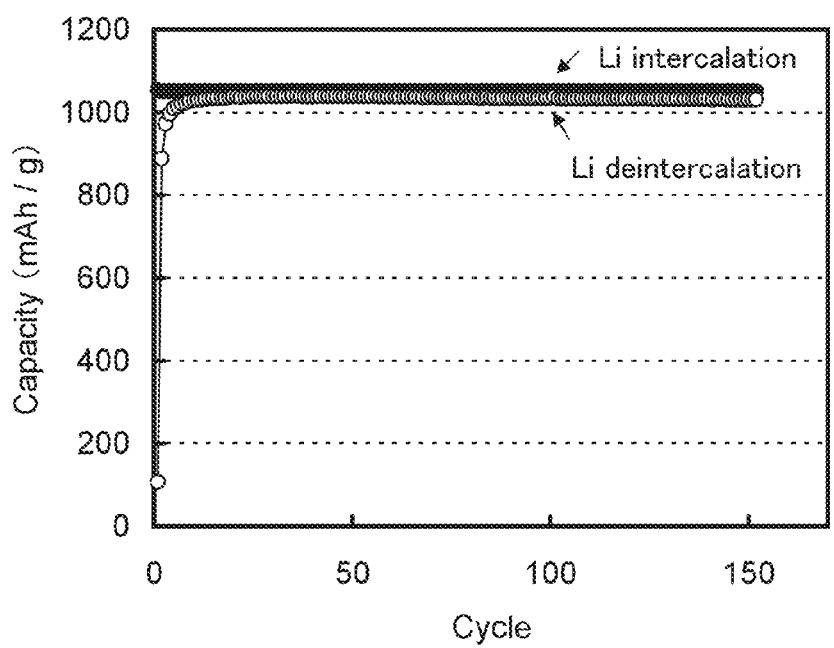

FIG. 39B shows cycle characteristics of the charge-discharge capacity up to the 150th charge-discharge cycle. The vertical axis represents capacity of the negative electrode and the horizontal axis represents the number of cycles of insertion or extraction of Li in or from the negative electrode. As described above, the porous portion 702 was noticeably observed in part of the silicon film 700 in the negative electrode after the 150th charge-discharge cycle. However, the measurement results of the charge-discharge characteristics show that the capacity of the negative electrode was maintained and deterioration of the charge-discharge capacity did not occur at the 150th charge-discharge cycle.

As described above, there was no significant difference in the cycle characteristics between the negative electrode of one embodiment of the present invention in Example 2 and the negative electrode in the comparative example until the 150th charge-discharge cycle. However, the observations of the surface and the cross section of the thin negative electrode active material layer described in the comparative example show that separation of the active material proceeded. In contrast, in the negative electrode of one embodiment of the present invention, cracks or the like causing separation were not generated at all, although the porous portion was observed in part of the negative electrode active material layer.

As described above, the negative electrode active material layer 602 is not provided over the base portion 601a of the negative electrode current collector 601 but provided only in the vicinity of the protrusion portions 601b, whereby the expansion of the negative electrode active material layer 602 formed on the side surfaces of the protrusion portions 601b is not suppressed at bases of the protrusion portions 601b; thus, generation of cracks or deformation and breakage can be reduced. Consequently, reliability of a lithium secondary battery can be improved.

EXAMPLE 3

Figure 40A:
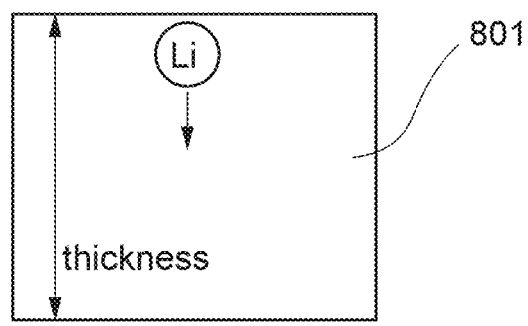
FIGS. 40A and 40B each illustrate diffusion of carrier ions.
Figure 40B:
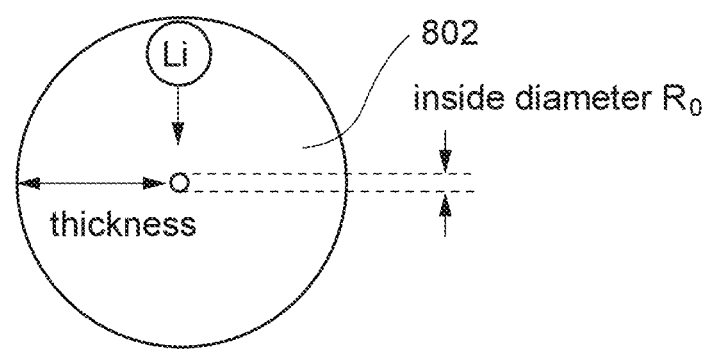

As described in Example 2, it is clear from the experiment that cracks in the amorphous silicon or separation of the amorphous silicon from the current collector is less likely to occur in the case where the columnar amorphous silicon provided around the protrusion portion of the current collector was used as the negative electrode active material than in the case where the plate-like amorphous silicon was used as the negative electrode active material. The reason for such a difference in the cycle deterioration in spite of the use of the same active material is probably a difference in the shape of the active material as described above (see FIGS. 40A and 40B).

Figure 41A:
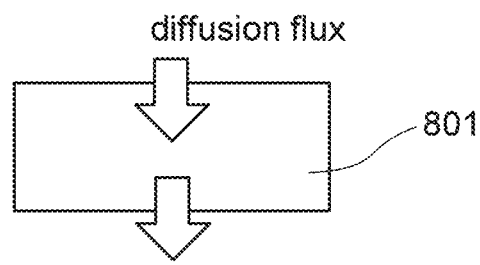
FIGS. 41A and 41B each illustrate diffusion of carrier ions.
Figure 41B:
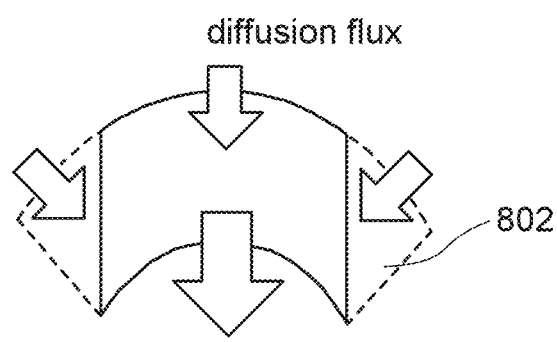

A change in the total amount of carriers per unit volume over time corresponds to a difference between flux of carrier ions flowing into a given region of a negative electrode active material per unit time and flux of carrier ions flowing from the region per unit time. In considering diffusion of carrier ions toward the current collector from the electrolyte solution side, in the case where an active material layer is a plate-like active material layer 801, the area over which the flux of carrier ions flowing into the active material layer 801 sweeps is equal to the area over which the flux of carrier ions flowing from the active material layer 801 sweeps (see FIG. 41A). In contrast, in the case where the active material layer is a columnar active material layer 802, the area over which the flux of carrier ions flowing into the active material layer 802 sweeps is larger than the area over which the flux of carrier ions flowing from the active material layer 802 sweeps (see FIG. 41B).

In other words, if the total amount of carrier ions flowing from the inside of a negative electrode in the case where the active material layer is the plate-like active material layer 801 is equal to that in the case where the active material layer is the columnar active material layer 802, the total amount of carrier ions flowing into the negative electrode from the outside of the electrode in the case of the columnar active material layer 802 is larger than that in the case of the plate-like active material layer 801 by a difference in the area between a surface of the column and a flat surface, and a change in the total amount of carrier ions per unit volume over time is larger than that in the case of the plate-like active material layer 801.

Thus, the carrier ions in the case of the columnar active material layer 802 are probably diffused into a deeper portion than in the case of the plate-like active material layer 801.

Numerical calculation was performed in order to support the above hypothesis. The following were assumed for the numerical calculation: (1) the plate-like active material layer and the columnar active material layer were both uniform mediums, (2) a reaction term on alloying of lithium with silicon or the like was ignored, (3) the concentrations of carrier ions in surfaces of the plate-like active material layer and the columnar active material layer were standardized, and (4) the concentrations of carrier ions in the surfaces of the plate-like active material layer and the columnar active material layer were set constant and the other surfaces had free boundaries. Moreover, parameters for the numerical calculation were as follows: a temporal resolution of 1.0 μsec, a spatial resolution of 0.005 μm, a thickness of 0.5 μm, and a diffusion coefficient of $10^{-10}$ cm/s.

A diffusion equation (Formula 1) on the plate-like active material layer and a diffusion equation (Formula 2) on the columnar active material layer were solved using a finite difference method for spatial discretization and a fully implicit scheme for time evolution.

$$\frac{\partial C(t, x)}{\partial t} = D \frac{\partial^2 C(t, x)}{\partial x^2} \quad \text{[Formula 1]}$$

$$\frac{\partial C(t, r)}{\partial t} = D \frac{\partial^2 C(t, r)}{\partial r^2} + \frac{D}{r} \frac{\partial C(t, r)}{\partial r} \quad \text{[Formula 2]}$$

In the formulae, C(t, x) and C(t, r) each denote the concentration of carrier ions and D denotes a diffusion coefficient. The diffusion equation (Formula 2) on the columnar active material layer is different from the diffusion equation (Formula 1) on the plate-like active material layer in that the second term representing an effect of the columnar shape is added.

Figure 42:
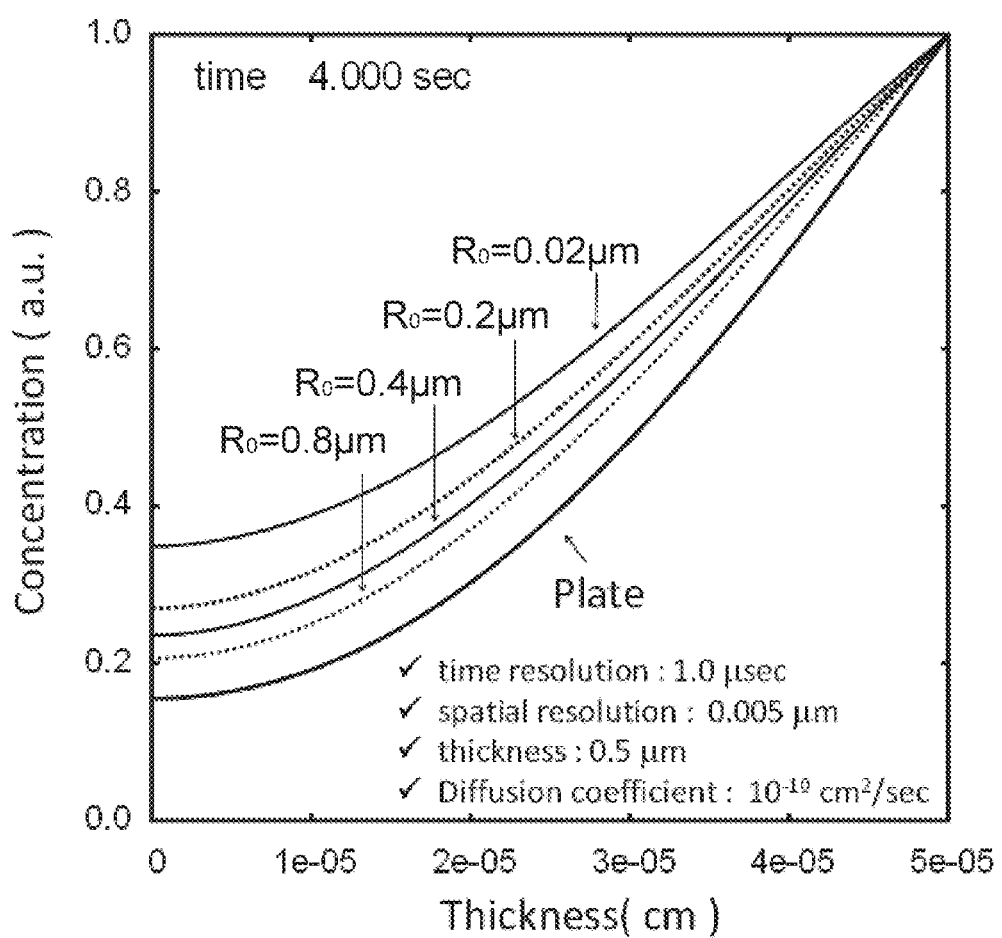
FIG. 42 shows calculation results of concentration of carrier ions with respect to thickness.

FIG. 42 shows results of the numerical calculation. The horizontal axis represents the thickness of the active material layer and the vertical axis represents the concentration of carrier ions. Curved lines in FIG. 42 represent the case of the plate-like active material layer (Plate) and the cases of the columnar active material layers with inside diameters (corresponding to a diameter of the protrusion of the current collector) $R_0$ of 0.02 μm, 0.2 μm, 0.4 μm, and 0.8 μm. The thicknesses of the active material layers are uniform (0.5 μm). The columnar active material layers vary in inside diameter. In FIG. 42, a thickness of 5e-05 cm (0.5 μm) corresponds to surfaces of the active material layers and a thickness of 0 cm corresponds to deepest portions of the active material layers.

The results of the numerical calculation show that the concentrations of carrier ions in the deepest portions of the columnar active material layers are higher than that of the plate-like active material layer. In particular, as the inside diameter of the cylinder decreases, the concentration of carrier ions in the deepest portion of the active material layer increases. This is probably because as the inside diameter of the cylinder decreases, an effect of the second term in the diffusion equation (Formula 2) on the columnar active material layer increases.

From the above, a crack is easily formed in the plate-like active material layer probably because the depth at which the carrier ions are inserted is shallow. In contrast, a crack is not formed in the columnar active material layer probably because the depth at which the carrier ions are inserted is deep.

Thus, the use of the negative electrode structure according to the present invention in which the current collector partly has the protrusions and the active material layer is provided around the protrusions enables separation of the active material to be suppressed and deterioration of the negative electrode to be reduced as compared to the case of the plate-like (thin) active material layer. As a result, the reliability of the lithium secondary battery can be improved.

This application is based on Japanese Patent Application serial No. 2011-268084 filed with the Japan Patent Office on Dec. 7, 2011, Japanese Patent Application serial No. 2012-089347 filed with the Japan Patent Office on Apr. 10, 2012, and Japanese Patent Application serial No. 2012-222748 filed with the Japan Patent Office on Oct. 5, 2012, the entire contents of which are hereby incorporated by reference.

What is claimed is:

1. A negative electrode for a lithium secondary battery comprising:
   a current collector; and
   a negative electrode active material layer,
   wherein the current collector comprises:
      a base portion; and
      a plurality of protrusion portions extending in a substantially perpendicular direction to a surface of the base portion, the plurality of protrusion portions in contact with the base portion,
   wherein the plurality of protrusion portions and the base portion contain titanium,
   wherein an entirety of side surfaces of the plurality of protrusion portions are in contact with the negative electrode active material layer while at least a part of a top surface of the base portion is exposed,
   wherein an entirety of top surfaces of the plurality of protrusion portions are in contact with the negative electrode active material layer,
   wherein the negative electrode active material layer is covered with graphene, wherein a silicon oxide layer is positioned between the negative electrode active material layer and the graphene, and wherein the silicon oxide layer and the graphene each cover side surfaces of the plurality of protrusion portions and the top surfaces of the plurality of protrusion portions.

2. The negative electrode for the lithium secondary battery according to claim 1, wherein the negative electrode active material layer contains at least one of amorphous silicon, microcrystalline silicon, and polycrystalline silicon.

3. The negative electrode for the lithium secondary battery according to claim 1, wherein aspect ratios of the plurality of protrusion portions are greater than or equal to 0.2 and less than or equal to 2000.

4. The negative electrode for the lithium secondary battery ac cording to claim 1, wherein the plurality of protrusion portions are columnar or pyramidal.

5. The negative electrode for the lithium secondary battery according to claim 1, wherein the plurality of protrusion portions each comprise a sharp end.

6. The negative electrode for the lithium secondary battery according to claim 1, wherein thicknesses of the negative electrode active material layer on the side surfaces of the plurality of protrusion portions are larger than thicknesses of the negative electrode active material layer on top surfaces of the plurality of protrusion portions.

7. A lithium secondary battery comprising the negative electrode for the lithium secondary battery according to claim 1.

8. A negative electrode comprising:
a current collector; and
a negative electrode active material layer,
wherein the current collector comprises:
    a base portion;
    a first protrusion portion extending in a substantially perpendicular direction to a surface of the base portion, the first protrusion portion in contact with the base portion; and
    a second protrusion portion extending in a substantially perpendicular direction to a surface of the base portion, the second protrusion portion in contact with the base portion,
wherein each of the first protrusion portion, the second protrusion portion, and the base portion comprises titanium,
wherein an entirety of a side surface of the first protrusion portion and an entirety of a side surface of the second protrusion portion are in contact with the negative electrode active material layer while at least a part of a top surface of the base portion is exposed,
wherein at least a part of a top surface of the first protrusion portion is in contact with the negative electrode active material layer,
wherein the negative electrode active material layer is covered with graphene, and
wherein a silicon oxide layer is positioned between the negative electrode active material layer and the graphene, and
wherein the silicon oxide layer and the graphene each cover the side surface of the first protrusion portion and the top surface of the first protrusion portion.

9. The negative electrode according to claim 8, wherein the negative electrode active material layer contains at least one of amorphous silicon, microcrystalline silicon, and polycrystalline silicon.

10. The negative electrode according to claim 8, wherein aspect ratio of the first protrusion portion is greater than or equal to 0.2 and less than or equal to 2000.

11. The negative electrode according to claim 8, wherein the first protrusion portion is columnar or pyramidal.

12. The negative electrode according to claim 8, wherein the first protrusion portion and the second protrusion portion each comprise a sharp end.

13. A lithium secondary battery comprising the negative electrode according to claim 8.

* * * * *